US012786068B2

(12) United States Patent

Zhou et al.

(10) Patent No.: US 12,786,068 B2

(45) Date of Patent: *Nov. 3, 2026

(54) NETWORK CONTROLLER AS A SERVICE (NCaaS) TO DEFINE NETWORK POLICIES FOR THIRD-PARTY CONTAINER CLUSTERS

(71) Applicant: VMware LLC, Palo Alto, CA (US)

(72) Inventors: Zhengsheng Zhou, Beijing (CN); Jianjun Shen, Redwood City, CA (US); Wenfeng Liu, Beijing (CN); Donghai Han, Beijing (CN)

(73) Assignee: VMware LLC, Palo Alto, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 18/976,950

(22) Filed: Dec. 11, 2024

(65) Prior Publication Data

US 2025/0106116 A1 Mar. 27, 2025

Related U.S. Application Data

(63) Continuation of application No. 18/098,076, filed on Jan. 17, 2023, now Pat. No. 12,199,833.

(30) Foreign Application Priority Data

Nov. 29, 2022 (WO) ................ PCT/CN2022/134984

(51) Int. Cl.

*H04L 41/122* (2022.01)
*H04L 41/0894* (2022.01)

(52) U.S. Cl.

CPC ........ *H04L 41/122* (2022.05); *H04L 41/0894* (2022.05)

(58) Field of Classification Search

CPC ............... H04L 41/122; H04L 41/0894; H04L 41/0893; H04L 41/0895; H04L 41/40

(Continued)

(56) References Cited

U.S. PATENT DOCUMENTS

| | | | |
|---|---|---|---|
| 6,697,360 | B1 | 2/2004 | Gai et al. |
| 7,869,439 | B1 | 1/2011 | Ramberg et al. |

(Continued)

FOREIGN PATENT DOCUMENTS

| | | | |
|---|---|---|---|
| AU | 2004227600 | B2 | 5/2009 |
| CA | 3107455 | A1 | 2/2020 |

(Continued)

OTHER PUBLICATIONS

Author Unknown, "Assign Memory Resources to Containers and Pods," Oct. 17, 2020, 7 pages.

(Continued)

*Primary Examiner* — Karen C Tang

(74) *Attorney, Agent, or Firm* — Quarles & Brady LLP

(57) ABSTRACT

Some embodiments provide a method for using a first SDN controller as a Network Controller as a Service (NCaaS). The first SDN controller receives a first set of network attributes regarding network elements in a first container cluster configured by a second SDN controller, and a second set of network attributes regarding network elements in a second container cluster configured by a third SDN controller. These container clusters do not have a controller for defining particular network policies. Based on the sets of network attributes, the first SDN controller defines the particular network policies to control forwarding data messages between the first and second container clusters. The first SDN controller distributes at least a subset of the particular network policies to the first container cluster in order for network elements at the first container cluster to enforce on data messages exchanged between the first and second container clusters.

20 Claims, 22 Drawing Sheets

(58) Field of Classification Search
USPC .......................................................... 709/231
See application file for complete search history.

(56) References Cited

U.S. PATENT DOCUMENTS 7,890,543 B2 2/2011 Hunt et al.
7,912,955 B1 3/2011 Machiraju et al.
8,627,442 B2 1/2014 Ji et al.
8,683,560 B1 3/2014 Brooker et al.
9,152,803 B2 10/2015 Biswas et al.
9,225,638 B2 12/2015 Jain et al.
9,258,312 B1 2/2016 O'Neill et al.
9,531,590 B2 12/2016 Jain et al.
9,536,077 B2 1/2017 Bignon et al.
9,590,901 B2 3/2017 Tubaltsev et al.
9,594,546 B1 3/2017 Todd et al.
9,674,275 B1 6/2017 Engers et al.
9,755,898 B2 9/2017 Jain et al.
9,774,537 B2 9/2017 Jain et al.
9,813,509 B1 11/2017 Visser et al.
9,825,810 B2 11/2017 Jain et al.
9,935,827 B2 4/2018 Jain et al.
9,979,641 B2 5/2018 Jain et al.
10,095,669 B1 10/2018 Karppanen
10,122,735 B1 11/2018 Wohlgemuth
10,129,077 B2 11/2018 Jain et al.
10,135,737 B2 11/2018 Jain et al.
10,193,977 B2 1/2019 Ke et al.
10,205,701 B1 2/2019 Voss et al.
10,225,137 B2 3/2019 Jain et al.
10,257,095 B2 4/2019 Jain et al.
10,270,796 B1 4/2019 Veeraswamy et al.
10,320,679 B2 6/2019 Jain et al.
10,341,233 B2 7/2019 Jain et al.
10,356,011 B2 * 7/2019 Luo .................... H04L 12/4633
10,496,605 B2 12/2019 Melnik et al.
10,516,568 B2 12/2019 Jain et al.
10,547,521 B1 1/2020 Roy et al.
10,594,743 B2 3/2020 Hong et al.
10,609,091 B2 3/2020 Hong et al.
10,613,888 B1 4/2020 Mentz et al.
10,628,144 B2 4/2020 Myneni et al.
10,652,143 B2 5/2020 Ravinoothala et al.
10,693,782 B2 6/2020 Jain et al.
10,708,368 B1 7/2020 Young et al.
10,725,836 B2 7/2020 Savenkov et al.
10,795,909 B1 10/2020 Bond et al.
10,812,337 B2 10/2020 Vaidya et al.
10,826,775 B1 * 11/2020 Moreno .............. G06F 9/45558
10,841,226 B2 11/2020 Mariappan et al.
10,860,444 B2 12/2020 Natanzon
10,942,788 B2 3/2021 Palavalli et al.
10,944,691 B1 3/2021 Raut et al.
10,951,661 B1 3/2021 Medan et al.
10,972,341 B2 4/2021 Mudigonda
10,972,386 B2 4/2021 Mackie et al.
11,074,091 B1 7/2021 Nayakbomman et al.
11,086,700 B2 8/2021 Myneni et al.
11,159,366 B1 10/2021 Gawade et al.
11,190,491 B1 11/2021 Kaciulis et al.
11,194,483 B1 12/2021 Dontu et al.
11,277,309 B2 3/2022 Vaidya et al.
11,316,822 B1 4/2022 Gawade et al.
11,436,057 B2 9/2022 Shen et al.
11,500,688 B2 11/2022 Liu et al.
11,570,146 B2 1/2023 Liu et al.
11,606,254 B2 3/2023 Liu et al.
11,671,400 B2 6/2023 Zhou et al.
11,671,401 B2 6/2023 Singh et al.
11,689,425 B2 6/2023 Vaidya et al.
11,689,497 B2 6/2023 Shen et al.
11,748,170 B2 9/2023 Palavalli et al.
2004/0098154 A1 5/2004 McCarthy
2005/0129019 A1 6/2005 Cheriton
2007/0244962 A1 10/2007 Laadan et al.
2007/0245334 A1 10/2007 Nieh et al.
2010/0149996 A1 6/2010 Sun
2010/0177674 A1 7/2010 Aggarwal
2010/0211815 A1 8/2010 Mankovskii et al.
2010/0246545 A1 9/2010 Berzin
2010/0293378 A1 11/2010 Xiao et al.
2011/0161988 A1 6/2011 Kashyap
2011/0194494 A1 8/2011 Aso et al.
2011/0282936 A1 11/2011 Chekhanovskiy et al.
2011/0289508 A1 11/2011 Fell et al.
2012/0117226 A1 5/2012 Tanaka et al.
2012/0150912 A1 6/2012 Ripberger
2012/0304275 A1 11/2012 Ji et al.
2013/0018994 A1 1/2013 Flavel et al.
2013/0019314 A1 1/2013 Ji et al.
2013/0125230 A1 5/2013 Koponen et al.
2013/0174168 A1 7/2013 Abuelsaad et al.
2013/0266019 A1 10/2013 Qu et al.
2013/0283339 A1 10/2013 Biswas et al.
2014/0036730 A1 2/2014 Nellikar et al.
2014/0129690 A1 5/2014 Jaisinghani et al.
2014/0164897 A1 6/2014 Yucel et al.
2014/0223556 A1 8/2014 Bignon et al.
2014/0237100 A1 8/2014 Cohn et al.
2014/0258479 A1 9/2014 Tenginakai et al.
2015/0063166 A1 3/2015 Sif et al.
2015/0081767 A1 3/2015 Evens
2015/0100704 A1 4/2015 Davie et al.
2015/0172093 A1 6/2015 Kaneko et al.
2015/0222598 A1 8/2015 Koponen et al.
2015/0249574 A1 9/2015 Zhang
2015/0263899 A1 9/2015 Tubaltsev et al.
2015/0263946 A1 9/2015 Tubaltsev et al.
2015/0317169 A1 11/2015 Sinha et al.
2015/0348044 A1 12/2015 Smith
2015/0379281 A1 12/2015 Feroz et al.
2016/0036860 A1 2/2016 Xing et al.
2016/0080422 A1 3/2016 Belgodere et al.
2016/0094454 A1 3/2016 Jain et al.
2016/0094457 A1 3/2016 Jain et al.
2016/0094650 A1 3/2016 Rio
2016/0094661 A1 3/2016 Jain et al.
2016/0182293 A1 6/2016 Benedetto et al.
2016/0217301 A1 7/2016 Watanabe et al.
2016/0239326 A1 8/2016 Kaplan et al.
2016/0241436 A1 8/2016 Fourie et al.
2016/0254964 A1 9/2016 Benc
2016/0269318 A1 9/2016 Su et al.
2016/0294612 A1 10/2016 Ravinoothala et al.
2016/0315809 A1 10/2016 McMurry et al.
2016/0335129 A1 11/2016 Behera et al.
2016/0337334 A1 11/2016 Murr
2017/0005923 A1 1/2017 Babakian
2017/0005986 A1 1/2017 Bansal et al.
2017/0031956 A1 2/2017 Burk et al.
2017/0063632 A1 3/2017 Goliya et al.
2017/0063782 A1 3/2017 Jain et al.
2017/0085561 A1 3/2017 Han et al.
2017/0093790 A1 3/2017 Banerjee et al.
2017/0171144 A1 6/2017 Sagiraju et al.
2017/0177394 A1 6/2017 Barzik et al.
2017/0195210 A1 7/2017 Jacob et al.
2017/0206034 A1 7/2017 Fetik
2017/0207963 A1 7/2017 Mehta et al.
2017/0286698 A1 10/2017 Shetty et al.
2017/0317954 A1 11/2017 Masurekar et al.
2017/0324781 A1 11/2017 Hu et al.
2017/0332307 A1 11/2017 Pan
2017/0353351 A1 12/2017 Cheng et al.
2017/0366416 A1 12/2017 Beecham et al.
2017/0374106 A1 12/2017 Hamou et al.
2018/0019969 A1 1/2018 Murthy
2018/0063194 A1 3/2018 Vaidya et al.
2018/0083835 A1 3/2018 Cole et al.
2018/0089299 A1 3/2018 Collins et al.
2018/0114012 A1 4/2018 Sood et al.
2018/0123943 A1 5/2018 Lee et al.
2018/0131675 A1 5/2018 Sengupta et al.
2018/0167453 A1 6/2018 Luo

(56) References Cited

U.S. PATENT DOCUMENTS

2018/0167458 A1 6/2018 Ould-Brahim et al.
2018/0167487 A1 6/2018 Vyas et al.
2018/0183757 A1 6/2018 Gunda et al.
2018/0205605 A1 7/2018 Mittal et al.
2018/0234459 A1 8/2018 Kung et al.
2018/0248827 A1 8/2018 Scharber et al.
2018/0262424 A1 9/2018 Roeland et al.
2018/0287996 A1 10/2018 Tripathy et al.
2018/0295036 A1 10/2018 Krishnamurthy et al.
2018/0331885 A1 11/2018 Raymond et al.
2018/0359323 A1 12/2018 Madden
2019/0034237 A1 1/2019 Siddappa et al.
2019/0036868 A1 1/2019 Chandrashekhar et al.
2019/0042518 A1 2/2019 Marolia et al.
2019/0068500 A1 2/2019 Hira
2019/0068544 A1 2/2019 Hao et al.
2019/0079751 A1 3/2019 Foskett et al.
2019/0097879 A1 3/2019 Cai et al.
2019/0102280 A1 4/2019 Caldato et al.
2019/0103992 A1 4/2019 Cidon et al.
2019/0132220 A1 5/2019 Boutros et al.
2019/0132221 A1 5/2019 Boutros et al.
2019/0132283 A1 5/2019 Ballard et al.
2019/0140895 A1 5/2019 Ennis, Jr. et al.
2019/0140921 A1 5/2019 Xu et al.
2019/0149512 A1 5/2019 Sevinc et al.
2019/0149516 A1 5/2019 Rajahalme et al.
2019/0149518 A1 5/2019 Sevinc et al.
2019/0171650 A1 6/2019 Botev et al.
2019/0173780 A1 6/2019 Hira et al.
2019/0229987 A1 7/2019 Shelke et al.
2019/0230126 A1 7/2019 Kumar et al.
2019/0238363 A1 8/2019 Boutros et al.
2019/0238364 A1 8/2019 Boutros et al.
2019/0245757 A1 8/2019 Meyer et al.
2019/0273683 A1 9/2019 Jiang et al.
2019/0288947 A1 9/2019 Jain et al.
2019/0306036 A1 10/2019 Boutros et al.
2019/0306086 A1 10/2019 Boutros et al.
2019/0356693 A1 11/2019 Cahana et al.
2019/0384645 A1 12/2019 Palavalli et al.
2019/0386877 A1 12/2019 Vaidya et al.
2020/0065080 A1 2/2020 Myneni et al.
2020/0065166 A1 2/2020 Myneni et al.
2020/0073692 A1 3/2020 Rao et al.
2020/0076684 A1 3/2020 Naveen et al.
2020/0076685 A1 3/2020 Vaidya et al.
2020/0076734 A1 3/2020 Naveen et al.
2020/0084112 A1 3/2020 Kandaswamy et al.
2020/0092275 A1 3/2020 Seed et al.
2020/0112504 A1 4/2020 Osman
2020/0177458 A1* 6/2020 Rahman .............. H04L 41/0631
2020/0213366 A1 7/2020 Hong et al.
2020/0250009 A1 8/2020 Jaeger et al.
2020/0250074 A1 8/2020 Zhang et al.
2020/0252376 A1 8/2020 Feng et al.
2020/0301801 A1 9/2020 Hegde
2020/0314006 A1 10/2020 Mackie et al.
2020/0314173 A1 10/2020 Pahwa et al.
2020/0344120 A1 10/2020 Pianigiani et al.
2020/0366558 A1 11/2020 Vaidya et al.
2020/0374186 A1 11/2020 Scott
2020/0379812 A1 12/2020 Ranjan et al.
2020/0382556 A1 12/2020 Woolward et al.
2020/0401457 A1 12/2020 Singhal et al.
2020/0403853 A1 12/2020 Garipally et al.
2020/0403860 A1 12/2020 Lewis et al.
2020/0409671 A1 12/2020 Mazurskiy
2021/0004292 A1 1/2021 Zlotnick et al.
2021/0036926 A1* 2/2021 O'Brien .............. H04L 41/0894
2021/0064442 A1 3/2021 Alluboyina et al.
2021/0099335 A1 4/2021 Li
2021/0165695 A1 6/2021 Palavalli et al.
2021/0200814 A1 7/2021 Tal et al.
2021/0218598 A1 7/2021 Ganapathy
2021/0218652 A1 7/2021 Raut et al.
2021/0243164 A1 8/2021 Murray et al.
2021/0266255 A1 8/2021 Ganapathy
2021/0273946 A1 9/2021 Iqbal et al.
2021/0306285 A1 9/2021 Hirasawa et al.
2021/0306338 A1 9/2021 Miriyala
2021/0311803 A1 10/2021 Zhou et al.
2021/0314190 A1 10/2021 Liu et al.
2021/0314226 A1* 10/2021 Chandrashekhar .......................... G06F 11/3409
2021/0314239 A1 10/2021 Shen et al.
2021/0314240 A1 10/2021 Liu et al.
2021/0314300 A1 10/2021 Shen et al.
2021/0314361 A1 10/2021 Zhou et al.
2021/0314388 A1 10/2021 Zhou et al.
2021/0328858 A1 10/2021 Asveren et al.
2021/0349765 A1 11/2021 Zhou et al.
2021/0352044 A1 11/2021 Asveren et al.
2021/0365308 A1 11/2021 Myneni et al.
2021/0397466 A1 12/2021 McKee et al.
2021/0409336 A1 12/2021 Talur et al.
2022/0012045 A1 1/2022 Rudraraju et al.
2022/0035651 A1 2/2022 Maurya et al.
2022/0038311 A1 2/2022 Shen et al.
2022/0070250 A1 3/2022 Baid et al.
2022/0091868 A1 3/2022 Malleni et al.
2022/0158926 A1 5/2022 Wennerström et al.
2022/0182439 A1 6/2022 Zhou et al.
2022/0200865 A1 6/2022 Vaidya et al.
2022/0210113 A1 6/2022 Pillareddy et al.
2022/0278926 A1 9/2022 Sharma et al.
2022/0303246 A1 9/2022 Miriyala et al.
2022/0311738 A1 9/2022 Singh et al.
2022/0321495 A1 10/2022 Liu et al.
2022/0400053 A1 12/2022 Liu et al.
2023/0043362 A1 2/2023 Kita et al.
2023/0070224 A1 3/2023 Huo et al.
2023/0104568 A1 4/2023 Miriyala et al.
2023/0155942 A1* 5/2023 Degrace .............. G06F 9/45558 709/222
2023/0179484 A1 6/2023 Liu et al.
2023/0179573 A1 6/2023 Sosnovich et al.
2023/0231741 A1 7/2023 Tang et al.
2023/0231827 A1 7/2023 Tang et al.
2023/0244591 A1 8/2023 Sun et al.
2024/0056386 A1 2/2024 Panchalingam
2024/0095158 A1 3/2024 Miriyala
2024/0106727 A1* 3/2024 Peng ........................ H04L 41/40
2024/0129161 A1 4/2024 Miriyala

FOREIGN PATENT DOCUMENTS

CN 105897946 A 8/2016
CN 106789367 A 5/2017
CN 107947961 A 4/2018
CN 108809722 A 11/2018
CN 110531987 A 12/2019
CN 110611588 A 12/2019
CN 111327640 A 6/2020
CN 111371627 A 7/2020
CN 111865643 A 10/2020
CN 113141386 A 7/2021
EP 2464151 A2 6/2012
EP 2464152 A2 6/2012
EP 2830270 A1 1/2015
EP 3316532 A1 5/2018
EP 3617879 A1 3/2020
JP 2011070707 A 4/2011
JP 2012099048 A 5/2012
JP 2014535213 A 12/2014
JP 2015115043 A 6/2015
JP 2018523932 A 8/2018
WO 2011159842 A2 12/2011
WO 2013063330 A1 5/2013
WO 2016160523 A1 10/2016
WO 2018044341 A1 3/2018
WO 2018044352 A1 3/2018
WO 2019241086 A1 12/2019
WO 2020041073 A1 2/2020

(56) References Cited

FOREIGN PATENT DOCUMENTS

| | | | |
|---|---|---|---|
| WO | 2020041074 | A1 | 2/2020 |
| WO | 2021196080 | A1 | 10/2021 |
| WO | 2022026028 | A1 | 2/2022 |
| WO | 2022204941 | A9 | 10/2022 |
| WO | 2023133797 | A1 | 7/2023 |

OTHER PUBLICATIONS

Author Unknown, "NSX and Micro-segmentation," Jan. 3, 2017, 2 pages, retrieved from https://www.youtube.com/watch?v=I_QtISXaxkE.
Author Unknown, "NSX Policy API: Getting Started Guide," Technical White Paper, Sep. 2019, 28 pages, VMware, Inc.
Author Unknown, "VMware NSX for vSphere 6.4—Application Rule Manager Enhancements," Jan. 20, 2018, 2 pages, retrieved from https://www.youtube.com/watch?v=r3IKNkt5mi8.
Author Unknown, "VMware NSX-T 2.4: Advancing NSX Everywhere for Everyone," Feb. 27, 2019, 2 pages, retrieved from https://www.youtube.com/watch?v=IqPyRBWABHg.
Non-Published Commonly Owned U.S. Appl. No. 18/227,306, filed Jul. 28, 2023, 37 pages, VMware, Inc.
Patni, Sanjay, "Pro RESTful APIs," Month Unknown 2017, 136 pages, Apress, New York City, NY, USA.
Abhashkumar, Anubhavnidhi, et al., "Supporting Diverse Dynamic Intent-based Policies Using Janus," CoNEXT '17, Dec. 12-15, 2017, 14 pages, ACM, Incheon, KR.
Abwnawar, Nasser, "A Policy-Based Management Approach to Security in Cloud Systems," Feb. 2020, 184 pages, De Monfort University, Leicester, UK.
Author Unknown, "Advanced Networking Features in Kubernetes and Container Bare Metal," Document 606835-001, Dec. 2018, 42 pages, Intel Corporation.
Author Unknown, "Chapter 4: Default Security Policy," IBM Security Access Manager Version 9.0, Oct. 2015, 18 pages.
Author Unknown, "Containers and Container Networking for Network Engineers: VMware NSX Container Networking," Jan. 2018, 58 pages, VMware, Inc.
Author Unknown, "E-Security Begins with Sound Security Policies," Jun. 14, 2001, 23 pages, Symantec Corporation.
Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.
Author Unknown, "NSX vSphere API Guide—NSX 6.2 for vSphere," Jan. 6, 2017, 400 pages, VMware, Inc.
Author Unknown, "OpenShift Container Platform 4.6," Mar. 3, 2021, 41 pages, Red Hat, Inc.
Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.
Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.
Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.
Non-published Commonly Owned U.S. Appl. No. 17/684,160, filed Mar. 1, 2022, 40 pages, VMware, Inc.
Non-published Commonly Owned U.S. Appl. No. 17/684,169, filed Mar. 1, 2022, 41 pages, VMware, Inc.
Non-published Commonly Owned U.S. Appl. No. 17/696,366, filed Mar. 16, 2022, 27 pages, VMware, Inc.
Non-published Commonly Owned U.S. Appl. No. 17/724,433, filed Apr. 19, 2022, 51 pages, VMware, Inc.
Non-published Commonly Owned U.S. Appl. No. 17/724,436, filed Apr. 19, 2022, 51 pages, VMware, Inc.
Non-Published Commonly Owned U.S. Appl. No. 17/960,126, filed Oct. 4, 2022, 28 pages, VMware, Inc.
Non-Published Commonly Owned Related U.S. Appl. No. 18/098,071 with similar specification, filed Jan. 17, 2023, 88 pages, VMware, Inc.
Non-Published Commonly Owned Related U.S. Appl. No. 18/098,072 with similar specification, filed Jan. 17, 2023, 87 pages, VMware, Inc.
Non-Published Commonly Owned Related U.S. Appl. No. 18/098,078 with similar specification, filed Jan. 17, 2023, 87 pages, VMware, Inc.
Non-Published Commonly Owned U.S. Appl. No. 18/098,081, filed Jan. 17, 2023, 52 pages, VMware, Inc.
Non-Published Commonly Owned U.S. Appl. No. 18/102,700, filed Jan. 28, 2023, 39 pages, VMware, Inc.
Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.
Rouse, Margaret, "What is SDDC (software-defined data center)?—Definition from WhatIs.com," Mar. 2017, 5 pages, TechTarget.com.
Sayfan, Gigi, "Mastering Kubernetes: Automating container deployment and management," May 2017, 426 pages, Packt Publishing, Birmingham, UK.
Wodicka, Brent, "A Developer's Guide to Container Orchestration, Kubernetes, & AKS," Mar. 19, 2019, 5 pages, AIS, Reston, VA, USA.
Non-Published Commonly Owned U.S. Appl. No. 18/211,360, filed Jun. 19, 2023, 41 pages, VMware, Inc.

* cited by examiner

NETWORK CONTROLLER AS A SERVICE (NCaaS) TO DEFINE NETWORK POLICIES FOR THIRD-PARTY CONTAINER CLUSTERS

The present application is a continuation application of U.S. patent application Ser. No. 18/098,076 filed Jan. 17, 2023, and published on May 30, 2024, under Publication No. 2024/0179071. U.S. patent application Ser. No. 18/098,076 claims the benefit of Chinese Patent Application No. PCT/CN/2022134984 filed Nov. 29, 2022. These patent applications and patents are incorporated herein by reference in its entirety for all purposes.

BACKGROUND

Container networks (e.g., Kubernetes) are an increasingly popular type of network system for deploying applications in datacenters. The sets of containers of containers produced by such a system can be deployed more rapidly than virtual machines (VMs) or physical computers. Therefore, a deployment can be scaled up or down to meet demand more rapidly than is typical for VMs or physical computers. In addition, a set of containers in a container network system has less overhead and can generally perform the same tasks faster than a corresponding VM would. Currently, there is a need for defining policies in a software defined network (SDN) for enforcement on traffic to and from sets of containers in a Kubernetes container cluster.

BRIEF SUMMARY

Some embodiments provide a novel method for defining policies for a container cluster in a first virtual private cloud (VPC) that is configured by a first software defined network (SDN) controller cluster. A second SDN controller cluster that resides in a second VPC for defining service policies that are not defined by the first SDN controller cluster receives, from a set of one or more adapters deployed in the first VPC for the second SDN controller cluster, resource identifiers for several resources of the container cluster. The second SDN controller cluster uses the resource identifiers to define a set of service policies. Then, the second SDN controller cluster distributes the set of service policies to a set of network elements to enforce the set of service policies on data messages associated with machines deployed in the first VPC and configured by the first SDN controller cluster.

In some embodiments, the first and second VPCs are in a same datacenter. In other embodiments, the first VPC is in a first datacenter and the second VPC is in a second, different datacenter. This first datacenter may belong to a first entity and the second datacenter may belong to a second, different entity. The first and second VPCs of some embodiments reside in a particular private cloud, while in other embodiments, the first and second VPCs reside in a particular public cloud. In embodiments where they reside in a particular public cloud, the particular public cloud may be managed by a particular public cloud provider, and the first and second VPCs may operate in a particular availability zone of the particular public cloud provider. In some embodiments, the first and second VPCs operate in a particular datacenter of the particular public cloud provider.

The set of network elements that enforce the set of service policies in some embodiments resides in the first VPC, and the second SDN controller cluster distributes the set of service policies to the set of network elements in the first VPC to enforce on data messages associated with the machines deployed in the first VPC configured by the first SDN controller cluster. In such embodiments, the first SDN controller is a Kubernetes SDN controller cluster, the second SDN controller cluster is a network virtualization controller cluster that configures virtual machines (VMs) operating in the second VPC, and the second SDN controller cluster distributes the set of service policies to a third SDN controller cluster operating in the first VPC for the third SDN controller cluster to distribute the set of service policies to the set of network elements. In some embodiments, the second SDN controller cluster also configures containers in the second VPC.

The third SDN controller cluster does not configure the first VPC, but resides in the first VPC to distribute the service policies to network nodes operating in the first VPC, and communicates with the second SDN controller cluster through the set of adapters in the first VPC. The second SDN controller cluster of some embodiments distributes the set of service policies to the set of adapters, for the set of adapters to forward to the third SDN controller cluster. The third SDN controller cluster receives the set of service policies from the set of adapters, determines which service policies are to be enforced by network elements operating on each network nodes, and distributes applicable service policies to each of the network nodes for the network elements operating on the network nodes to enforce the service policies.

In some embodiments, the set of network elements for enforcing the set of service policies resides in the second VPC, and the second SDN controller cluster distributes the set of service policies to the set of network elements in the second VPC to enforce the set of service policies on data messages exchanged between the machines deployed in the first VPC configured by the first SDN controller cluster and machines deployed in the second VPC configured by the second SDN controller cluster. The set of network elements in some embodiments includes gateways, routers, VMs, logical switch ports, etc. operating in the second VPC. For instance, a gateway operating in the second VPC may receive a set of service policies or a set of service rules defined based on the service policies to enforce on all data messages it receives that are exchanged between the first and second VPCs.

The second SDN controller cluster of some embodiments computes, for the first VPC, a first set of service policies based on a first set of resource identifiers for a first set of resources of a first container cluster received from a first set of adapters for a first set of network elements to enforce. In such embodiments, the second SDN controller cluster may also receive, from a second set of one or more adapters deployed in a third VPC for the second SDN controller cluster, a second set of resource identifiers for a second set of resources of a second container cluster in the third VPC that is configured by a fourth SDN controller cluster. The method uses the second set of resource identifiers to define a second set of service policies to enforce on data messages associated with containers in the second container cluster configured by the fourth SDN controller.

In embodiments where the first set of network elements resides in the second VPC, the second SDN controller cluster distributes the second set of service policies to the first set of network elements in the second VPC to enforce the second set of service policies on data messages exchanged between machines deployed in the third VPC configured by the fourth SDN controller cluster and machines deployed in the second VPC configured by the second SDN controller cluster. Like the first set of service policies for the first VPC, the second set of service policies may be enforced by any kind of network element operating in the second VPC, such as gateways, routers, VMs, containers logical switch ports, etc.

The second SDN controller cluster of some embodiments distributes the second set of service policies to a second set of network elements to enforce the second set of service policies. Like for the first VPC, the fourth SDN controller is a Kubernetes SDN controller cluster, and the second SDN controller cluster distributes the second set of service policies to a fifth SDN controller cluster operating in the third VPC for the fifth SDN controller cluster to distribute the second set of service policies to the second set of network elements. The fifth SDN controller cluster does not configure the third VPC, but resides in the third VPC to distribute the second set of service policies to network nodes operating in the third VPC, and communicates with the second SDN controller cluster through the second set of adapters in the third VPC. The second SDN controller cluster of some embodiments distributes the second set of service policies to the second set of adapters for the second set of adapters to forward to the fifth SDN controller cluster. The fifth SDN controller cluster receives the second set of service policies from the second set of adapters, determines which service policies are to be enforced by network elements operating on each network nodes, and distributes applicable service policies to each of the network nodes for the network elements operating on the network nodes to enforce the service policies.

In some embodiments, the first set of network elements resides in the first VPC, the second set of network elements resides in the third VPC, and the first and second sets of service policies are to be enforced by the first and second sets of network elements on data messages exchanged between machines deployed in the first VPC configured by the first SDN controller cluster and machines deployed in the third VPC configured by the fourth SDN controller cluster. In such embodiments, the second SDN controller cluster is used to define the service policies because the first and third VPCs do not have a controller cluster for defining these service policies. The second SDN controller cluster defines service policies for several VPCs based on resources within those VPCs. In some embodiments, the SDN controller clusters that configure these VPCs (e.g., the first and fourth SDN controller clusters) are not configured to define service polices for any data messages associated with the container clusters that they configure. In such embodiments, the SDN controller clusters use the second SDN controller cluster as a network controller as a service (NCaaS) in order to define service policies.

The resource identifiers in some embodiments are network addresses (e.g., internet protocol (IP)) addresses of the resources in a VPC. For example, a resource identifier of a gateway node is the IP address of the gateway. In another example, a resource identifier may identify one network node that hosts multiple pods, such that the resource identifier for all pods on that network node is the network address of the network node. In this example, data messages that are to be sent to a particular pod and that identify the network node's network address will be sent to the network node, and the network node will perform a network address translation (NAT) before sending them to the particular pod on the network node.

Some embodiments provide a novel method of implementing service rules for a container cluster in a first VPC that is configured by a first SDN controller cluster. The method registers for event notification from an application programming interface (API) server to receive notification regarding a set of events associated with resources deployed in the first VPC. The method forwards to a second SDN controller cluster resource identifiers that are collected through the registration for several resources of the container cluster. The second SDN controller cluster defines service policies that are not defined by the first SDN controller cluster and resides in a second VPC. The method receives, from the second SDN controller cluster, a set of service policies defined by the second SDN controller cluster based on the resource identifiers. The method distributes service rules defined based on the received set of service policies to service nodes in the first VPC. The service nodes enforce the service rules on data messages associated with machines deployed in the first VPC and configured by the first SDN controller cluster.

In some embodiments, the notification regarding the set of events includes notification of one or more updates to the resource identifiers, and the method further includes receiving the resource identifiers from the API server. This API server may be a single API server executing on one network node in the first VPC, or may be a set of multiple API servers, each executing on a network node in the first VPC. In some embodiments, a single API server receives the registration for event notification from a set of adapters in the first VPC, collects resource identifiers for all resources in the first VPC, and sends the resource identifiers to the set of adapters. A set of multiple API servers in some embodiments each collects resource identifiers for resources of the network node on which it operates and sends the resource identifiers to the set of adapters. In some embodiments, all API servers receive the registration for event notification, while, in other embodiments, only one API server receives it. A set of API servers in some embodiments includes a designated master API server, who receives the registration for event notification, collects resource identifiers from the other API servers, and sends all of the resource identifiers to the set of adapters.

Resources in the first VPC may be added or removed at any time, and the set of events corresponds to any updates regarding the resources in the first VPC. For example, if a new pod is instantiated on a network node in the first VPC, the new pod's resource identifier (e.g., its network address) is collected by the API server, and the API server notifies the set of adapters operating in the first VPC of the new resource identifiers. In some embodiments, the API server only sends new or updated resource identifiers to the set of adapters. In other embodiments, the API server sends a complete list of all resource identifiers for the resources in the first VPC each time the API server notifies the set of adapters of the resource identifiers. The API server in some embodiments sends resource identifiers to the set of adapters periodically, while in other embodiments, the API server sends the resource identifiers only when one or more updates to the resource identifiers occurs. The resource identifiers of some embodiments include network addresses for the several resources in the first VPC. These resources may include one or more of pods, network nodes hosting one or more pods, gateway nodes, and service nodes in the first VPC.

The set of adapters in the first VPC in some embodiments forwards the resource identifiers to the second SDN controller cluster and receives the set of service policies from the second SDN controller cluster. The set of adapters then forwards the set of service policies to a third SDN controller cluster that resides in the first VPC and does not configure the first VPC. In some embodiments, the third SDN controller cluster distributes the set of service policies to a particular agent operating on a particular network node in the first VPC. This particular agent is designated as a master agent of the first VPC and the particular network node is designated as a master node of the first VPC. The master agent uses the set of service policies to define the service rules that are enforced on the data messages.

After defining the service rules, the master agent distributes the service rules to secondary agents operating on secondary network nodes in the first VPC. The secondary agents receive the service rules and distribute them to service nodes operating in their respective network nodes for enforcement. In some embodiments, the master agent distributes the service rules to the secondary agents by communicating through an Open vSwitch (OVS) bridge instantiated on each network node. The master agent in some embodiments also distributes the service rules to service nodes operating on the master network node for enforcement.

In some embodiments, instead of sending all service policies to a master agent, the third SDN controller cluster determines which service policies in the set of service policies are to be enforced at each of the network elements in the first VPC, and distributes to each network node hosting the network elements. At least a subset of service policies is applicable to the network node. For example, a gateway operating at a first network node may need to receive a first subset of service policies defined by the second SDN controller cluster, while a service node operating at a second network node may need to receive a second subset of service policies defined by the second SDN controller cluster that is different than the first subset. The third SDN controller cluster determines which service policies are in the first and second subsets, and distributes them to the first and second network nodes. This ensures that each network node only receives service policies applicable to network elements that they operate.

At each network node, an agent receives the subset of service policies sent by the third SDN controller. Each agent uses its received subset of service policies to define a set of service rules to enforce at its network node. In some embodiments, the agents define the service rules by translating the received subset of service policies to Open vSwitch (OVS) flows to enforce at the node. After defining the set of service rules to apply at its network node, each agent distributes the set of service rules to network elements operating on the network node for the network elements to enforce the set of service rules. In some embodiments, service rules are to be enforced on data messages exchanged between the machines in the first VPC and machines in a third VPC configured by a fourth SDN controller cluster. In such embodiments, the first and third VPCs do not have controller cluster for defining service policies applicable to these data messages, so the second SDN controller cluster is used. The service policies defined by the second SDN controller cluster may be based on the resource identifiers for the resources in the first VPC, and also on resource identifiers for resources in the third VPC. These resource identifiers may be sent to the second SDN controller cluster by a set of one or more adapters in the third VPC, and the second SDN controller cluster may distribute the service policies to the third VPC in addition to the first VPC such that network elements in the third VPC can enforce the service policies.

In some embodiments, a subset of service rules are distributed to at least two network elements that implement a distributed network element. This distributed network element may be a logical switch, a logical router, a logical middlebox service network element, etc. that resides on two or more physical machines (e.g., host computers) of the container cluster.

Some embodiments provide a novel method for using a first SDN controller cluster as an NCaaS to define a particular set of network policies to enforce in multiple VPCs. The first SDN controller cluster that provides the network controller as a service receives a first set of network attributes regarding a first set of network elements in a first VPC that is configured by a second SDN controller cluster but does not have a controller cluster in the first VPC for defining the particular set of network policies. The first SDN controller cluster also receives a second set of network attributes regarding a second set of network elements in a second VPC that is configured by a third SDN controller cluster but does not have a controller cluster in the second VPC for defining the particular set of network policies. Based on the first and second sets of network attributes, the first SDN controller cluster defines the particular set of network policies to control forwarding data messages between the first and second VPCs. Then, the first SDN controller cluster distributes at least a subset of the defined network policies to the first VPC in order for at least one set of one or more network elements at the first VPC to enforce on data messages exchanged between the first and second VPCs.

In some embodiments, each of the first and second VPCs has at least one controller cluster that defines network policies to control forwarding data messages between network elements within the first VPC, but does not have a controller cluster that defines network policies to control forwarding data messages between network elements that are in different VPCs. In such embodiments, the first SDN controller cluster, which operates in a different, third VPC, is used as a service for the first and second VPCs to define these network policies.

The second and third controller clusters that respectively configure the first and second VPCs are in some embodiments deployed by different cloud providers than a particular cloud provider of the first SDN controller cluster. For instance, the first SDN controller cluster may be deployed by a first cloud provider, while the second and third SDN controller clusters are deployed by a second cloud provider. Alternatively, the first SDN controller cluster may be deployed by a first cloud provider, while the second SDN controller is deployed by a second cloud provider and the third SDN controller cluster is deployed by a third cloud provider. In some embodiments, the particular cloud provider that deploys the first SDN controller cluster provides the first SDN controller cluster as an NCaaS for multiple tenants. In such embodiments, the first SDN controller receives a first tenant identifier (ID) identifying a first tenant that deploys the first VPC, receives a second tenant ID identifying a second tenant that deploys the second VPC, and defines the particular set of network policies based also on the first and second tenant IDs.

In some embodiments, the subset of the defined network policies distributed to the first VPC defines network policies to enforce on data messages forwarded from the first VPC to the second VPC, while in other embodiments, defines network policies to enforce on data messages forwarded from the second VPC to the first VPC. Still, in other embodiments, the first VPC receives a combination of both types of network policies. In some embodiments, the subset of defined network policies distributed to the first VPC is a first subset of the defined network policies, and the first SDN controller cluster distributes a second subset of the defined network policies to the second VPC in order for at least one set of one or more network elements at the second VPC to enforce on data messages exchanged between the first and second VPCs. In some embodiments, each VPC receives network policies to enforce on data messages in which the destination is in the VPC, namely, network policies are enforced only at the destination VPC and not at the source VPC. In other embodiments, network policies are enforced only at the source VPC. Still, in other embodiments, network policies are enforced at a combination of the source VPC and destination VPC. The decision of where network policies are to be enforced may be determined by a user or administrator that configures the first SDN controller cluster.

The subset of network policies in some embodiments is distributed to a set of one or more agents operating on one or more network nodes in the first VPC. The set of agents (1) uses the subset of the defined network policies to define a set of service rules and (2) distributes the set of service rules to the set of network elements to apply to data messages exchanged between the first and second VPCs. In some embodiments, an agent operates on each network node and defines service rules applicable to network elements on that network node. In other embodiments, one agent is designated as a master agent, and the master agent defines service rules for all network nodes and distributes the service rules to the network nodes.

In some embodiments, the set of network elements that applies the set of service rules includes at least one of an ingress gateway and an egress gateway operating on network nodes in the first VPC. In embodiments where service rules are applied only at an ingress gateway, the first VPC, hence, only applies service rules for data messages sent from the second VPC to the first VPC. In embodiments where service rules are applied only at an egress gateway, the first VPC, hence, only applies service rules for data messages sent from the first VPC to the second VPC. In embodiments where service rules are applied at a gateway associated with ingress and egress data messages, the first VPC applies service rules for all data messages exchanged between the first and second VPCs.

Alternatively, the set of network elements that applies the set of service rules in some embodiments includes one or more source and destination machines operating on the network nodes. For instance, one or more agents distribute the service rules to these machines. For data messages sent from the first VPC to the second VPC, source machines apply the service rules to the data messages. For data messages sent from the second VPC to the first VPC, destination machines apply the service rules to the data messages.

In some embodiments, the first SDN controller cluster receives at least one update to one or more network attributes. For example, the first SDN controller cluster may receive an updated list of network addresses for resources in a VPC. The updated network addresses may be due to a newly added or removed resource. These updates may be associated with the first set of network attributes from the first VPC, the second set of network attributes from the second VPC, or a combination thereof. Based on the received update, the first SDN controller cluster defines an updated set of network policies to control forwarding data messages between the first and second VPCs. Then, the first SDN controller cluster distributes at least a subset of the updated set of network policies to the at least one set of network elements at the first VPC to enforce on the data messages exchanged between the first and second VPCs. In some embodiments, the first VPC receives all updated network policies, while in other embodiments, the first VPC receives only some of the updated network policies and the second VPC receives from the first SDN controller cluster the other updated network policies. This depends on where the network policies are to be applied.

Some embodiments provide a novel method for enforcing service policies at different VPCs configured by several SDN controller clusters. A first SDN controller cluster defines a particular service policy that is to be enforced for machines in first, second, and third VPCs. The first VPC is managed by the first SDN controller cluster, the second VPC is configured by a second SDN controller cluster, and the third VPC is configured by a third SDN controller cluster. For data message flows exchanged between machines in the first and second VPCs, the first SDN controller cluster distributes the particular service policy to service nodes only in the first VPC. For data message flows exchanged between machines in the second and third VPCs, the first SDN controller cluster distributes the particular service policy to service nodes in at least one of the second and third VPCs.

The first, second, and third VPCs in some embodiments are deployed in a particular public or private cloud. In other embodiments, the first, second, and third VPCs are respectively deployed in first, second, and third public clouds. These public clouds may be managed by first, second, and third public cloud providers. Alternatively, at least two of the public clouds may be managed by at least two different public cloud providers. For example, the first public cloud may be managed by a first public cloud provider and the second and third public clouds may be managed by a second public cloud provider. In this example, the second and third VPCs may operate in a particular availability zone of the second public cloud provider, and the second and third VPCs may further operate in a particular datacenter of the second public cloud provider.

The particular service policy to be enforced in the three VPCs is in some embodiments computed by the first SDN controller cluster using a first set of network attributes of network elements in the first VPC, a second set of network attributes of network elements in the second VPC, and a third set of network attributes of network elements in the second VPC. The first set of attributes may be collected and stored by the first SDN controller cluster, or the first SDN controller cluster may receive them from another controller or a manager operating in the first VPC. The second and third sets of network attributes may be received by first and second sets of adapters operating respectively in the second and third VPCs for the first SDN controller cluster. The sets of adapters act as the communication link between the first SDN controller cluster and the second and third VPCs. In some embodiments, the network attributes for each of the second and third VPCs are received by the set of adapters from an API server operating in the VPC, and the set of adapters registers for event notification with the API server.

In some embodiments, the service nodes in the first VPC include a first set of SDN enforcement nodes deployed in the first VPC for enforcing a first set service rules based on the particular service policy on data messages sent from the first VPC to the second VPC. These enforcement nodes only handle egress traffic out of the first VPC. In such embodiments, the service nodes in the first VPC also include a second set of SDN enforcement nodes deployed in the first VPC for enforcing a second set service rules based on the particular service policy on data messages sent from the second VPC to the first VPC. These enforcement nodes only handle ingress traffic into the first VPC. The first and second sets of service rules may be defined by the first SDN controller cluster, a fourth SDN controller cluster operating in the first VPC that does not configure the first VPC, or the first and second sets of SDN enforcement nodes themselves.

The first SDN controller cluster in some embodiments distributes the service policy to service nodes in only one of the second and third VPCs. In such embodiments, all data message flows exchanged between the second and third VPCs have the particular service policy applied at the VPC that received the particular service policy (i.e., either the second VPC or the third VPC). In other embodiments, the first SDN controller cluster distributes the particular service policy to service nodes in both the second and third VPCs. In these embodiments, the second VPC enforces the particular service policy on data message flows sent from machines in the third VPC to machines in the second VPC, and the third VPC enforces the particular service policy on data message flows sent from the machines in the second VPC to the machines in the third VPC. Namely, the second and third VPCs apply the particular service policy to data message flows whose destination is in their VPC.

In some embodiments, the first SDN controller cluster also distributes the particular service policy to the service nodes in the first VPC for data message flows exchanged between machines in the first and third VPCs. In such embodiments, the service nodes apply the particular service policy to data messages sent to and from the third VPC. The first SDN controller cluster in some embodiments is a network virtualization controller cluster that configures VMs operating in the first VPC, and the second and third SDN controller clusters are Kubernetes SDN controller clusters. The first SDN controller cluster may also configure containers in the first VPC. The first SDN controller of some embodiments servers as a de-facto central controller cluster for the first, second, and third container clusters to define the particular network policy. This is because the central SDN controller cluster can receive workloads from remote container clusters.

While the above described embodiments are described regarding different VPCs configured by SDN controller clusters, the embodiments may also be implemented for different container clusters. For instance, different sets of network elements for different container clusters may be managed by different SDN controller clusters, and a particular SDN controller cluster managing a particular set of network elements may define network policies for several container clusters. For example, some embodiments provide a novel method for defining policies for a container cluster that is configured by a first SDN controller cluster. A second SDN controller cluster for defining service policies that are not defined by the first SDN controller cluster receives, from a set of one or more adapters deployed in the container cluster for the second SDN controller cluster, resource identifiers for several resources of the container cluster. The second SDN controller cluster uses the resource identifiers to define a set of service policies. Then, the second SDN controller cluster distributes the set of service policies to a set of network elements to enforce the set of service policies on data messages associated with machines deployed in the container cluster configured by the first SDN controller cluster.

Some embodiments provide a novel method of implementing service rules for a container cluster that is configured by a first SDN controller cluster. The method registers for event notification from an API server to receive notification regarding a set of events associated with resources deployed in the container cluster. The method forwards to a second SDN controller cluster resource identifiers that are collected through the registration for several resources of the container cluster. The second SDN controller cluster defines service policies that are not defined by the first SDN controller cluster. The method receives, from the second SDN controller cluster, a set of service policies defined by the second SDN controller cluster based on the resource identifiers. The method distributes service rules defined based on the received set of service policies to network elements in the container cluster. The network elements enforce the service rules on data messages associated with machines deployed in the container cluster configured by the first SDN controller cluster.

Some embodiments provide a novel method for using a first SDN controller cluster as an NCaaS to define a particular set of network policies to enforce in multiple container clusters. The first SDN controller cluster receives a first set of network attributes regarding a first set of network elements in a first container cluster that is configured by a second SDN controller cluster but does not have a controller cluster in the first container cluster for defining the particular set of network policies. The first SDN controller cluster also receives a second set of network attributes regarding a second set of network elements in a second container cluster that is configured by a third SDN controller cluster but does not have a controller cluster in the second container cluster for defining the particular set of network policies. Based on the sets of network attributes, the first SDN controller cluster defines the particular set of network policies to control forwarding data messages between the first and second container clusters. Then, the first SDN controller cluster distributes at least a subset of the defined network policies to the first container cluster in order for at least one set of one or more network elements at the first container cluster to enforce on data messages exchanged between the first and second container clusters.

Some embodiments provide a novel method for enforcing service policies at different container clusters configured by several SDN controller clusters. A first SDN controller cluster defines a particular service policy that is to be enforced for machines in first, second, and third container clusters. A first set of network elements for the first container is managed by the first SDN controller cluster, a second set of network elements for the second container is managed by a second SDN controller cluster, and a third set of network elements for the third container is managed by a third SDN controller cluster. For data message flows exchanged between machines in the first and second container clusters, the first SDN controller cluster distributes the particular service policy to service nodes only in the first container cluster. For data message flows exchanged between machines in the second and third container clusters, the first SDN controller cluster distributes the particular service policy to service nodes in at least one of the second and third container clusters.

In some embodiments, the first, second, and third sets of network elements are mutually exclusive, meaning that there are no network elements in more than one set. In other embodiments, there is at least one network element in two or more of the sets of network elements, but at least one set of network elements includes at least one network element only in its set. Still, in other embodiments, at least one set of network elements is a subset of another set of network elements, e.g., the second set of network elements can be entirely a subset of the third set of network elements such that the third set of network elements includes the second set of network elements and at least one other network element.

The first SDN controller cluster of some embodiments manages networking network elements, while the second and third SDN controller clusters only manage compute network elements. In other embodiments, the second and third SDN controller clusters only manage Layer 2 and Layer 3 networking, and do not manage middlebox services. Still, in other embodiments, the second and third SDN controller clusters manage some middlebox services (such as load balancing services), but not other middlebox services (such as firewall services).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
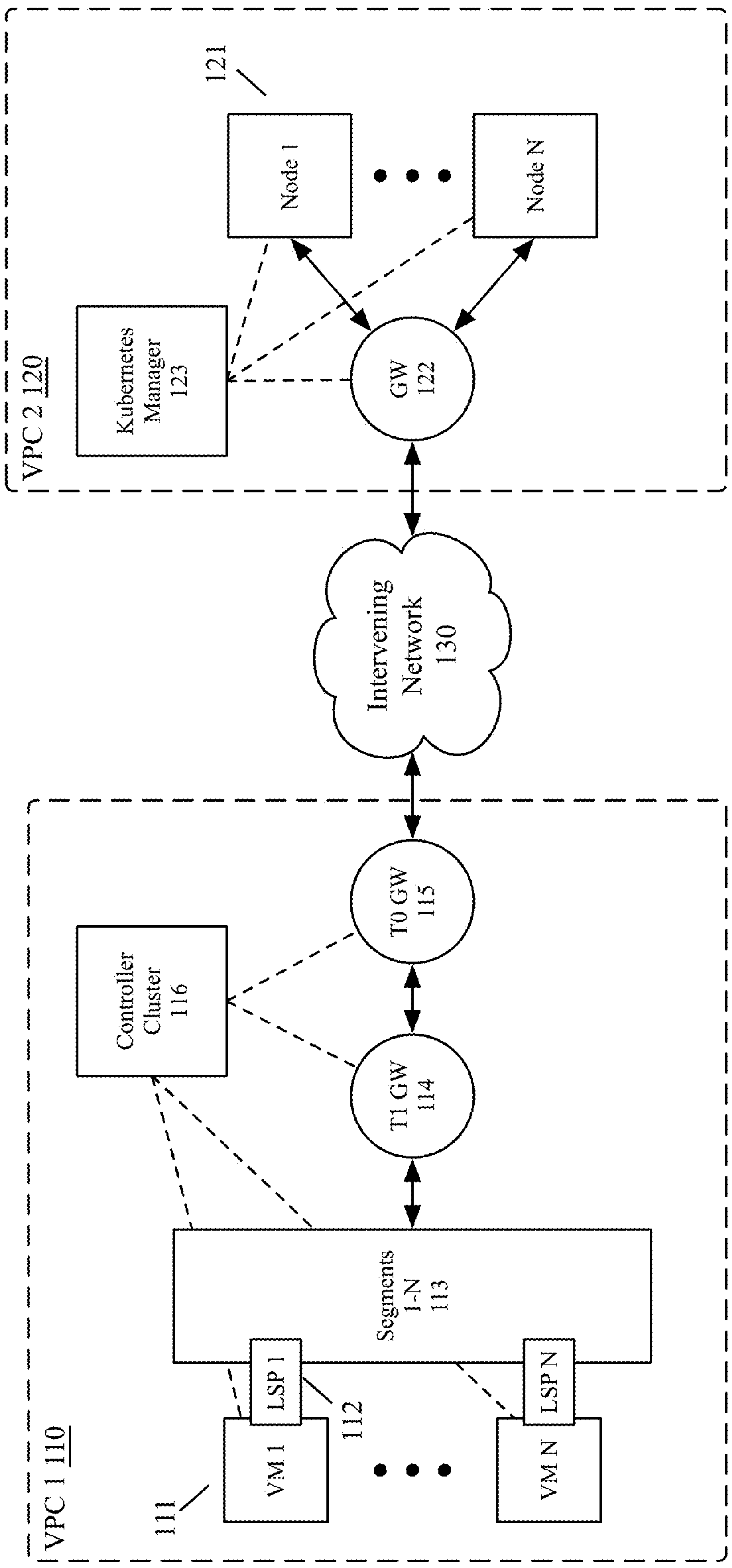
FIG. 1 illustrates an example of an SDN communicating with a Kubernetes cluster.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for defining policies for a container cluster in a first virtual private cloud (VPC) that is configured by a first software defined network (SDN) controller cluster. A second SDN controller cluster that resides in a second VPC for defining service policies that are not defined by the first SDN controller cluster receives, from a set of one or more adapters deployed in the first VPC for the second SDN controller cluster, resource identifiers for several resources of the container cluster. The second SDN controller cluster uses the resource identifiers to define a set of service policies. Then, the second SDN controller cluster distributes the set of service policies to a set of network elements to enforce the set of service policies on data messages associated with machines deployed in the first VPC and configured by the first SDN controller cluster.

Some embodiments provide a novel method of implementing service rules for a container cluster in a first VPC that is configured by a first SDN controller cluster. The method registers for event notification from an application programming interface (API) server to receive notification regarding a set of events associated with resources deployed in the first VPC. The method forwards to a second SDN controller cluster resource identifiers that are collected through the registration for several resources of the container cluster. The second SDN controller cluster defines service policies that are not defined by the first SDN controller cluster and resides in a second VPC. The method receives, from the second SDN controller cluster, a set of service policies defined by the second SDN controller cluster based on the resource identifiers. The method distributes service rules defined based on the received set of service policies to service nodes in the first VPC. The service nodes enforce the service rules on data messages associated with machines deployed in the first VPC and configured by the first SDN controller cluster.

Some embodiments provide a novel method for using a first SDN controller cluster as an NCaaS to define a particular set of network policies to enforce in multiple VPCs. The first SDN controller cluster that provides the network controller as a service receives a first set of network attributes regarding a first set of network elements in a first VPC that is configured by a second SDN controller cluster but does not have a controller cluster in the first VPC for defining the particular set of network policies. The first SDN controller cluster also receives a second set of network attributes regarding a second set of network elements in a second VPC that is configured by a third SDN controller cluster but does not have a controller cluster in the second VPC for defining the particular set of network policies. Based on the first and second sets of network attributes, the first SDN controller cluster defines the particular set of network policies to control forwarding data messages between the first and second VPCs. Then, the first SDN controller cluster distributes at least a subset of the defined network policies to the first VPC in order for at least one set of one or more network elements at the first VPC to enforce on data messages exchanged between the first and second VPCs. The first SDN controller of some embodiments servers as a de-facto central controller cluster for the first, second, and third container clusters to define the particular network policy. This is because the central SDN controller cluster can receive workloads from remote container clusters.

While the above described embodiments are described regarding different VPCs configured by SDN controller clusters, the embodiments may also be implemented for different container clusters. For instance, different sets of network elements for different container clusters may be managed by different SDN controller clusters, and a particular SDN controller cluster managing a particular set of network elements may define network policies for several container clusters. For example, some embodiments provide a novel method for defining policies for a container cluster that is configured by a first SDN controller cluster. A second SDN controller cluster for defining service policies that are not defined by the first SDN controller cluster receives, from a set of one or more adapters deployed in the container cluster for the second SDN controller cluster, resource identifiers for several resources of the container cluster. The second SDN controller cluster uses the resource identifiers to define a set of service policies. Then, the second SDN controller cluster distributes the set of service policies to a set of network elements to enforce the set of service policies on data messages associated with machines deployed in the container cluster configured by the first SDN controller cluster.

FIG. 1 illustrates an example of VPCs 110 and 120 communicating through an intervening network fabric 130. In some embodiments, the two VPCs 110 and 120 are part of the same datacenter. In other embodiments, the two VPCs operate in two different datacenters, which may belong to different entities. These two datacenters in some embodiments reside in a particular private cloud, while in other embodiments, they reside in a particular public cloud. In embodiments where they reside in a particular public cloud, the particular public cloud may be managed by a particular public cloud provider, and the first and second VPCs may operate in a particular availability zone of the particular public cloud provider. In some embodiments, the first and second VPCs 110 and 120 operate in a particular datacenter of the particular public cloud provider.

The first VPC 110 includes a logical network of one or more VMs 111, one or more logical switch ports 112, one or more segments 113, and two gateways 114 and 115. This VPC 110 is configured by a controller cluster 116. The VPC 110 may be part of a software defined network and the controller cluster 116 may be an SDN controller cluster. In some embodiments, this controller 116 is a network virtualization controller cluster that configures the VMs 111 in the VPC 110. This network virtualization controller cluster may also configure containers in the VPC 110. The VMs 111 are the sources and destination machines of this VPC 110, meaning that (1) data messages from VPC 110 to VPC 120 originate at one of the VMs 111 with a source network address (e.g., source IP address) of the source VM, and (2) data messages from VPC 120 to VPC 110 are destined for one or more of the VMs 111 with a destination network address (e.g., destination IP address) of the destination VM. Data messages that travel from a source VM in VPC 110 traverse one of the logical switch ports 112, one of the segments 113, a tier-1 gateway 114, and a tier-0 gateway 115 before reaching the intervening network fabric 130. Data messages that travel to a destination VM in VPC 110 traverse this path in the VPC 110 in the opposite direction.

The second VPC 120 includes one or more nodes 121 and one or more gateways 122 managed by a Kubernetes manager 123. These nodes 121 may be nodes hosting one or more pods, service nodes (e.g., load balancers), etc. This VPC 120 may be part of a different cloud than the first VPC 110. In some embodiments, the Kubernetes manager 123 is a Kubernetes controller cluster that controls the nodes 121 and gateways 122 of the VPC 120. The VPC 120 may be referred to as a Kubernetes cluster, which is a collection of nodes for running containerized applications. In some embodiments, the intervening network fabric 130 is referred to as an infrastructure as a service (IaaS) network, and may perform service operations on data messages, such as network address translation (NAT). To implement network policies, such as firewall rules or other middlebox service rules, the first VPC 110 applies them on data messages it exchanges with the second VPC 120.

Figure 2:
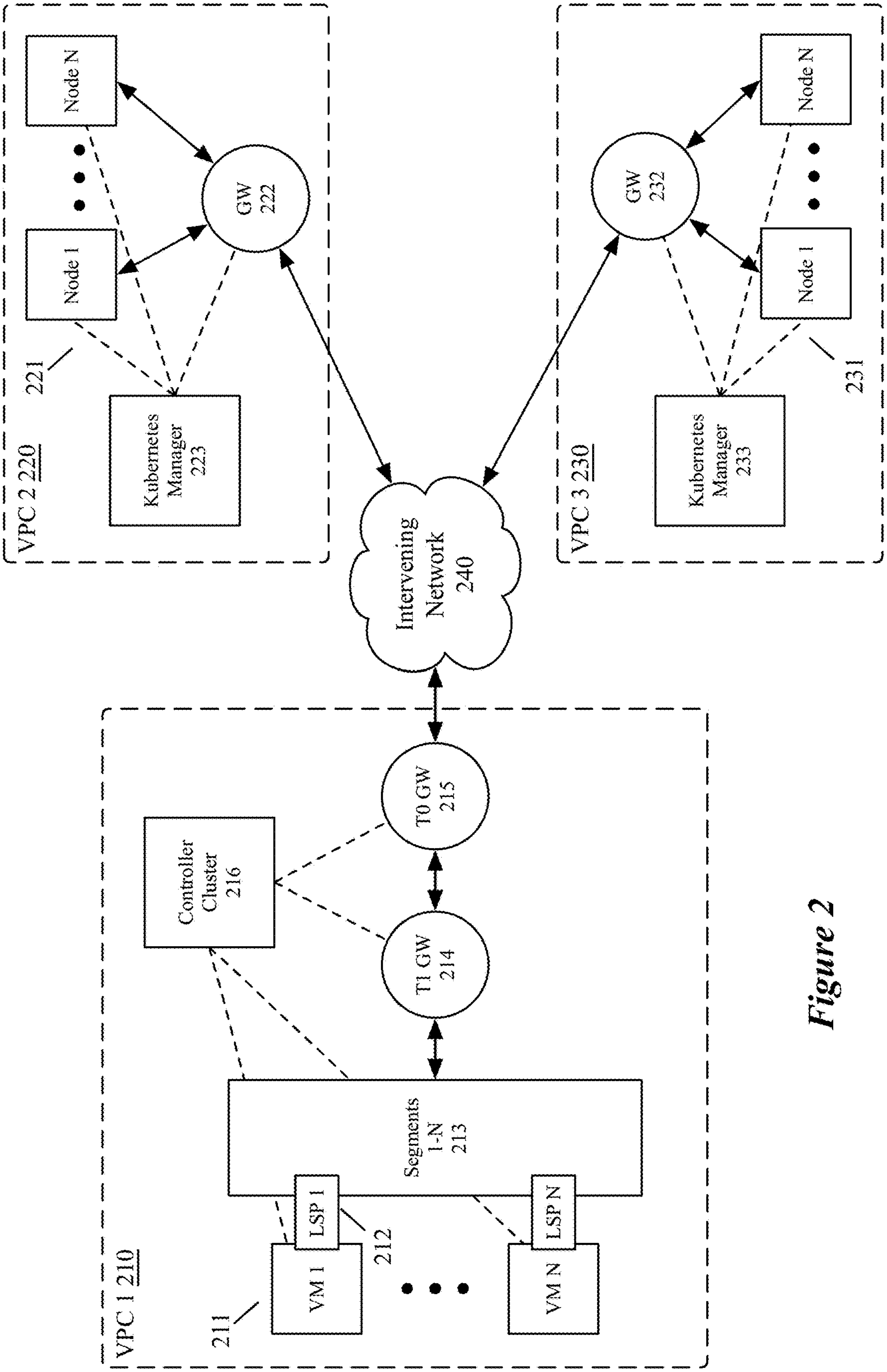
FIG. 2 illustrates an example of Kubernetes clusters that communicate with each other, and an SDN that defines network policies for the Kubernetes clusters.

FIG. 2 illustrates another example of VPCs 210, 220, and 230 communicating through an intervening network fabric 240. In this example, the first VPC 210 includes a logical network of one or more VMs 211, one or more logical switch ports 212, one or more segments 213, and two gateways 214 and 215. This VPC 210 is configured by a controller cluster 216. The VPC 210 may be part of a software defined network and the controller cluster 216 may be an SDN controller cluster. The second and third VPCs 220 and 230 are Kubernetes clusters configured by different Kubernetes managers 223 and 233, which may be Kubernetes controller clusters. The second VPC 220 can include any number of nodes 221 and gateways 222, and the third VPC 230 can also include any number of nodes 231 and gateways 232. In some embodiments, the second and third VPCs 220 and 230 send data messages to and from each other, while the first VPC's controller cluster 216 defines network policies for the second and third VPCs 220 and 230. Further information regarding defining network policies for Kubernetes clusters will be described below.

Figure 3:
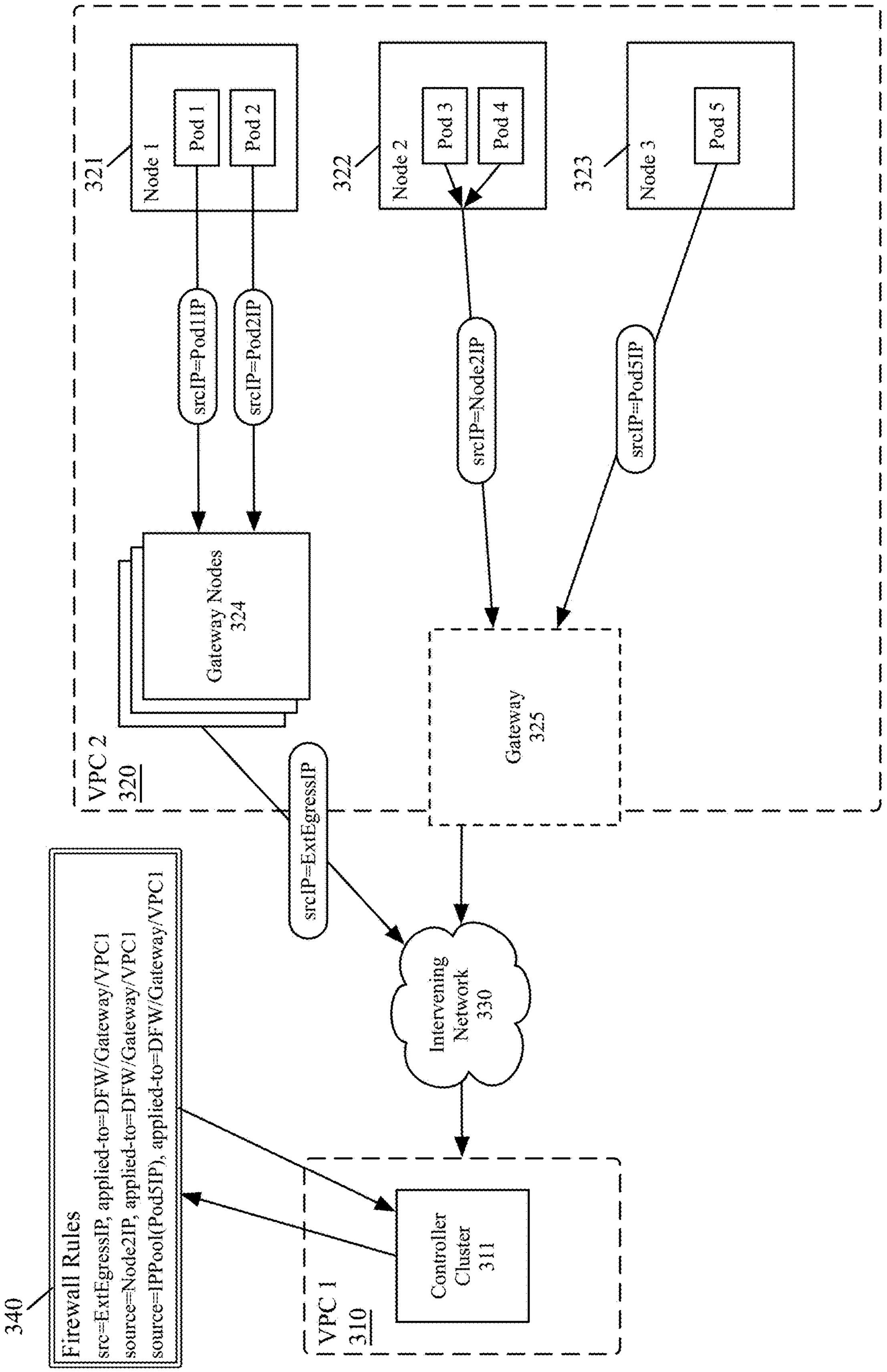
FIG. 3 illustrates discovered egress IP addresses of Kubernetes-cluster resources that are used in defining and enforcing middlebox service rules in a non-Kubernetes environment.

In some embodiments, service rules, such as middlebox service rules, are enforced on data messages that are exchanged between two VPCs, whether they are both Kubernetes clusters, or one VPC is a Kubernetes cluster and the other VPC is not a Kubernetes cluster. These service rules in some embodiments specify network addresses of the one or more Kubernetes clusters that are collected using IP discovery. FIG. 3 illustrates service rules that are implemented on traffic sent to a first VPC 310 configured by a controller cluster 311 from a Kubernetes second VPC 320 (i.e., egress traffic) managed by a Kubernetes manager (not shown), traversing an intervening network fabric 330 (e.g., an IaaS network). In this example, the second VPC 320 includes three nodes 321-323 hosting one or more pods each, a set of gateway nodes 324, and a gateway 325 for nodes 322 and 323 to communicate with the first VPC 310. A Kubernetes cluster, such as VPC 320, may include any number of nodes, any number of pods on each of the nodes, and any number of gateways.

The first node 321 illustrates a first example of IP discovered network addresses used for data messages leaving the second VPC 320. "Egress" is a custom resource definition (CRD), which is a custom specified resource for this VPC 320. A user or administrator may create an Egress CRD and specify which pods in the VPC 320 are selected. In this example, both pods on the first node 321 are selected. An external IP address is allocated for the Egress CRD, and data messages are sent from their source pods to the gateway nodes 324. The data messages' initial source IP addresses are the IP addresses of the source pods. Once a data message reach the gateway nodes 324, a source network address translation (SNAT) is performed at the gateway nodes 324 to translate the source IP address from the source pod's IP address to the allocated external Egress IP address. For example, for a data message originating from Pod 1 on node 321, its source IP address is translated at the gateway nodes 324 from "Pod1IP" to "ExtEgressIP." Now, when the data message reaches the intervening network fabric 330 and the first VPC 310, the source IP address is the Egress external IP address, and neither the intervening network 330 nor the first VPC 310 knows exactly which pod the data message came from. In some embodiments, this is performed because at least one pod IP address is a private IP address, and the private IP address is not known by any components outside the VPC 320.

The second node 322 illustrates a second example of IP discovered network addresses used for data messages leaving the second VPC 320. In this example, neither pod on the node 322 is selected for an Egress CRD, and the node 322 performs an SNAT operation on the outgoing data messages such that the source IP address is rewritten to be the node's IP address. Data messages sent from this node 322 traverse through the gateway 325 to reach the intervening network 330 and the first VPC 310. Once they reach the first VPC 310, the source IP address specified in the data messages is the node's IP address, and neither the intervening network 330 nor the first VPC 310 knows exactly which pod the data message came from; only the node 322 is known.

The third node 323 illustrates a third example of IP discovered network addresses used for data messages leaving the second VPC 320. In this example, "IPPool" is specified as a CRD for the VPC 320, which includes IP ranges and Virtual Local Area Network (VLAN) settings. Routable IP addresses are assigned to pods, and pod IP addresses are allocated from a pool of IP addresses. Here, data messages sent from a source pod have a source IP address of the allocated IP address assigned to that pod. In this example, the intervening network 330 and the first VPC 310 know which pod data messages come from because the source IP address specifies the exact pod.

These three types of source network addresses for data messages specify different levels of network addresses that are used in specifying firewall rules 340 at the controller cluster 311 in the first VPC 310. These firewall rules 340 are implemented at the first VPC 310. This example specifically illustrates firewall rules defined and applied at the first VPC 310 on data messages exchanged with the second VPC 320. However, any type of network policies or middlebox service rules may be defined and applied at the first VPC 310 for data messages exchanged with the second VPC 320.

In some embodiments, the intervening network 330 may be an IaaS network and may perform SNAT or DNAT operations. For instance, the traffic between different sites, such as on-premises, Virtual Machine Configuration (VMC), and public cloud, may involve IaaS-specific virtual private network (VPN). In such embodiments, an SNAT operation is performed at the IaaS network 330. Because of this, an administrator of the first VPC 310 must ensure that the source IP addresses are routable between the VMs in the first VPC 310 and nodes in the second VPC 320 in order for network policies to be defined at the first VPC 310.

Figure 4:
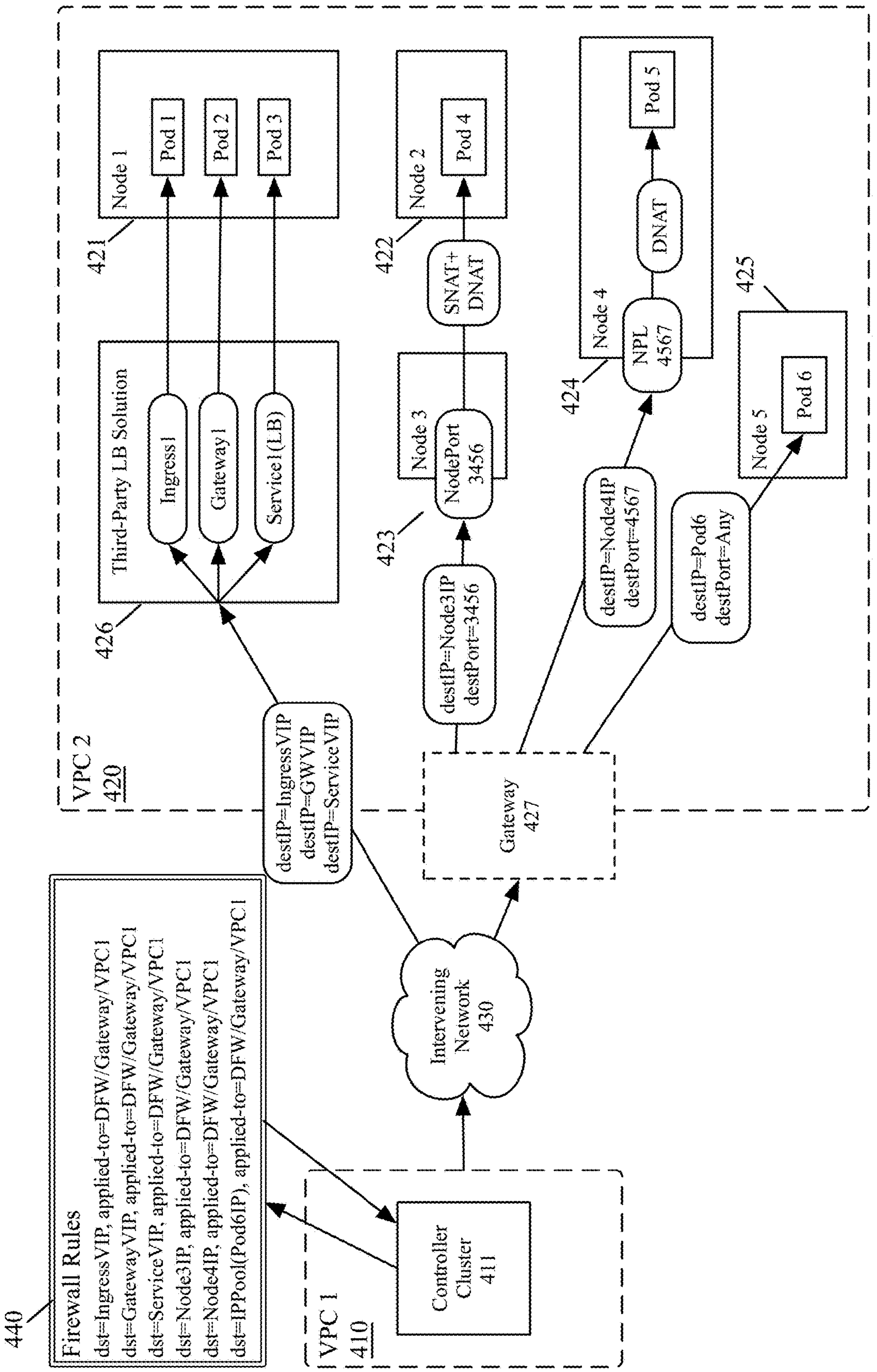
FIG. 4 illustrates discovered ingress IP addresses of Kubernetes-cluster resources that are used in defining and enforcing middlebox service rules in a non-Kubernetes environment.

FIG. 4 illustrates service rules that are implemented on traffic sent machines in a first VPC 410 configured by a controller cluster 411 to a Kubernetes second VPC 420 (i.e., egress traffic) managed by a Kubernetes manager (not shown), traversing an intervening network 430 (e.g., an IaaS network). The first VPC 410 may include a logical network. In this example, the second VPC 420 includes five nodes 421-425 hosting one or more pods each, and third party load balancing solution 426, and a gateway 427.

Data messages with a destination IP address specifying the ingress virtual IP (VIP) address are sent to Ingress1 of the third-party load balancing solution, data messages with a destination IP address specifying the gateway VIP address are sent to Gateway1, and data messages with a destination IP address specifying the service VIP address are sent to Service1 (LB). Ingress is a Kubernetes layer 7 (L7) resource, Gateway is a Kubernetes layer 4 (L4) and L7 resource, and Service of the load balancer type is a K8s L4 load balancing resource. Each of these resources provided by the cluster 420 contains a list of VIP addresses, and each VIP addresses exposes some ports (e.g., TCP/UDP).

For data messages with a destination IP address specifying a particular node, there are two examples. The first example is a data message destined for the pod on the second node 422 (i.e., its destination IP address is this node's IP address) but specifies a destination port of another node, which in this case is the third node 423. From the intervening network 430, a data message is received at the gateway 427, and then received at the third node 423, which performs SNAT and destination network address translation (DNAT) and forwards the data message to the destination pod on the destination node 422. The second example is a data message whose destination IP address and destination port specify the destination node's IP address and port number, corresponding to the fourth node 424 in this example. This data message is received at gateway 427, and then at the fourth node 424, which performs the DNAT operation itself to forward the data message to the pod.

For data messages specifying pod IP addresses, that were allocated from an IP address pool, the data messages are sent directly to the destination node. FIG. 4 illustrates this scenario using the fifth node 425, where data messages specifying the Pod's allocated IP address and any destination pod on that node 425 is received directly at the destination pod from the gateway 427. The four example types of destination network addresses for data messages entering the second VPC 420 may be used in specifying firewall rules 440, or any type of service rules. These rules 440 are enforced at the first VPC 410. More specifically, the firewall rules 440 are enforced at one or more gateways, one or more VMs, or one or more logical switch ports of the VPC 410. In this example, firewall rules are specified for enforcement, however, in different embodiments, any type of service policies and rules may be enforced on data messages to and from a Kubernetes cluster.

As discussed previously, the intervening network 430 may be an IaaS network and may perform SNAT or DNAT operations. Because an SNAT operation may be performed at the IaaS network 430, an administrator of the first VPC 410 must ensure that the destination IP addresses are routable between the first VPC 410 and the second VPC 420.

In some embodiments, Kubernetes node VMs of a second VPC are on a segment of a first VPC. In such embodiments, supervisor cluster pod VMs of the first VPC are connected to a segment if one or more nodes of the Kubernetes guest cluster is also connected to a segment. If the supervisor cluster's pod VMs and guest cluster node VMs share a same supervisor cluster namespace, the segments are inter-connected by a common Tier-1 gateway. Typically, the Kubernetes guest cluster node performs source NAT for traffic exiting the node. However, there is also a routable pod topology, in which each Kubernetes node has a PodCIDR (Pod Classless Inter-Domain Routing) property and the Pod's IP address is allocated from the PodCIDR. The route for the Pod CIDR is automatically updated to Tier-1. Additionally, there is access via Service (LB). In this case, a load balancer implemented in the supervisor cluster connects to a node's port, and the node port performs destination NAT to change the data message's destination IP address to the pod's IP address.

A Kubernetes cluster in some embodiments can be deployed on various IaaS platforms. The IaaS network is responsible for traffic between Kubernetes clusters and VMs in a non-Kubernetes cluster. The traffic between sites may involve IaaS-specific virtual private network (VPN). An SNAT operation is applied by the IaaS network in these embodiments. It is the responsibility of an administrator to ensure that source and destination IP addresses are routable. In some embodiments, a Kubernetes node is isolated from an administrator network, and adapters are deployed in a Kubernetes container cluster to connect to a non-Kubernetes cluster to report ingress and egress inventory (e.g., resource attributes). Considering the data scale and required realization latency, a reverse proxy design for Kubernetes VPCs to connect to non-Kubernetes VPCs in a secure way is used.

In some embodiments, Kubernetes resources can be of a namespace scope or a cluster scope. Namespace scope resources are defined under a namespace, such as Ingress, Gateway, and Service. Different namespace scope resources can have a same name, as long as they belong to different namespaces. Cluster scope resources are defined under no namespace isolation, and they belong directly to a cluster. In some embodiments, resources shared by all namespaces are cluster scope resources, such as node and IPPool resources. To match Kubernetes resources in one cluster or across multiple clusters, resource matching conditions are specified. To match resources across all namespaces and clusters, expressions for matching ingress and egress resources are used. To match cluster scope resources, or to match namespace scope resources across all namespaces, an expression for matching container clusters and an expression for matching ingress and egress resources are used. To match namespaces scope resources, an expression for matching container clusters, expressions for matching container projects, and expressions for matching namespaced scope ingress and egress resources are used.

Reported resource identifiers in some embodiments include Egress, IPPool, NodeIP, Ingress Gateway, and Service (LB, Node Port, Node Port Local). These resources can be represented as IP address ranges, concrete IP addresses, and a list of IP addresses and ports. A user can create groups of these resource identifiers and refer to the groups in defining network policies, such as security policy rules. In some embodiments, IP address ranges, IP addresses, and ports are changed or updated, and the updated resource identifiers need to be reported. For instance, when a node is added or deleted, when the Egress IP address is modified, when the IPPool range is modified, or when ports are added or deleted from a service, the updated resource identifiers are reported. After an update is received, group membership is also updated.

Figure 5:
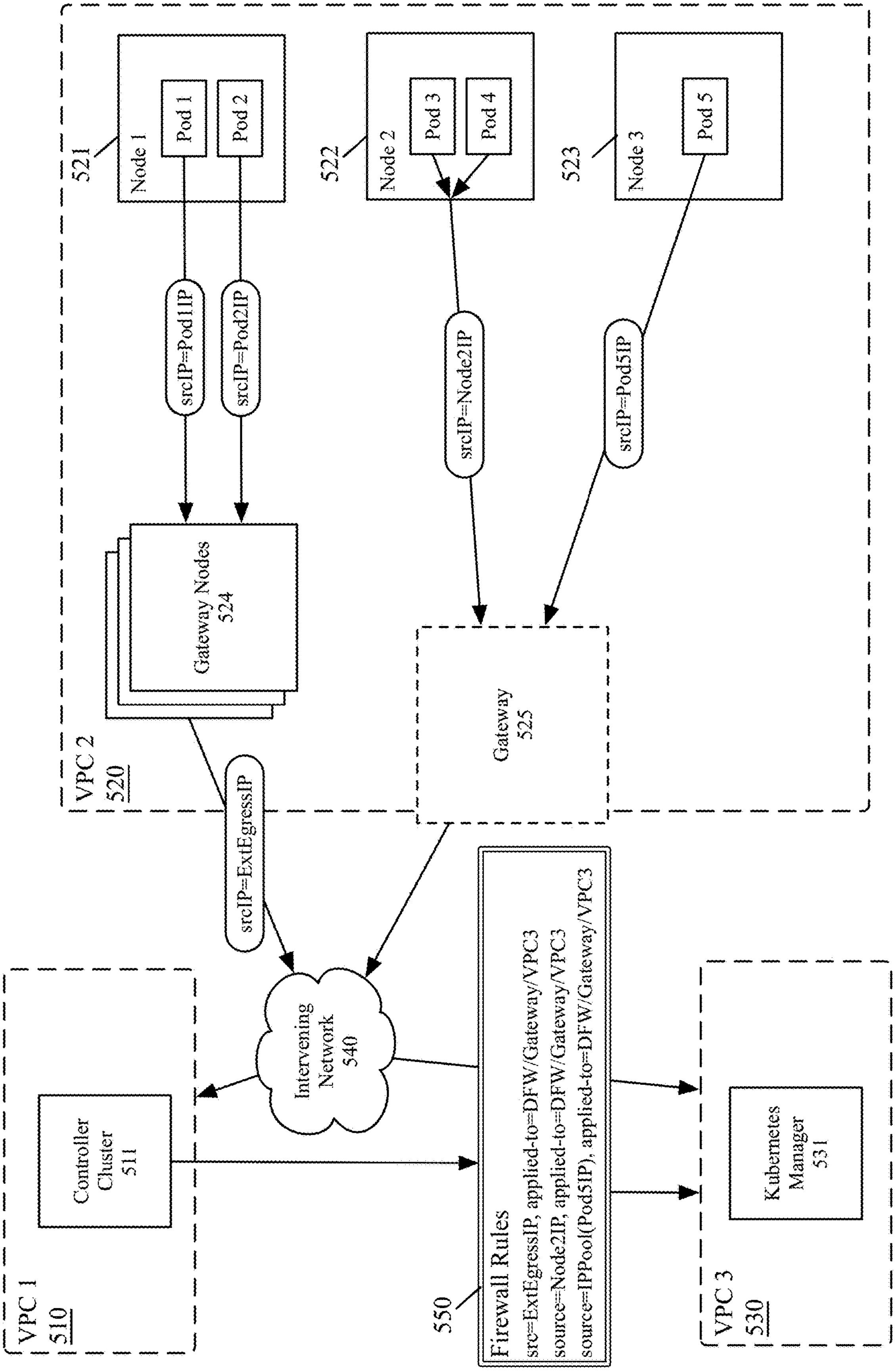
FIG. 5 illustrates discovered egress IP addresses of Kubernetes-cluster resources that are used in defining middlebox service rules in a non-Kubernetes environment to enforce at a different Kubernetes cluster.

FIG. 5 illustrates service rules that are defined at a first VPC 510 and implemented on traffic sent from a Kubernetes second VPC 520 configured by a Kubernetes manager (not shown) to a Kubernetes third VPC 530 managed by a different Kubernetes manager 531, traversing an intervening network fabric 540 (e.g., an IaaS network). In this example, the second VPC 520 includes three nodes 521-523 hosting one or more pods each, a set of gateway nodes 524, and a gateway 525 for nodes 522 and 523 to communicate with the third VPC 530. In some embodiments, the gateway 525 is a separate gateway node from the gateway nodes 524. In other embodiments, the gateway 525 is a gateway node of the gateway nodes 524, such that all traffic from all nodes 521-523 are sent through the gateway nodes 524. A Kubernetes cluster, such as VPCs 520 or 530, may include any number of nodes, any number of pods on each of the nodes, and any number of gateways.

Similarly to FIG. 3, the first node 521 illustrates pod IP address to Egress IP address SNAT performed at the gateway nodes 524, the second node 522 illustrates node IP address SNAT performed at the node 522, and the third node 523 illustrates an IP address allocated to the pod from an IP pool. These three types of source network addresses for data messages specify different levels of network addresses that are used in specifying firewall rules 550 at the controller cluster 511 in the first VPC 510. These firewall rules 550 are distributed from the controller cluster 511 in the first VPC 510 to the third VPC 530 for enforcement. Because the VPCs 520 and 530 are both Kubernetes container clusters, the service rules of some embodiments are enforced at the destination cluster, which, in this case, is the third VPC 530. Further information regarding enforcement of network policies at a Kubernetes cluster will be described below. This example specifically illustrates firewall rules defined and applied at the first VPC 510 on data messages exchanged between the second VPC 520 and the third VPC 530. However, any type of network policies or middlebox service rules may be defined at the first VPC 510 to apply at the third VPC 530 on data messages exchanged with the second VPC 520. Further information regarding enforcement of network policies at a Kubernetes cluster will be described below.

Figure 6:
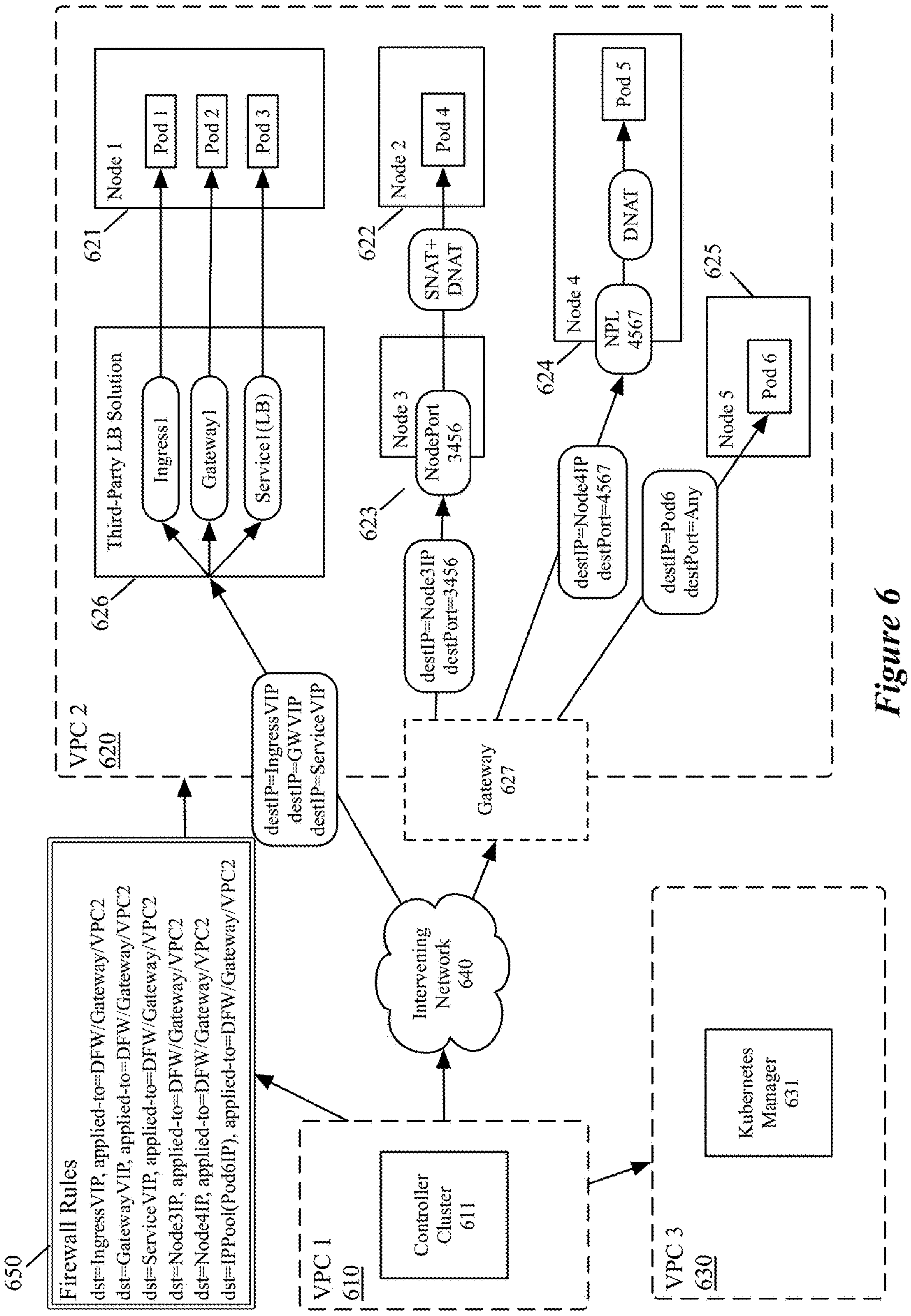
FIG. 6 illustrates discovered ingress IP addresses of Kubernetes-cluster resources that are used in defining middlebox service rules in a non-Kubernetes environment to enforce at the Kubernetes cluster.

FIG. 6 illustrates service rules that are defined at a first VPC 610 configured by a controller cluster 611 and implemented on traffic sent to a Kubernetes second VPC 620 configured by a Kubernetes manager (not shown) from a Kubernetes third VPC 630 managed by a different Kubernetes manager 631, traversing an intervening network 640 (e.g., an IaaS network). The first VPC 610 may include a logical network. In this example, the second VPC 620 includes five nodes 621-625 hosting one or more pods each, and third party load balancing solution 626, and a gateway 627.

Like the VPC 420 of FIG. 4, data messages with a destination IP address specifying the ingress VIP address are sent to Ingress1 of the third-party load balancing solution, data messages with a destination IP address specifying the gateway VIP address are sent to Gateway1, and data messages with a destination IP address specifying the service VIP address are sent to Service1 (LB).

For data messages with a destination IP address specifying the third node 623 but destined for the second node 622, they are received at the gateway 627, and then received at the third node 623, which performs SNAT and DNAT and forwards the data messages to the destination pod on the destination node 622. For data messages with a destination IP address specifying the fourth node 624, they are received at gateway 627, and then at the fourth node 624, which performs the DNAT operation itself to forward the data message to the pod. For data messages specifying a pod IP address allocated to the pod on the fifth node 625, they are received directly at the destination pod from the gateway 627. These four example types of destination network addresses for data messages entering the second VPC 620 are used in specifying firewall rules 650, or may be used in specifying any type of network policies. Service policies are defined at the controller cluster 611 in the first VPC 610, and are then distributed to the third VPC 630 to define and enforce the firewall rules.

Since the third VPC 630 is also a Kubernetes cluster, the firewall rules 650 are implemented at the destination cluster, which, in this case is the third VPC 630. The third VPC 630 may enforce these firewall rules at service nodes, gateway nodes, or destination nodes of the VPC 630. In some embodiments, a gateway node is the gateway for Pod egress traffic of the VPC 630, and a service node is the node hosting the load balancing service of the VPC 630. All nodes of the VPC 630 may be gateway nodes and service nodes, however, in other embodiments, a subset of nodes are selected as gateway nodes and service nodes of the VPC 630. In some embodiments, the gateway and service nodes are not managed by the Kubernetes manager 631, but are instead managed by an infrastructure provider. For instance, when a Kubernetes cluster is deployed in a public cloud VPC (such as Amazon Web Service (AWS) VPC), pods are assigned private IP addresses, the gateway of the VPC's gateway, and a load balancing service is provided by Elastic Load Balancing (ELB), provided by AWS. When the Kubernetes cluster is deployed on-premises in NSX licensed by VMware, Inc., pods are assigned a logical switch port, the gateway is a tier-0 or tier-1 gateway, and the load balancing service is provided by NSX.

In some embodiments, Kubernetes clusters are deployed using on-premises platforms, and there is a VPC for each supervisor cluster namespace. A customer can define subnet, ingress and egress IP pools, NAT operations, and route tables for each VPC. Each guest cluster allocates subnets from a VPC subnet. Guest cluster nodes from different guest clusters in the same VPC are routable. If data messages exit a VPC's Tier-1 gateway, depending on whether the subnet is private, public, or external, an SNAT operation is applied at the tier-1 gateway or at a virtual interface, or no SNAT operation is performed. Alternatively, in a public cloud topology, a Tier-0 gateway connects to the Internet. If two Kubernetes clusters are in the same VPC, they can connect to each other via a private subnet. A load balancer service in a Kubernetes cluster can be assigned a private IP address, and Kubernetes clusters in the same VPC can connect to it.

VPCs of the same tenant in some embodiments are interconnected via a virtual interface or a gateway. VPCs of different tenants are interconnected via physical routes between virtual interfaces or gateways. VPCs in different sites are interconnected via a transit gateway and a virtual private network. In some embodiments, all Kubernetes clusters report network element attributes (e.g., network element IP addresses) to a non-Kubernetes VPC, and an administrator of the non-Kubernetes VPC defines generic groups with criteria for matching the resource identifiers. The administrator defines a copy-span policy referring to those groups as rule sources or destinations. Then, the administrator applies the copy-span policy to one or more of the Kubernetes clusters, and a policy API sends configurations to a central control plane (CCP) of the non-Kubernetes VPC. The CCP receives Kubernetes resource identifiers, and computes effective IP addresses from criteria matching ingress and egress resources. The CCP then distributes sections, rules, and computed IP addresses to the Kubernetes clusters.

Figure 7:
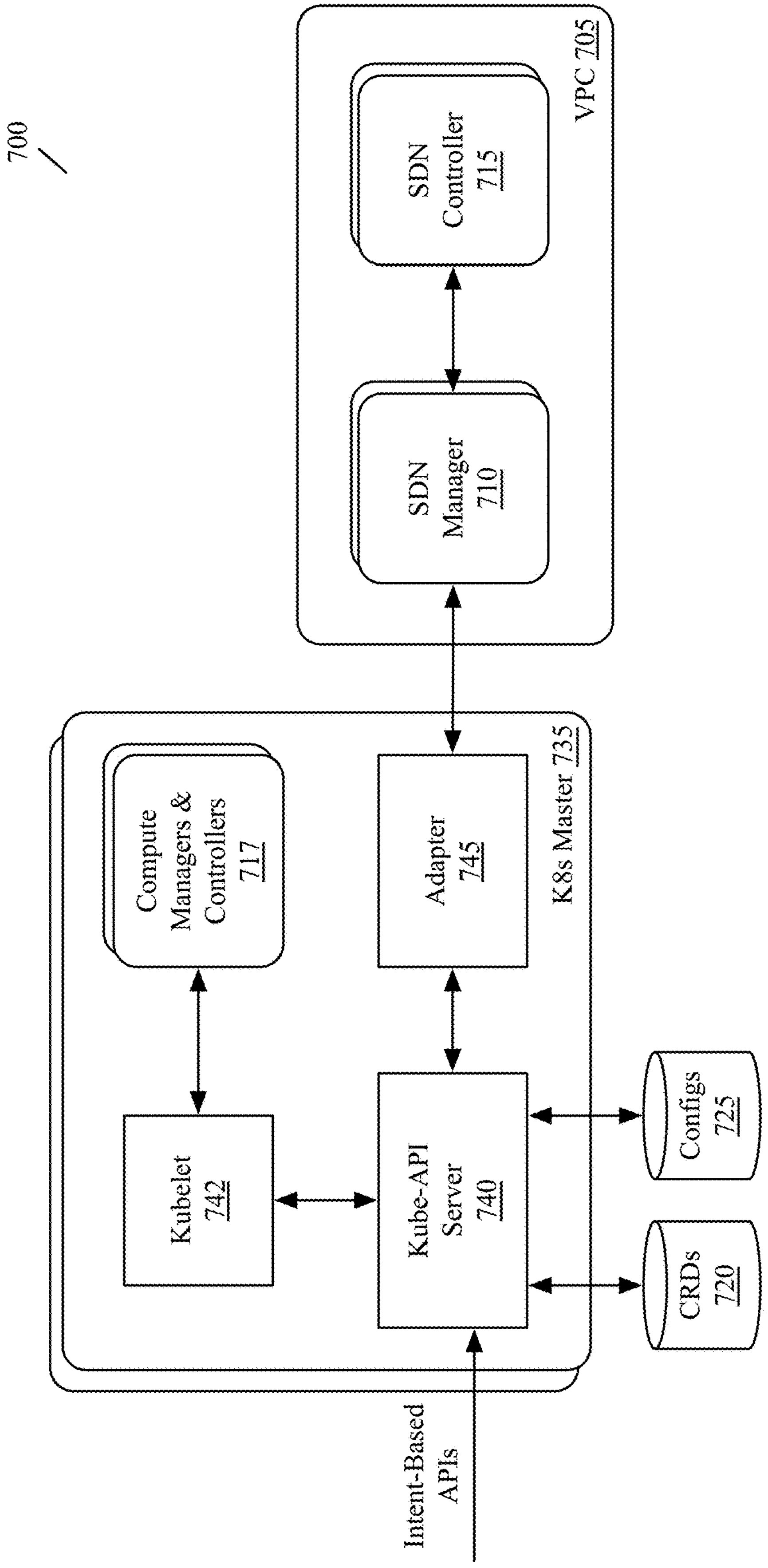
FIG. 7 illustrates an example of a control system of some embodiments of the invention that defines network policies.

In some embodiments, the source and destination network addresses for a Kubernetes cluster are discovered using IP discovery and used to specify network policies, such as middlebox service rules. In order to specify these network policies for a Kubernetes cluster, a non-Kubernetes controller cluster of an SDN receives resource identifiers associated with resources in the Kubernetes cluster and specifies the network policies. FIG. 7 illustrates an example of a control system 700 of some embodiments of the invention that processes APIs that use the Kubernetes-based declarative model to define network policies. To process the APIs, the control system 700 uses one or more CRDs to define some of the resources referenced in the APIs. The system 700 performs automated processes to deploy a logical network that connects the deployed machines and segregates these machines from other machines in the datacenter set. The machines are connected to the deployed logical network of a VPC in some embodiments.

As shown, the control system 700 includes one or more master nodes 735 for API processing, an SDN manager cluster 710, and an SDN controller cluster 715. Each of the master nodes 735 includes an API processing server 740, a Kubelet 742 node agent, compute managers and controllers 717, and an adapter 745. The API processing server 740 receives intent-based API calls and parses these calls. In some embodiments, the received API calls are in a declarative, hierarchical Kubernetes format, and may contain multiple different requests.

The API processing server 740 parses each received intent-based API request into one or more individual requests. When the requests relate to the deployment of machines, the API server provides these requests directly to compute managers and controllers 717, or indirectly provide these requests to the compute managers and controllers 717 through the Kubelet 742 and/or the adapter 745 running on the Kubernetes master node 735. The compute managers and controllers 717 then deploy VMs and/or sets of containers on host computers in the availability zone.

The kubelet 742 node agent on a node can register the node with the API server 740 using one of: the hostname; a flag to override the hostname; or specific logic for a cloud provider. The kubelet 742 receives sets of containerspecs, YAML (a data serialization language) or JavaScript Object Notation (JSON) formatted objects that each describes a pod. The kubelet 742 uses sets of containerspecs to create (e.g., using the compute managers and controllers 717) the sets of containers that are provided by various mechanism elements (e.g., from the API server 740) and ensures that the containers described in those sets of containerspecs are running and healthy. The API calls can also include requests that require network elements to be deployed. In some embodiments, these requests explicitly identify the network elements to deploy, while in other embodiments the requests can also implicitly identify these network elements by requesting the deployment of compute constructs (e.g., compute clusters, containers, etc.) for which network elements have to be defined by default.

In some embodiments, the API calls refer to extended resources that are not defined per se by the baseline Kubernetes system. For these references, the API processing server 740 uses one or more CRDs 720 to interpret the references in the API calls to the extended resources. The CRDs in some embodiments define extensions to the Kubernetes networking requirements. In some embodiments, the CRDs can include network-attachment-definitions (NDs), Virtual Network Interfaces (VIF) CRDs, Virtual Network CRDs, Endpoint Group CRDs, security CRDs, Virtual Service Object (VSO) CRDs, and Load Balancer CRDs. In some embodiments, the CRDs are provided to the API processing server 740 in one stream with the API calls.

Adapter 745 is the interface between the API server 740 and the SDN manager cluster 710 that manages the network elements that serve as the forwarding elements (e.g., switches, routers, bridges, etc.) and service elements (e.g., firewalls, load balancers, etc.) in an availability zone. The SDN manager 710 and SDN controller cluster 715 operate in a VPC 705. The SDN manager cluster 710 directs the SDN controller cluster 715 to configure the network elements to implement the desired forwarding elements and/or service elements (e.g., logical forwarding elements and logical service elements) of one or more logical networks. The SDN controller cluster 715 interacts with local controllers on host computers and edge gateways to configure the network elements in some embodiments. In some embodiments, adapter 745 registers for event notifications with the API server 740, e.g., sets up a long-pull session with the API server to receive all CRUD (Create, Read, Update and Delete) events for various CRDs that are defined for networking. In some embodiments, the API server 740 is a Kubernetes master VM, and the adapter 745 runs in this VM as a Pod. In some embodiments, the adapter 745 communicates directly with the API server 740 and/or through the Kubelet 742.

In some embodiments, adapter 745 receives resource identifiers (also referred to as inventory objects) from the API server 740 that were specified in the APIs. The adapter 745 forwards the resource identifiers to the SDN manager cluster 710 for the SDN controller cluster 715 to define network policies based on the resource identifiers. In some embodiments, rather than directing the manager cluster 710 to have the SDN controller cluster 715 define network policies, the adapter 745 in some embodiments communicates directly with the SDN controller cluster 715 to direct the controller cluster 715 to define the network policies.

The API server 740 provides the CRDs 720 that have been defined for network elements to the adapter 745 for it to process the APIs that refer to the corresponding network elements. The API server 740 also provides configuration data from the configuration storage 725 to the adapter 745. The configuration data in some embodiments include parameters that adjust pre-defined template rules that the adapter 745 follows to perform its automated processes. In some embodiments, the configuration data includes a configuration map. The configuration map of some embodiments may be generated from one or more directories, files, or literal values. In some embodiments, the configuration map is generated from files in the configuration storage 725, from data received by the API server from the adapter, and/or from data generated by the SDN manager 710. The configuration map in some embodiments includes identifiers of pre-created network segments of the logical network.

The adapter 745 performs these automated processes to execute the received API requests in order to direct the SDN controller cluster 715 to specify network policies for the VPC. For a received API, the control system 700 performs one or more automated processes to identify resource identifiers (e.g., network addresses) and define one or more network policies (e.g., middlebox service policies) to be enforced for the resources in the VPC. The control system performs these automated processes without an administrator performing any action to direct the identification of resource identifiers and definition of network policies after an API request is received.

The SDN managers 710 and controllers 715 can be any SDN managers and controllers available today. In some embodiments, these managers and controllers are the NSX-T managers and controllers licensed by VMware, Inc. The communication between the adapter 745 and NSX-T manager and controller 710 and 715 is asynchronous, in which the adapter provides the desired resource identifiers to NSX-T managers, which then relay the desired resource identifiers to the NSX-T controllers to compute and distribute the network policies asynchronously to the host computer, forwarding elements, and service nodes in the availability zone (i.e., to the SDDC set controlled by the controllers 715). After receiving the resource identifiers from the adapter 745, the SDN managers 710 in some embodiments direct the SDN controllers 715 to define network policies for the network elements. In some embodiments, the SDN controllers serve as the central control plane (CCP) of the control system 700.

Figure 8:
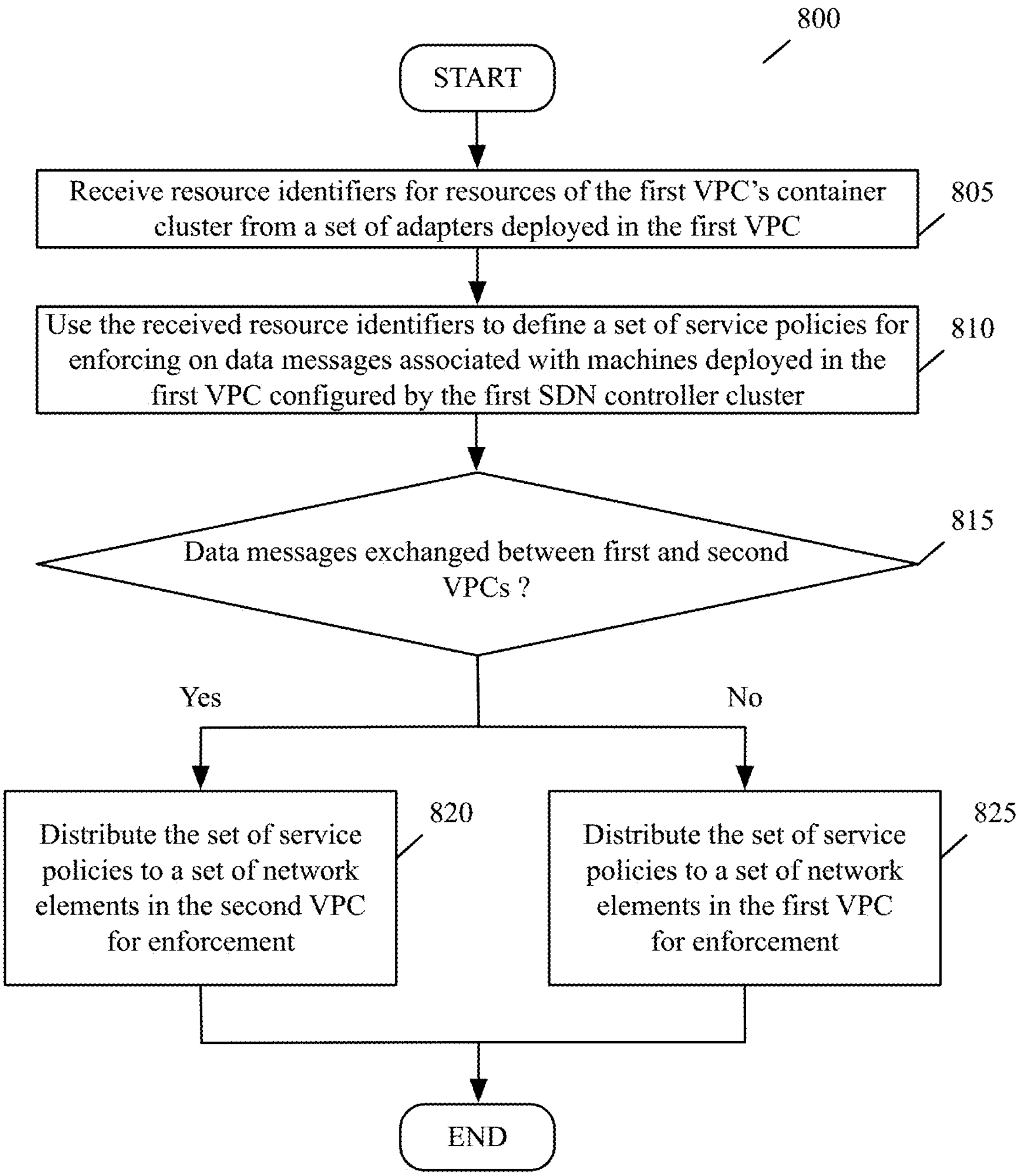
FIG. 8 conceptually illustrates a process of some embodiments for defining network policies for a container cluster at an SDN controller that does not configure the container cluster.

FIG. 8 conceptually illustrates a process 800 of some embodiments for defining policies for a container cluster in a first VPC that is configured by a first SDN controller cluster. This process 800 may performed by a second SDN controller cluster for defining service policies that are not defined by the first SDN controller cluster and residing in a second VPC. The second SDN controller in some embodiments configures VMs in the second VPC, and may also configure containers in the second VPC or may configure VMs of a logical network.

The process 800 begins by receiving (at 805) resource identifiers for resources of the first VPC's container cluster from a set of one or more adapters deployed in the first VPC for the second SDN controller cluster. The resource identifiers in some embodiments are network addresses (e.g., internet protocol (IP)) addresses of the resources in the first VPC. For example, a resource identifier of a gateway node is the IP address of the gateway. In another example, a resource identifier may identify one network node that hosts multiple pods, such that the resource identifier for all pods on that network node is the network address of the network node. In the example of FIG. 3, the external IP address allocated to the Egress CRD, the node IP address, and the pod IP address allocated from an IP address pool are resource identifiers that are received by the second SDN controller cluster. In the example of FIG. 4, the destination Ingress, Gateway, and Service VIP address, along with the node IP addresses and the pod IP address allocated from an IP address pool are resource identifiers received by the second SDN controller. In some embodiments, the second SDN controller also receives resource identifiers that are the actual IP address of the individual pods in the first VPC's container cluster. However, if the first VPC's container cluster includes a large number of pods (e.g., thousands of pods) this may not be efficient, and node IP addresses, Egress CRD IP addresses, and destination service IP addresses may be more optimal for defining service policies.

The second SDN controller cluster receives the resource identifiers from a set of adapters that is deployed in the first VPC for the second SDN controller cluster. The set of adapters acts as the agent of the second SDN controller cluster control plane in a remote site, and it allows the second SDN controller cluster to extend its control plane to other sites or clusters. The set of adapters retrieve the resource identifiers for the resources in the container cluster to provide to the second SDN controller cluster. Further information regarding the set of adapters will be described below.

Next, the process 800 uses (at 810) the received resource identifiers to define a set of service policies for enforcing on data messages associated with machines deployed in the first VPC configured by the first SDN controller cluster. In some embodiments, the service policies are network policies, while in other embodiments, the service policies are middlebox service policies, such as firewall policies. After receiving the first VPC's resource identifiers, the second SDN controller cluster uses them to define service policies that are to be enforced on data messages associated with machines deployed in the first VPC. In some embodiments, these data messages are exchanged between the first VPC and the second VPC. In such embodiments, the second SDN controller also uses resource identifiers for resources in its own VPC. These resource identifiers in some embodiments are collected by the second SDN controller cluster from a local storage storing the resource identifiers. The local storage may be updated and maintained by the second SDN controller cluster. The second VPC's resource identifiers may instead be received at the second SDN controller cluster by another controller cluster operating in the second VPC that does not configure the second VPC and that updates and maintains the local storage. This other controller cluster may keep up-to-date resource identifiers for all resources in the second VPC, such as VMs, containers, gateways, etc.

In other embodiments, the data messages on which the service policies are to be enforced are exchanged between the first VPC and a third VPC configured by a third SDN controller cluster. In such embodiments, the second SDN controller cluster also receives resource identifiers for resources of a container cluster in the third VPC from a second set of adapters deployed in the third VPC for the second SDN controller cluster, and uses these resource identifiers along with the first VPC's resource identifiers to define the service policies. For example, for defining firewall policies, the second SDN controller cluster receives and uses resource IP addresses from the first and third VPCs to define firewall policies for data messages exchanged between the first and third VPCs' resources.

After defining the service policies, the process 800 determines (at 815) whether the service policies are defined for data messages exchanged between the first and second VPCs. As discussed previously, the second SDN controller cluster is able to define service policies for data messages associated with its VPC and another VPC, or for data messages associated with two other VPCs and not its own VPC. Because of this, the service policies are to be enforced at different VPCs depending on these two scenarios. The second SDN controller cluster can determine this by looking to which VPC's resource identifiers are used along with the first VPC's resource identifiers: the second VPC (i.e., its own VPC), or another third VPC.

If the process 800 determines that the service policies defined for data messages between the first and second VPCs, the process distributes (at 820) the set of service policies to a set of network elements in the second VPC to enforce the set of service policies on data messages associated with machines deployed in the first VPC and machines deployed in the second VPC. This set of network elements in some embodiments is a set of middlebox service engines that enforces the service policies. In other embodiments, the set of network elements is a set of VMs, gateways, or a combination thereof that enforce the service policies. In some embodiments, the second SDN controller cluster uses the set of service policies to define a set of service rules, and distributes the set of service rules instead of the service policies, for the set of network elements to enforce the service rules. As discussed previously, the second VPC may include another SDN controller cluster that does not configure the second VPC. The second SDN controller may also distribute the set of service policies to this SDN controller cluster, which defines the set of service rules and distributes them to the set of network elements.

If the process 800 determines that the service policies are not defined for data messages exchanged between the first and second VPCs (and therefore are defined for data messages exchanged between the first VPC and a third VPC), the process distributes (at 825) the set of network elements in the first VPC to enforce the set of service policies on data messages associated with machines deployed in the first VPC and machines deployed in the third VPC. The second SDN controller cluster provides the set of service policies to the set of adapters deployed in the first VPC, and the set of adapters, along with another fourth controller and a set of agents, define the set of service rules and distribute them to enforce at network nodes in the first VPC. Further information regarding the set of adapters, the fourth controller, and the set of agents will be described in detail below. Once the service policies have been defined and enforced, the process 800 ends.

While process 800 is described with regard to different VPCs configured by SDN controller clusters, some embodiments may be implemented for different container clusters. For instance, different sets of network elements for different container clusters may be managed by different SDN controller clusters, and a particular SDN controller cluster managing a particular set of network elements may define network policies for several container clusters. In such embodiments, process 800 conceptually illustrates a process for defining policies for a container cluster that is configured by a first SDN controller cluster. A second SDN controller cluster for defining service policies that are not defined by the first SDN controller cluster receives, from a set of one or more adapters deployed in the container cluster for the second SDN controller cluster, resource identifiers for several resources of the container cluster. The second SDN controller cluster uses the resource identifiers to define a set of service policies. Then, the second SDN controller cluster distributes the set of service policies to a set of network elements to enforce the set of service policies on data messages associated with machines deployed in the container cluster configured by the first SDN controller cluster.

Figure 9:
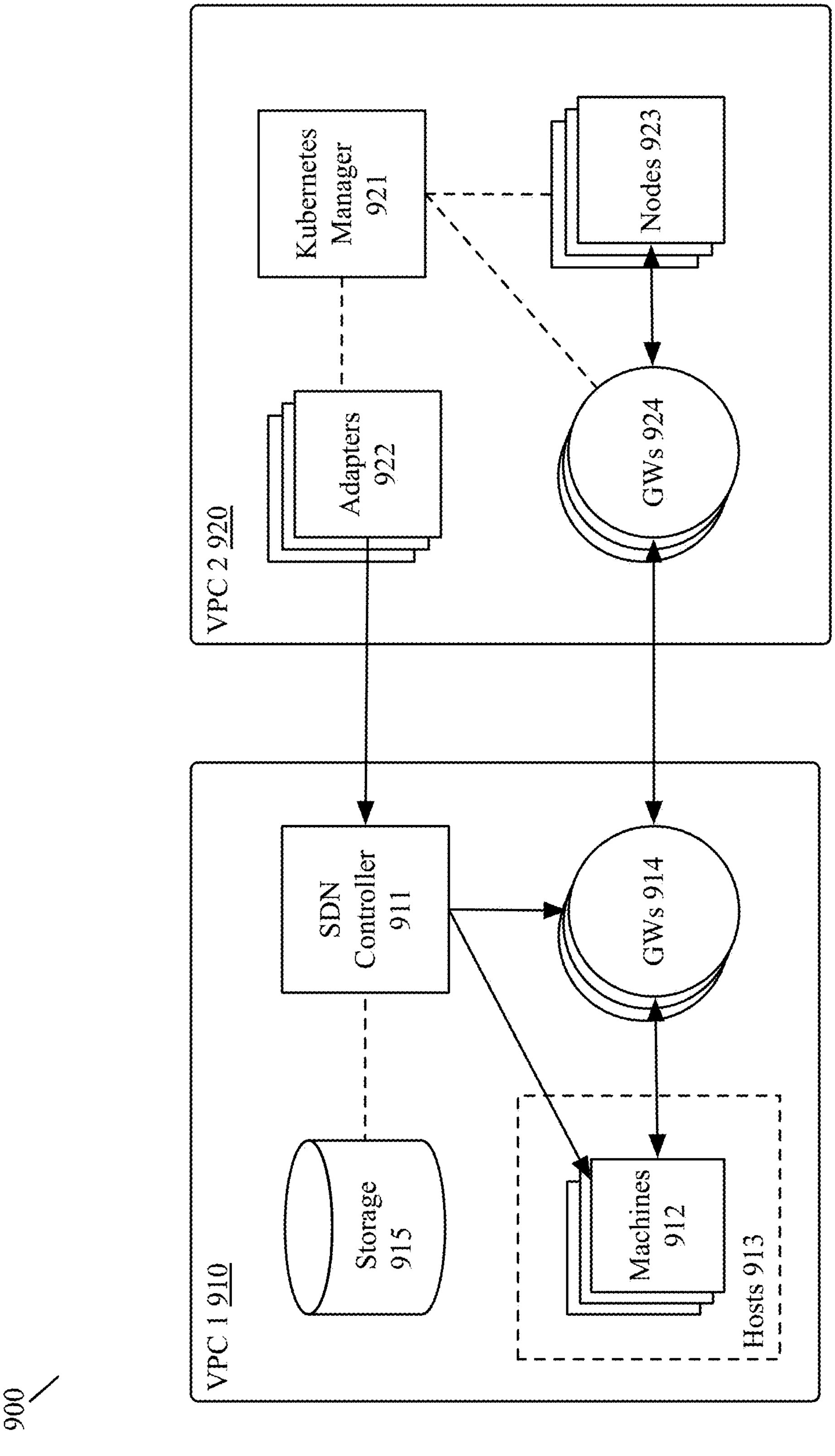
FIG. 9 illustrates an example of a system of some embodiments for defining and enforcing service policies on data messages exchanged between two VPCs.

As discussed previously, an SDN controller in a particular VPC may define service policies that are to be enforced on data messages exchanged between its VPC and another VPC. FIG. 9 illustrates this example system 900 for defining and enforcing service policies on data messages exchanged between two VPCs 910 and 920. In this example, the first VPC 910 includes an SDN controller cluster 911 that configures the VPC 910, one or more machines 912 that execute on one or more host computers 913, one or more gateways 914, and a data storage 915. The machines 912 may be VMs, containers, pods, etc. that execute on the host computers 913. The SDN controller cluster 911 configures the VPC 910, may configure a logical network, and defines network policies for the second VPC 920. This SDN controller 911 is a network virtualization controller.

The second VPC 920 is managed by a Kubernetes manager 921, and includes a set of one or more adapters 922 for communicating with the SDN controller cluster 911 of the first VPC 910. The second VPC 920 also includes a cluster of nodes 913 and gateways 924 configured by the Kubernetes manager 921, but does not have a controller cluster for defining service policies for data messages exchanged with the second VPC 910. In some embodiments, these service policies that cannot be defined at the second VPC 920 include service policies for data messages exchanged between the machines 923 and other machines in other VPCs. In other embodiments, the service policies that cannot be defined at the second VPC 920 also include service policies for data messages exchanged within the second VPC 920. Still, in other embodiments, the service policies that cannot be defined at the second VPC 920 include some middlebox service policies, while other middlebox service policies can be defined at the second VPC 920. The nodes 923 and gateways 924 include pods executing on nodes, gateway nodes, service nodes (e.g., load balancers), etc. that are the sources, destinations, and intermediate nodes of this VPC 920. The network attributes of these network elements 923 and 924 (e.g., resource identifiers, such as IP addresses) are sent from the set of adapters 912 to the first VPC 910's SDN controller cluster 911.

The SDN controller 911 receives network attributes of the second VPC 920's nodes 923 and gateways 924 from the set of adapters 922. The SDN controller 911 also retrieves in some embodiments network attributes of the machines 912, host computers 913, and gateways 914 from the storage 915 that is maintained by the SDN controller 911. In some embodiments, the first VPC 910 includes another SDN controller (not shown) that does not configure the first VPC 910 and that maintains and updates the storage 915, and may in some embodiments provide the SDN controller 911 with the network attributes of the first VPC 910. Using the network attributes of both VPCs 910 and 920, the SDN controller 911 defines network policies, such as service policies, for enforcement at the first VPC 910.

In some embodiments, the SDN controller 911 uses the defined policies to define a set of rules to enforce on data messages exchanged between the nodes 923 and the machines 912 and gateways 914, and provides the rules to the machines 912 and gateways 914 for them to enforce. In other embodiments, the SDN controller 911 provides the policies to the other SDN controller operating in the first VPC 910 for that SDN controller to define the set of rules and distribute them to the machines 912 and gateways 914 for enforcement. For all data messages exchanged between the two VPCs 910 and 920, the defined policies and rules are enforced at the non-Kubernetes, first VPC 910. In some embodiments, the defined service rules are enforced only at the gateways 914, which are referred to as edge rules because the rules are enforced at the edge of the VPC 910. In other embodiments, the defined service rules are enforced in a distributed manner across multiple machines 912 on multiple host computers 913, which are referred to as distributed rules.

Figure 10:
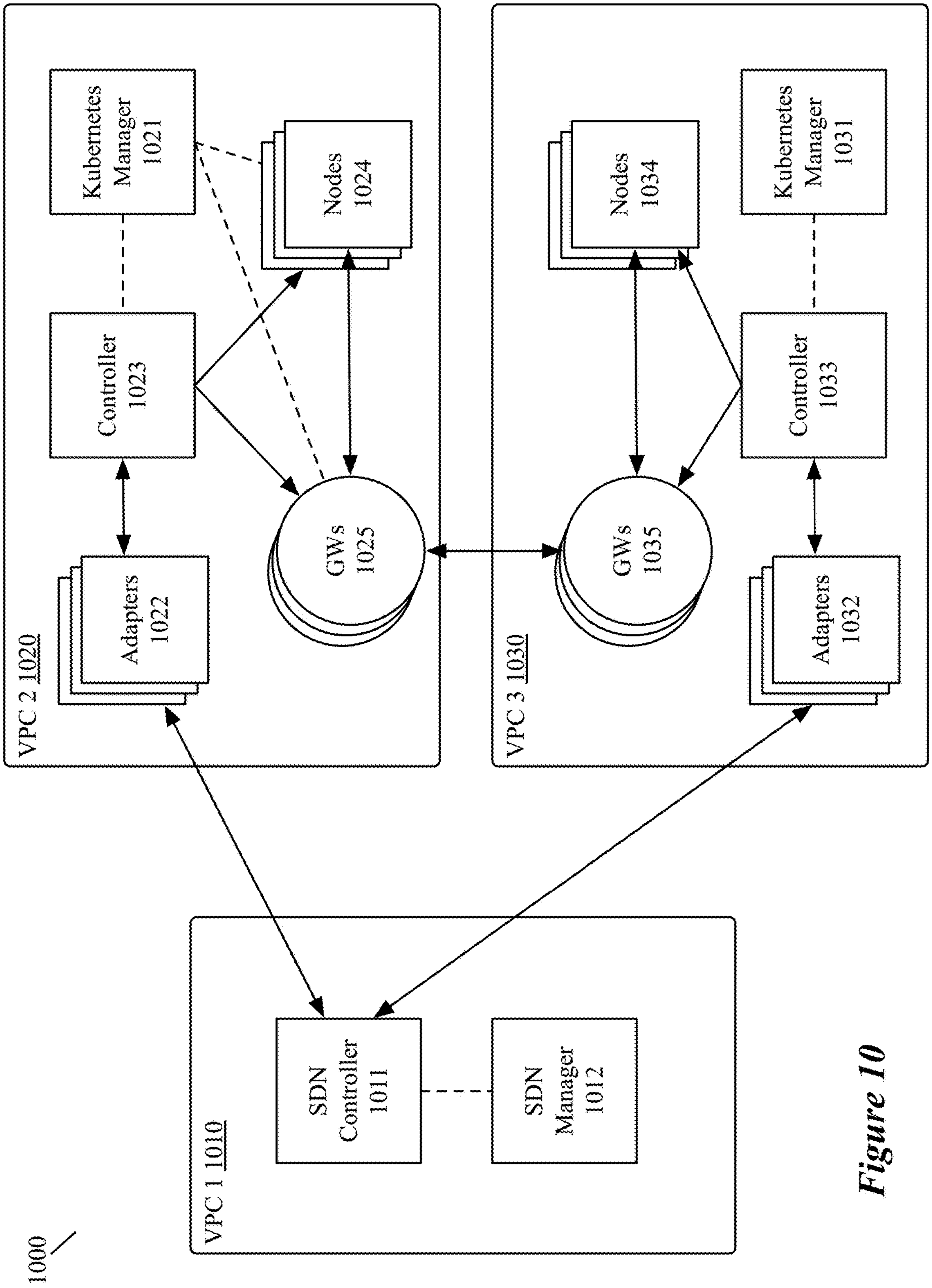
FIG. 10 illustrates an example of a system of some embodiments for defining service policies at a first VPC to implement second and third VPCs.

FIG. 10 illustrates another example system 1000 for defining service policies at a first VP 1010 to enforce on data messages exchanged between second and third VPCs 1020 and 1030. In this example, the first VPC 1010 includes an SDN controller cluster 1011 that configures the VPC 1010, and an SDN manager 1012 that directs the configuration of the VPC 1010. This VPC 1010 may also include machines, host computers, and gateways that form a logical network.

The second VPC 1020 is managed by a Kubernetes manager 1021, and includes a set of one or more adapters 1022 for communicating with the first VPC 1010. The second VPC 1020 also includes a controller 1023 for distributing network policies among the nodes 1024 and gateways 1025 of the second VPC 1020. The second VPC 1020 does not have, however, a controller cluster for defining service policies for data messages exchanged between the second VPC 1020 and the third VPC 1030. The nodes 1024 and gateways 1025 include pods executing on nodes, gateway nodes, service nodes (e.g., load balancers), etc. that are the sources, destinations, and intermediate nodes of this VPC 1020. The network attributes of these network elements 1024 and 1025 (e.g., resource identifiers, such as IP addresses) are sent from the set of adapters 1022 to the first VPC 1010's SDN controller cluster 1011.

The third VPC 1030 includes a similar configuration to the second VPC 1020, including a Kubernetes manager 1031, a set of adapters 1032, a controller 1033, nodes 1034, and gateways 1035. The set of adapters 1032 send network attributes of the network elements 1034 and 1035 to the SDN controller cluster 1011.

The SDN controller 1011 receives network attributes of the second VPC 1020's nodes 1024 and gateways 1025 from the set of adapters 1022, and network attributes of the third VPC 1030's nodes 1034 and gateways 1035 from the set of adapters 1032. Using the network attributes of both VPCs 1020 and 1030, the SDN controller 1011 defines network policies, such as service policies, for enforcement at least one of the second and third VPCs 1020 and 1030. In some embodiments, the SDN controller 1011 distributes the defined policies to only the set of adapters 1022 of the second VPC 1020. In other embodiments, the SDN controller 1011 distributes the defined policies to only the set of adapters 1032 of the third VPC 1030. Still, in other embodiments, the SDN controller 1011 distributes the defined policies to both sets of adapters 1022 and 1032 of the VPCs 1020 and 1030. If policies are distributed to both VPCs 1020 and 1030, the SDN controller 1011 may distribute all defined service policies to both VPCs 1020 and 1030, or may instead distribute different subsets of the defined service policies to the different VPCs 1020 and 1030 based on which policies are to be enforced at each VPC.

Figure 11:
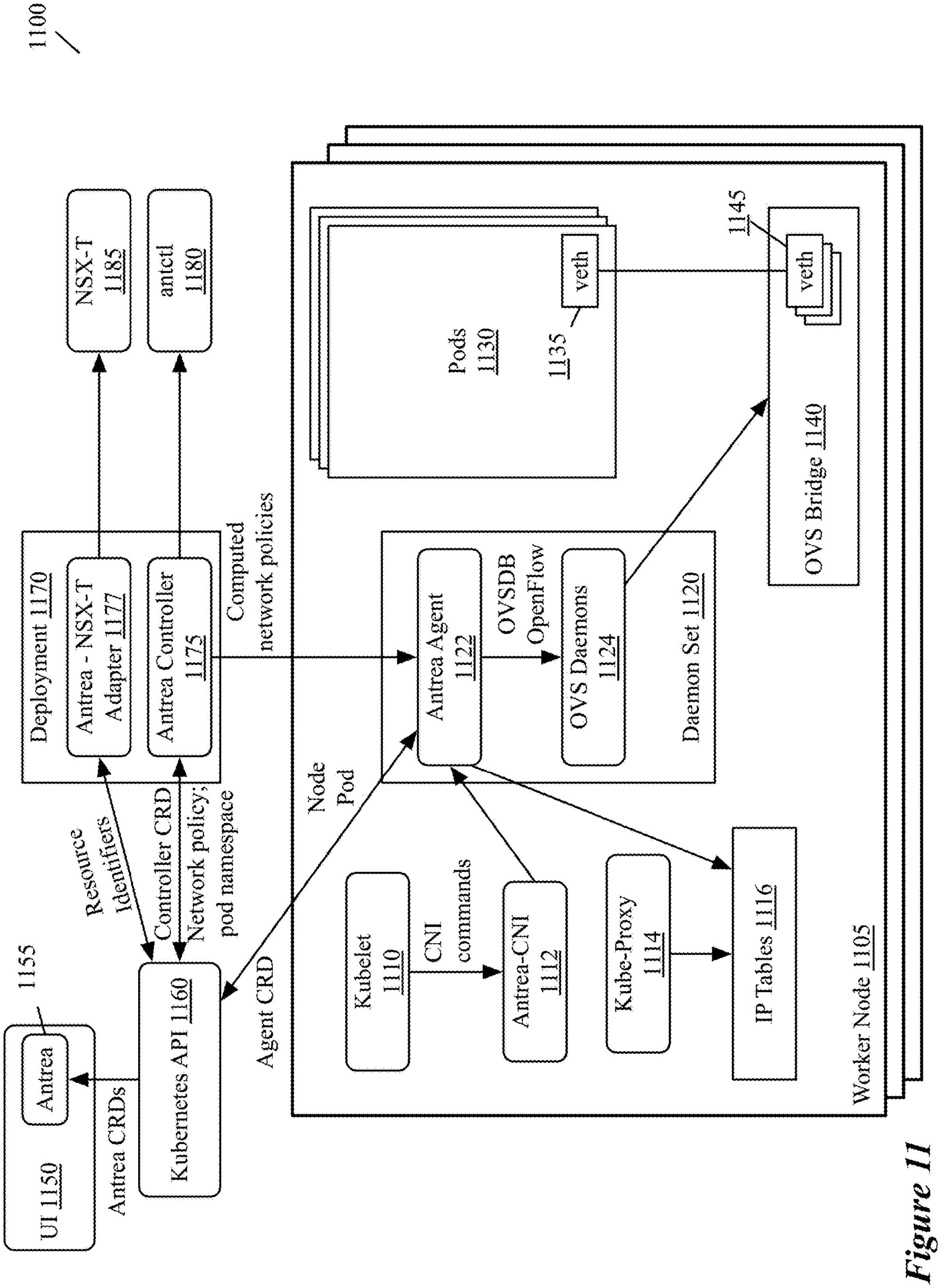
FIG. 11 illustrates an Antrea networking system solution of some embodiments.

As discussed previously, a cluster that does not include a controller cluster to define network policies instead includes a set of adapters for collecting resource identifiers and providing them to another VPC's SDN controller cluster to define network policies. FIG. 11 illustrates an Antrea networking solution of some embodiments. As a Kubernetes networking solution, Antrea implements the Container Network Interface (CNI), while Kubernetes NetworkPolicy operates at Layer 3/4 (L3/L4) to provide network connectivity and security services for a Kubernetes cluster (i.e., collection of nodes for running containerized applications), leveraging the benefit of programmable networks from Open vSwitch (OVS) to Kubernetes. OVS is a widely adopted high-performance programmable virtual switch, originating from VMware, Inc., that is designed to enable effective network automation through programmatic extensions. The Antrea network solution described herein leverages OVS in its architecture to efficiently implement pod networking and security features. This figure illustrates a specific implementation of the embodiments described for FIG. 9 and FIG. 10 in a specific environment for a commercially available product, known as the Antrea environment, for Kubernetes that works with NSX-T licensed by VMware, inc.

In some embodiments, because of the programmable OVS, forwarding functions are opened to programmatic extension and control. Based on this, a new flexible Antrea IPAM plugin overrides and extends the existing flow tables, which are managed by a new centralized CRD instead of a local store IP management state from the original host-local IPAM plugin. This centralized controller helps to provide the ability of multiple networks on pod and IPAM per-namespace, according to some embodiments. In some embodiments, in an L3 forwarding table, all traffic destined to a remote pod is forwarded through the appropriate tunnel, and for the return flow from a remote pod to a local node, a distinction must be drawn between the remote gateway and the local gateway, according to some embodiments.

As shown, the Antrea networking solution 1100 includes Kubernetes nodes 1105, a user interface (UI) 1150 with an Antrea plugin 1155, a Kubernetes API server 1160, a deployment 1170 that runs the Antrea controller 1175 and an Antrea-NSX-T adapter 1177, NSX-T manager and controller cluster 1185, and Antrea command-line tool 1180 (i.e., antctl 1180). In some embodiments, the UI 1150, Kubernetes API server 1160, deployment 1170, and Antrea command-line tool 1180 execute together as part of the control plane on a single master node. Also, in some embodiments, the NSX-T manager and controller cluster 1185 includes separate manager and controller clusters, such as the SDN manager cluster 710 and SDN controller cluster 715 described above.

To provide a more flexible IPAM (host-local IP address management) that is based on namespace isolation, the deployment 1170 runs the Antrea controller 1175, which is used along with corresponding CRDs (custom resource definitions) to manage all of the IP addresses for pods executing on nodes in the network. As a result, each pod subnet is associated with a respective namespace such that the IP of assigned to a pod is related to its business, in some embodiments. Additionally, pods located under the same namespace are in the same local area network (LAN), in some embodiments, while pods under different namespaces are isolated on different networks. In some embodiments, a static IP address assigned to a pod can be configured by the annotation filed for the corresponding configuration file. Users (e.g., administrators) could also monitor the IP usage from the Antrea command-line tool 1180 or the UI 1150 in order to expand the corresponding IP resource pool in a timely manner when IP resources are exhausted, according to some embodiments.

The deployment 1170 also runs the Antrea-NSX-T adapter 1177, as shown. In some embodiments, the Antrea-NSX-T adapter 1177 receives parsed API requests regarding resource identifiers for resources on the worker nodes 1105 (i.e., for defining network policies) from the API server 1160, and generates API calls to direct the NSX-T manager and controller cluster 1185 to define the network policies, according to some embodiments. The deployment 1170 of some embodiments includes only one adaptor 1177. However, in other embodiments, the deployment 1170 includes a set of multiple adapters 1177, which may reside on one master node of the VPC, or may reside in a distributed manner across multiple nodes in the VPC.

The UI 1150 is used to manage Kubernetes clusters by translating human-readable commands into API calls that can be understood by the Kubernetes API server 1160. In some embodiments, the UI 1150 is a VMware Octant UI, and presents its output in a graphical user interface (GUI) for viewing by a user (e.g., administrator). The UI 1150 runs locally on the user's workstation, according to some embodiments, and as a result, does not use up resources of the node or nodes that it manages. The UI 1150 includes Antrea plugin 1155 for receiving Antrea CRDs from the Kubernetes API server 1160.

The Antrea controller 1175 additionally monitors network policy, pod, and namespace resources with the Kubernetes API 1160. In some embodiments, the Antrea controller 1175 uses information associated with these resources to compute policy rules, which can be translated to Open vSwitch (OVS) flows, efficiently and disseminated to a targeted Antrea agent (e.g., Antrea agent 1122) that runs on a node along with one or more affected pods. In other embodiments, the resources are forwarded to the NSX-T manager and controller cluster 1185 for computation of the network policies. Still, in other embodiments, both the Antrea controller 1175 and the NSX-T manager and controller cluster 1185 compute policy rules for translation to OVS flows for the Antrea agents 1122. The Kubernetes API server 1160 enables different components of the Kubernetes cluster (i.e., a master node and set of one or more worker nodes) to communicate with each other and with components external to the cluster, according to some embodiments. Additionally, in some embodiments, the API server 1160 enables users to query and alter the states of API objects, such as pods, namespaces, configuration maps, and events.

Each of the worker nodes 1105 includes a kubelet 1110, Antrea-CNI (container network interface) 1112, Kube-proxy 1114, IP tables 1116, daemon set 1120, one or more pods 1130, and an OVS bridge 1140. The kubelet 1110, in some embodiments, is responsible for registering the node 1105 with the API server 1160. Additionally, the kubelet 1110 ensures that containers defined in pod specifications received from the API server 1160 are both running and healthy. In some embodiments, instead of receiving the pod specifications from the API server 1160, the kubelet 1110 receives the pod specifications from an HTTP endpoint (not shown) or an HTTP server (not shown).

The daemon set 1120 includes two containers to run the Antrea agent 1122 and the OVS daemons 1124, respectively, on every node, as well as an init-container (not shown) that installs the Antrea-CNI 1112 on the node. The Antrea-CNI 1112, in some embodiments, requests IP addresses for pods instantiated on the node 1105, and interacts with the Antrea agent 1122 to update the IP table 1116 with the assigned IP addresses. The Kube-proxy 1114 runs on the node 1105 to maintain network rules on the node to allow network communications to the pods 1130 from sessions within the cluster, as well as sessions outside of the cluster. In some embodiments, the Kube-proxy 1114 forwards data traffic for the pods itself using the IP addresses in the IP table 1116. In some embodiments, OVS realizes the data plane on each of the worker nodes 1105 at the same time, and in response, the Antrea controller 1175 implements the control plane of the software-defined network (SDN) for which the Antrea networking solution 1100 is implemented.

The Antrea agent 1122 helps to bridge the Antrea controller 1175 and OVS between the master node (not shown) and each other node 1105 by creating the OVS bridge 1140 and a veth pair for each pod 1130, with one end 1135 of the veth pair being in the pod's network namespace, and the other end 1145 connected to the OVS bridge 1140. As shown, the Antrea agent 1122 interacts with the OVS bridge 1140 via the OVS daemons 1124. In some embodiments, on the OVS bridge 1140, the Antrea agent 1122 also creates an internal port antrea-gw0 (not shown) by default as the gateway of the node's subnet, and a tunnel port antrea-tun0 (not shown) for creating overlay tunnels to other nodes 1105.

The containers, in some such embodiments, use address resolution protocol (ARP) messages (i.e., for IPV4) or (neighbor discovery) ND messages (i.e., for IPV6) to advertise their assigned IP addresses to other containers (or sets of containers (e.g., pods)) belonging to the particular subnet by tagging these messages with the LNI associated with the particular subnet. In some embodiments, tagging these messages with the LNI associated with the particular subnet ensures these messages are only read by members of the particular subnet.

Figure 12:
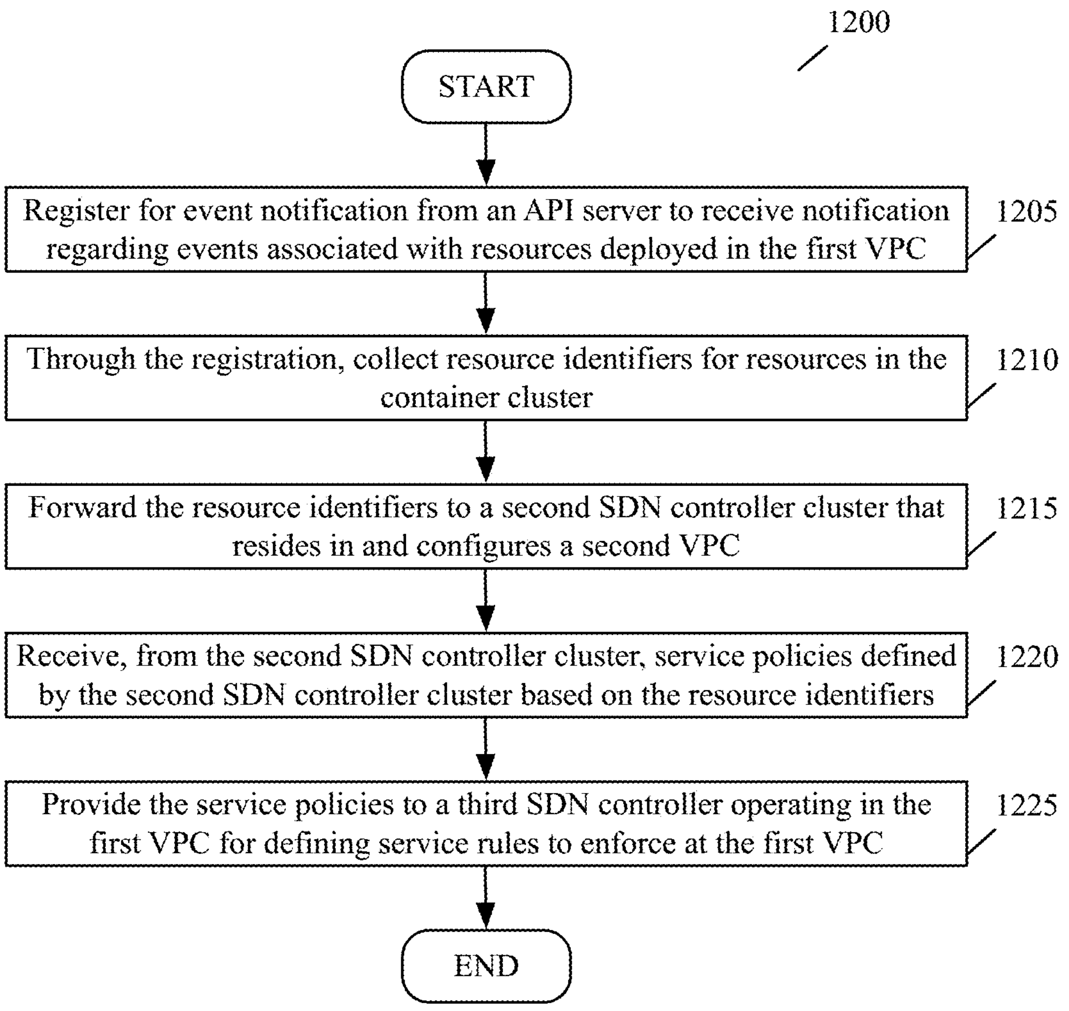
FIG. 12 conceptually illustrates a process of some embodiments for implementing service policies for a container cluster that were defined by an SDN controller cluster that does not configure the container cluster.

FIG. 12 conceptually illustrates a process 1200 of some embodiments of implementing service policies for a container cluster in a first VPC that is configured by a first SDN controller cluster. More specifically, this figure illustrates a process 1200 performed by the set of one or more adapters in the first VPC for collecting resource identifiers to define service policies in a second VPC and receiving said service policies for enforcement in the first VPC. In some embodiments, these service policies are defined in the second VPC for enforcement on data messages associated with machines deployed in the first VPC and machines deployed in a third VPC that also does not define the service policies. The set of adapters may operate on one master node in the first VPC, or may instead operate in a distributed manner across multiple nodes in the first VPC.

The process 1200 begins by registering (at 1205) for event notification from an API server to receive notification regarding a set of events associated with resources deployed in the first VPC. In some embodiments, set of adapters registers for event notifications with the API server operating in the first VPC, e.g., sets up a long-pull session with the API server to receive all CRUD events for various CRDs that are defined for networking. In some embodiments, the API server is a Kubernetes master VM, and the set of adapters runs in this VM as a Pod. In some embodiments, the set of adapters communicates directly with the API server. This API server may be a single API server executing on one network node in the first VPC, or may be a set of multiple API servers, each executing on a network node in the first VPC. In some embodiments, a single API server receives the registration for event notification from the set of adapters in the first VPC. In some embodiments, all API servers receive the registration for event notification, while, in other embodiments, only one API server receives it. A set of API servers in some embodiments includes a designated master API server, which receives the registration for event notification.

Next, through the registration, the process 1200 collects (at 1210) resource identifiers for resources in the container cluster. In some embodiments, the API server collects resource identifiers for all resources in the first VPC, and sends the resource identifiers to the set of adapters. A set of multiple API servers in some embodiments each collect resource identifiers for resources of the network node on which it operates and sends the resource identifiers to the set of adapters. In some embodiments, the set of adapters registers for event notification regarding new resource identifiers for new resources or updated resource identifiers for current resources. Resources in the first VPC may be added or removed at any time, and the set of events corresponds to any updates regarding the resources in the first VPC. For example, if a new pod is instantiated on a network node in the first VPC, the new pod's resource identifier (e.g., its network address) is collected by the API server, and the API server notifies the set of adapters operating in the first VPC of the new resource identifiers. In some embodiments, the API server only sends new or updated resource identifiers to the set of adapters. In other embodiments, the API server sends a complete list of all resource identifiers for the resources in the first VPC each time the API server notifies the set of adapters of the resource identifiers. The API server in some embodiments sends resource identifiers to the set of adapters periodically, while in other embodiments, the API server sends the resource identifiers only when one or more updates to the resource identifiers occurs. The resource identifiers of some embodiments include network addresses for the several resources in the first VPC. These resources may include one or more of pods, network nodes hosting one or more pods, gateway nodes, and service nodes in the first VPC.

After receiving the resource identifiers from the API server, the process 1200 forwards (at 1215) the resource identifiers to a second SDN controller cluster. The second SDN controller cluster resides in and configures a second VPC, and defines service policies for the first VPC that are not defined by the first SDN controller cluster. In some embodiments, rather than communicating directly with the second SDN controller cluster, the set of adapters directs a manager cluster of the second VPC to have the second SDN controller cluster define the service policies. The resource identifiers in some embodiments are network addresses (e.g., internet protocol (IP)) addresses of the resources in first VPC.

Next, the process 1200 receives (at 1220), from the second SDN controller cluster, a set of service policies defined by the second SDN controller cluster based on the resource identifiers. In some embodiments, the set of service policies specifies service policies to enforce on data messages exchanged between network elements in the first VPC and network elements in a third VPC. In such embodiments, the set of service policies is based also on resource identifiers for resources in the third VPC that were received at the second SDN controller cluster from another SDN controller cluster that configures the third VPC.

Then, the process 1200 provides at (1225) the set of service policies to a third SDN controller cluster operating in the first VPC for defining service rules to enforce at network elements in the first VPC. The third SDN controller cluster does not configure the first VPC and is an Antrea controller deployed for distributing computed network policies to agents operating on nodes in the VPC. This third SDN controller is similar to the Antrea controller 1175 in FIG. 11, and works with the set of adapters to distribute the service policies. After the set of adapters provides the third SDN controller cluster with the set of service policies defined by the second SDN controller cluster, the process 1200 ends.

Figure 13:
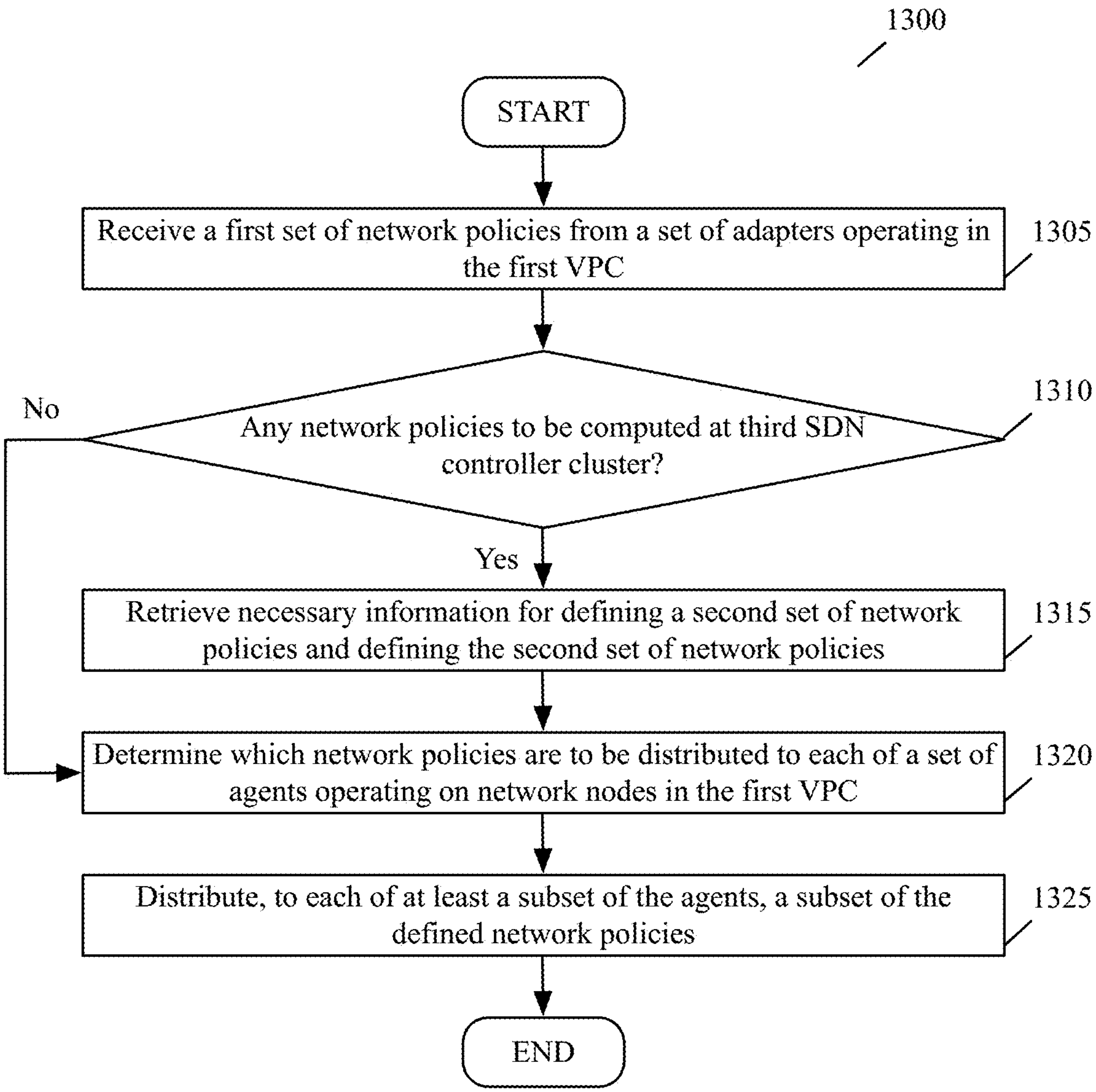
FIG. 13 conceptually illustrates a process of some embodiments for distributing network policies to nodes of a container cluster for enforcement.

FIG. 13 conceptually illustrates a process 1300 of some embodiments for distributing network policies among nodes of a container cluster in a first VPC that is configured by a first SDN controller. This process 1300 uses network policies defined by a second SDN controller cluster residing in a second VPC, such as the service policies described in the process 1200 of FIG. 12. A third SDN controller cluster residing in the first VPC (but not configuring the first VPC) performs the process 1300, which may be a controller similar to the Antrea controller 1175 of FIG. 11. In some embodiments, one controller operates on one master network node in the first VPC. In other embodiments, multiple controllers operate on multiple network nodes in the first VPC. In this example, neither the first nor the third SDN controller cluster in the first VPC defines network policies for data messages exchanged between machines in the first VPC and machines in a third VPC, so the first VPC utilizes the second SDN controller for defining the network policies.

The process 1300 begins by receiving (at 1305) a first set of network policies from a set of adapters operating in the first VPC. The set of adapters acts as a communication link between the second SDN controller and the first VPC, and the set of adapters received from the second SDN controller cluster the first set of network policies, which are based on resource identifiers for resources of the container cluster in the first VPC. In some embodiments, the received network policies are service policies, such as middlebox service policies, to enforce on data messages exchanged between machines in the first VPC and machines in a third VPC configured by a third SDN controller cluster. The third VPC also does not have a controller cluster for defining network policies for data messages exchanged between the first and third VPCs.

The process 1300 also determines (at 1310) whether any network policies need to be computed at the third SDN controller cluster. In some embodiments, the third SDN controller cluster is configured to compute some network policies for the first VPC, such as network policies to apply to data messages exchanged within the first VPC. If the process 1300 determines that a second set of one or more network policies are to be computed by the third SDN controller cluster, the process 1300 retrieves (at 1315) necessary information for defining the second set of network policies and defines the second set of network policies. The third SDN controller monitors network policy, pod, and namespace resources with an API server operating in the first VPC. The third SDN controller cluster uses information associated with these resources to compute the second set of network policies. In some embodiments, the third SDN controller receives, through the set of adapters, necessary information (e.g., resource identifiers for resources in the third VPC) from the second SDN controller cluster, and uses that information for computing network policies. If the process 1300 determines that no network policies are to be computed by the third SDN controller cluster, the process 1300 proceeds to step 1320.

At step 1320, the process 1300 determines which of the network policies are to be distributed to each of a set of agents operating on network nodes in the first VPC. In some embodiments, the third SDN controller cluster operates on one master network node in the first VPC, and each of multiple network nodes in the first VPC host at least one agent. The third SDN controller cluster determines which policies are to be enforced at which nodes so that each agent receives an appropriate subset of the network policies. For example, if two network policies are to be enforced for a gateway and a pod residing on a particular network node, the agent operating on the particular network node needs to receive the two network policies from the third SDN controller. The third SDN controller provides each agent with the appropriate network policies because only the network policies associated with the resources on each network node are enforced on the network node.

After determining which network policies are to be distributed to each network node, the process 1300 distributes (at 1325), to at least a subset of the agents, a subset of the defined network policies. The third SDN controller distributes a subset of network policies to each agent residing on a network node that hosts resources specified in the subset of network policies. In some embodiments, the third SDN controller cluster determines that no network policies are to be applied at one or more network nodes in the first VPC, so the third SDN controller cluster does not distribute any network policies to those agents. Each agent receiving a subset of the network policies typically receives a different subset of network policies than the other agents because a network policy to be applied to data messages exchanged between a particular network node in the first VPC and a machine in the second VPC is only applied at the particular network node. Alternatively, more than one agent receives the same network policy from the third SDN controller in some embodiments. For instance, for a network policy (defined either by the second or third SDN controller) that is to be applied to data messages exchanged between a machine on a first network node in the first VPC and a machine on a second network node in the first VPC, both agents on the first and second network nodes may receive this network policy. In this example, the network policy may be applied at the destination network node, so each network node receives the policy in order to be applied to all data messages exchanged between the two network nodes. After the network policies have been distributed, the process 1300 ends.

Figure 14:
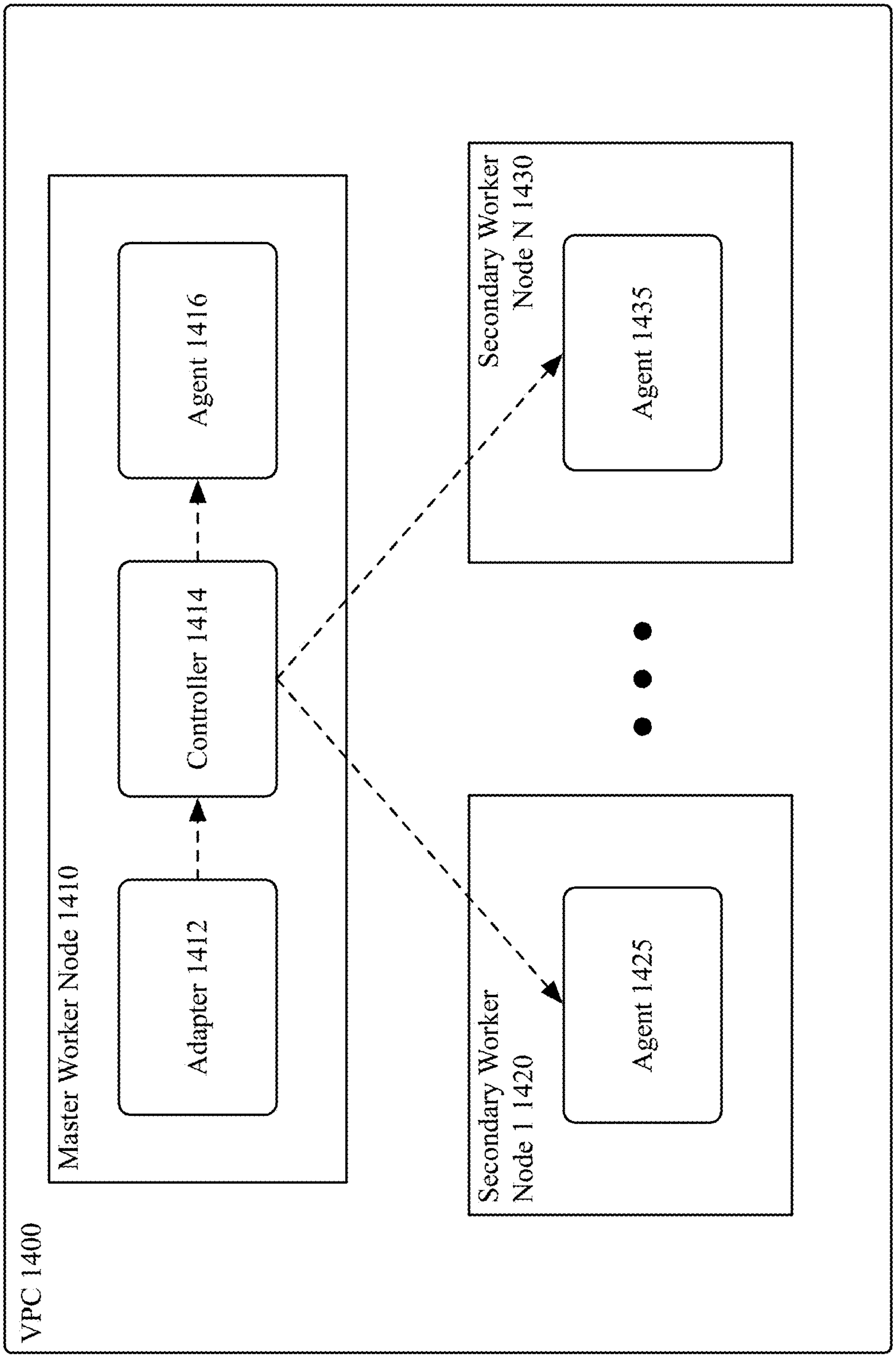
FIG. 14 illustrates an example of a VPC of some embodiments for distributing network policies from a master worker node to secondary worker nodes.

In some embodiments, the adapter and controller reside on a master node in the VPC. FIG. 14 illustrates an example VPC 1400 that includes a master worker node 1410 and one or more secondary worker nodes 1420-1430. The master worker node 1410 includes the adapter 1412 for providing another VPC's SDN controller with this VPC's resource identifiers and providing a set of network policies, defined by the other VPC's SDN controller, to the controller 1414. The controller 1414 receives the set of network policies, determine which policies are to be distributed to which agents 1416, 1425, and 1435 in the VPC 1400. In some embodiments, the VPC 1400 includes only one worker node, i.e., the master worker node 1410, and the controller 1414 only distributes the network policies to the agent 1416 operating on the master worker node 1410. The VPC 1400 in some embodiments that includes two or more worker nodes (i.e., a master worker node 1410 and at least one secondary worker node 1420) may not include an agent on the master work node 1410. In such embodiments, the controller 1414 distributes the network policies among any secondary worker nodes and does not distribute or enforce any network policies on its own worker node 1410.

Figure 15:
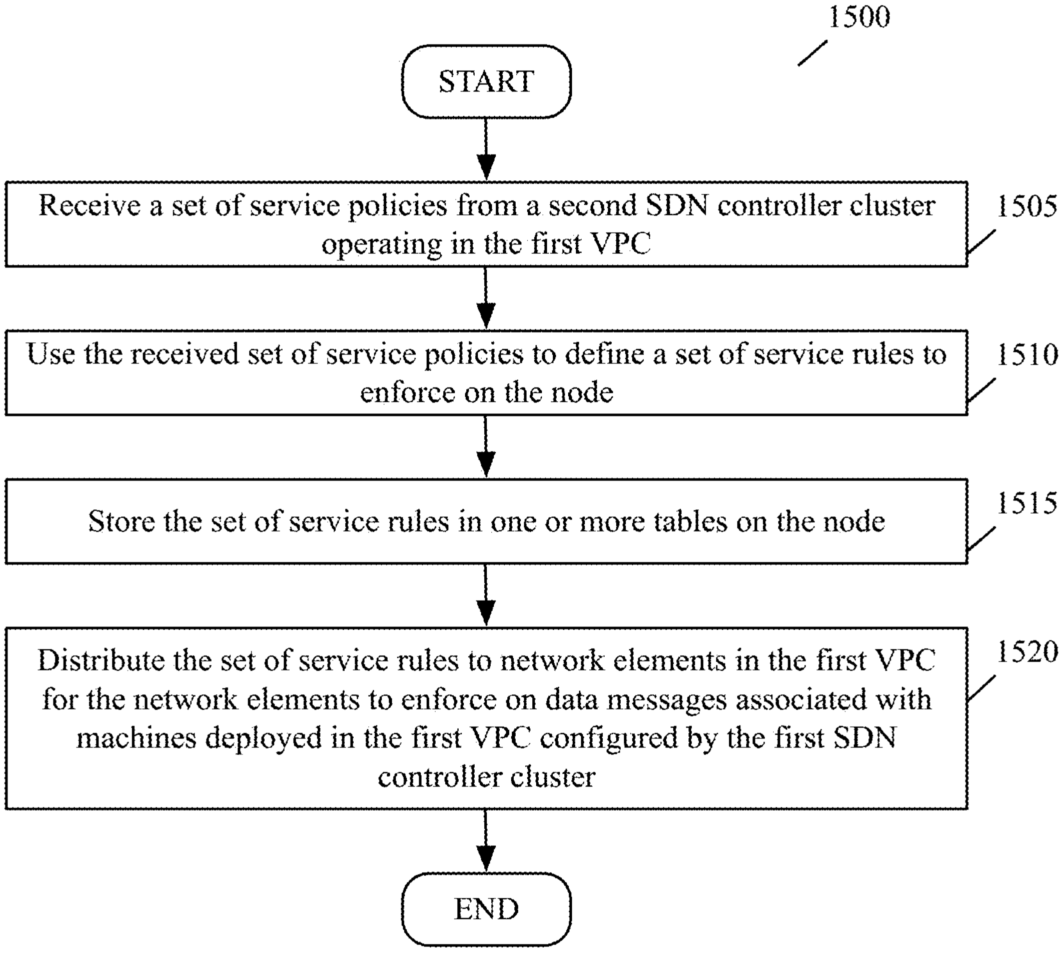
FIG. 15 conceptually illustrates a process of some embodiments for using defined service policies to define service rules to enforce on data messages entering and exiting a VPC.

FIG. 15 conceptually illustrates a process 1500 of some embodiments for using defined service policies to define service rules to enforce on data messages associated with machines deployed in a first VPC configured by a first SDN controller cluster. The process 1500 is performed by each agent on each node in a VPC that receives network policies from a controller in the VPC. This process 1500 will be described in relation to Antrea agent 1122 in FIG. 11, however, this process 1500 may be performed by any agent operating on a node in a VPC, such as the agents 1416, 1425, and 1435 in FIG. 14.

The process 1500 begins by receiving (at 1505) a set of service policies from a second SDN controller cluster operating in the first VPC. This second SDN controller cluster is the Antrea controller 1175, and does not configure the first VPC. The received set of service policies are received by the Antrea agent 1122 and are service policies to be implemented at its worker node 1105. In some embodiments, the set of service policies is defined by a third SDN controller cluster that resides in and configures a second VPC. In other embodiments, the set of service policies is defined by the Antrea controller 1175. Still, in other embodiments, a subset of the set of service policies is defined by the third SDN controller cluster, and another subset of the set of service policies is defined by the Antrea controller 1175. The Antrea agent 1122 receives this set of service policies, which specifies policies to apply to data messages exchanged between machines in its own VPC with machines in another VPC.

Next, the process 1500 uses (at 1510) the received set of service policies to define a set of service rules to enforce on the node. Using the received service policies, the Antrea agent 1122 defines OVS flow rules that can be enforced at the worker node 1105. In some embodiments, these OVS flow rules are translated from the received policies to define middlebox service rules (e.g., firewall rules, load balancing rules, NAT rules, etc.) to enforce on data messages entering and exiting the node 1105. The OVS flow rules in other embodiments also define rules to enforce on data messages exchanged within the node 1105, such as between pods 1130. After defining the set of service rules, the process 1500 stores (at 1515) the set of service rules in one or more tables on the node. The agent 1122 stores the translated OVS flow rules in the IP tables 1116, or may store them in another table on the worker node 1105.

Next, the process 1500 distributes (at 1520) the set of service rules to network elements in the first VPC for the network elements to enforce the service rules on data messages associated with machines deployed in the first VPC configured by the first SDN controller cluster. In some embodiments, the Antrea agent 1122 distributes the OVS flow rules to network elements using the OVS Daemons 1124 and the OVS bridge 1140, which bridge communication between all pods 1130 on the node 1105. These network elements may be gateways operating on the node 1105, or may be any middlebox service engines operating on the node 1105. In some embodiments, the Antrea agent 1122 itself enforces the OVS flow rules. In some embodiments, a subset of service rules are distributed to at least two network elements that implement a distributed network element. This distributed network element may be a logical switch, a logical router, a logical middlebox service network element, etc. that resides on two or more physical machines (e.g., host computers) of the container cluster in order to implement a distributed network policy. After the set of service rules has been distributed to the network elements that are to enforce them, the process 1500 ends.

While operations performed by adapters, controllers, and agents are described regarding different VPCs configured by SDN controller clusters, some embodiments may be implemented for different container clusters. For example, An adapter, controller, and agent system registers for event notification from an API server to receive notification regarding a set of events associated with resources deployed in the container cluster. The system forwards to a second SDN controller cluster resource identifiers that are collected through the registration for several resources of the container cluster. The second SDN controller cluster defines service policies that are not defined by the first SDN controller cluster. The system receives, from the second SDN controller cluster, a set of service policies defined by the second SDN controller cluster based on the resource identifiers. The system distributes service rules defined based on the received set of service policies to network elements in the container cluster. The network elements enforce the service rules on data messages associated with machines deployed in the container cluster configured by the first SDN controller cluster.

Figure 16:
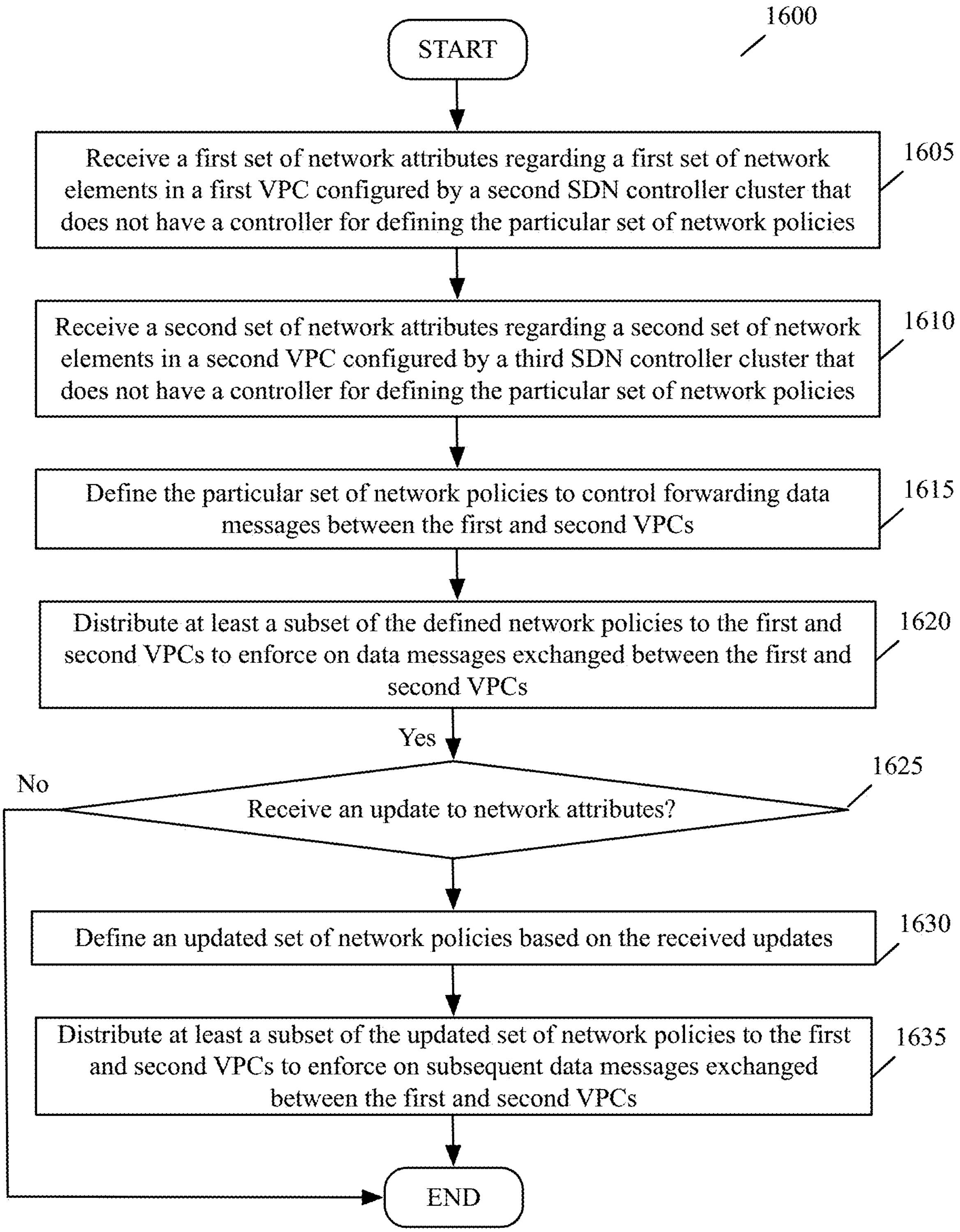
FIG. 16 conceptually illustrates a process of some embodiments for using an SDN controller cluster as an NCaaS to define network policies to enforce in several VPCs.

As discussed previously, a non-Kubernetes SDN controller cluster in a particular VPC may define service policies to be enforced on data messages exchanged between two other VPCs. These other VPCs use the non-Kubernetes SDN controller cluster as a network controller as a service (NCaaS). FIG. 16 conceptually illustrates a process 1600 of some embodiments for using a first SDN controller cluster as an NCaaS to define a particular set of network policies to enforce in several VPCs. For a system that exchanges data messages between Kubernetes clusters, the Kubernetes clusters of some embodiments are controlled by using managers and controllers that are distributed by third party companies that do not support certain functionalities. For example, these third party companies may not support defining network policies to apply to data messages exchanged between different Kubernetes clusters. Since these Kubernetes managers and controllers have this deficiency, another SDN controller cluster is used as an NCaaS to provide this level of functionality as a service to the Kubernetes clusters. Upon doing so, Kubernetes clusters are not limited by the limitations of their third party providers, but rather are able to enforce network policies that they themselves cannot define. The non-Kubernetes SDN controller of some embodiments serves as a de-facto central controller cluster for the several container clusters to define a particular network policy. This is because the central SDN controller cluster can receive workloads from remote container clusters.

The process 1400 is performed for first and second VPCs by the first SDN controller cluster operating in a third VPC. This process 1600 may be performed by a network virtualization controller cluster of a particular VPC to define network policies for other VPCs, namely, to define network policies to enforce on data messages that are not forwarded to or by machines in the particular VPC. The process 1600 will be described in relation to the first SDN controller 1011, but one of ordinary skill will understand that any SDN controller in any type of cloud may perform this process 1600. The particular set of network policies specifies network policies (e.g., service policies) to apply to data messages exchanged between the network elements 1024 and 1025 in VPC 1020 and the network elements 1034 and 1035 in VPC 1030.

The process 1600 begins by receiving (at 1605) a first set of network attributes regarding a first set of network elements in a first VPC that is configured by a second SDN controller cluster that does not have a controller cluster in the first VPC for defining the particular set of network policies. The SDN controller 1011 receives, from the adapter 1022, a set of network attributes regarding the set of network elements 1024 and 1025 to define network policies. In some embodiments, the adapter 1022 provides the network attributes to the SDN manager 1012, for the SDN manager 1012 to direct the SDN controller 1011 to compute the particular set of network policies. The set of network attributes in some embodiments is a set of resource identifiers, such as network addresses (e.g., IP addresses) of the network elements 1024 and 1025, which are to be used as the source and destination network addresses for the VPC 1020 specified in the network policies.

The process 1600 also receives (at 1610) a second set of network attributes regarding a second set of network elements in a second VPC that is configured by a third SDN controller cluster and does not have a controller cluster in the second VPC for defining the particular set of network policies. The SDN controller 1011 receives, from the adapter 1032, network attributes regarding the set of network elements 1034 and 1035 in the VPC 1030. In some embodiments, the adapter 1032 provides the network attributes to the SDN manager 1012 to direct the SDN controller 1011 to define the particular set of network policies. The second set of network attributes, like the first set of network attributes, may be resource identifiers, such as network addresses (e.g., IP addresses) of the network elements 1034 and 1035, which are to be used as the source and destination network addresses for the VPC 1030 specified in the network policies.

The first SDN controller in some embodiments deploys adapters in multiple other VPCs in order to receive and store network attributes for network elements in the multiple VPCs. These VPCs are able to determine the network attributes of its own network elements, but are not able to determine any network attributes of any network elements in any other VPCs. Because of this, the VPCs themselves cannot define network policies for data messages exchanged between its own VPC and another VPC, so adapters are deployed for the first SDN controller cluster to collect all VPCs' network attributes. In doing so, network policies, such as middlebox service policies, can be defined for data messages exchanged between two of the VPCs.

In some embodiments, each of the two VPCs (i.e., VPCs 1020 and 1030) has at least one controller cluster that defines some network policies but not the particular network policies defined by the first SDN controller cluster. For instance, the VPCs 1020 and 1030 may each include a controller that can define network policies to control forwarding data messages between network elements within their VPCs, but not a controller cluster that defines network policies to control forwarding data messages between network elements that are in different VPCs. In other embodiments, the VPCs 1020 and 1030 may each include a controller that can define switching and routing policies, but not middlebox service policies (such as firewall policies). Still, in other embodiments, the VPCs 1020 and 1030 may each include a controller that can define a first type of middlebox policies (such as load balancing policies), but not a second type of middlebox policies (such as firewall policies). And, still, in other embodiments, the VPCs 1020 and 1030 may each include a controller that can define a first category of policies for a middlebox service (such as Layer 4 firewall services), but not a second category of policies for a middlebox service (such as Layer 7 firewall policies). In order to define this particular set of network policies that cannot be defined by these VPCs 1020 and 1030, the SDN controller 1011, which operates in a different VPC 1010, is used as a service for the first and second VPCs to define this particular set of network policies.

Based on the first and second sets of network attributes, the process 1600 defines (at 1615) the particular set of network policies to control forwarding data messages between the first and second VPCs. The SDN controller 1011 uses the network attributes of the network elements 1024, 1025, 1034, and 1035 to define network policies to control forwarding data messages between these network elements. In some embodiments, the set of network policies specify service rules, such as middlebox service rules, to enforce on such data messages.

The Kubernetes controller clusters 1021 and 1031 that respectively configure the VPCs 1020 and 1030 are in some embodiments deployed by different cloud providers than a particular cloud provider of the first SDN controller cluster 1011. For instance, the SDN controller cluster 1011 may be deployed by a first cloud provider, while the Kubernetes managers 1021 and 1031 are deployed by a second cloud provider. Alternatively, the SDN controller cluster 1011 may be deployed by a first cloud provider, while the Kubernetes manager 1021 is deployed by a second cloud provider and the Kubernetes manager 1031 is deployed by a third cloud provider. The Kubernetes mangers 1021 and 1031 may also be referred to as SDN controller clusters configuring the VPCs 1020 and 1030 in some embodiments.

In some embodiments, the particular cloud provider that deploys the SDN controller 1011 cluster provides the SDN controller cluster 1011 as an NCaaS for multiple tenants. In such embodiments, the SDN controller 1011 receives a first tenant identifier (ID) identifying a first tenant that deploys the VPC 1020, receives a second tenant ID identifying a second tenant that deploys the VPC 1030, and defines the particular set of network policies based also on the first and second tenant IDs.

Next, the process 1600 distributes (at 1620) at least a subset of the defined network policies to the first and second VPCs in order for at least one of the first and second sets of network elements at the first and second VPCs to enforce on data messages exchanged between the first and second VPCs. The SDN controller 1011 distributes the network policies that are to be applied at the VPC 1020 to the adapter 1022, and distributes the network policies that are to be applied at the VPC 1030 to the adapter 1032. In some embodiments, each VPC receives network policies that are to be applied to egress data messages (i.e., data messages exiting the VPC). In other embodiments, each VPC receives network policies that are to be applied to ingress data messages (i.e., data messages entering the VPC). Still in other embodiments, each VPC receives network policies that are to be applied to a combination of ingress and egress data messages. Still, in other embodiments, the VPC 1020 receives a combination of both types of network policies. The subsets of network policies in some embodiments are received from the adapters 1022 and 1032 at controllers 1023 and 1033. The controllers 1023 and 1033 determine which nodes and gateways in the VPC are to enforce which policies, and distributes subsets of the defined network policies accordingly to sets of agents operating on one or more nodes in the VPCs 1020 and 1030. The sets of agents use the received subset of the defined network policies to define a set of service rules. In some embodiments, the agents enforce the service rules themselves on data messages. In other embodiments, the agents distribute the set of service rules to the network elements 1024, 1025, 1034, and 1035 to enforce on data messages. The decision of where network policies are to be enforced may be determined by a user or administrator. In some embodiments, only one of the VPCs (i.e., VPC 1020 or 1030) receives network policies from the SDN controller 1011 for enforcement.

In some embodiments, the gateways 1025 and 1035 each includes at least one of an ingress gateway and an egress gateway operating on nodes in the VPCs 1020 and 1030. In embodiments where service rules are applied only at an ingress gateway, the VPCs 1020 and 1030, hence, only apply service rules for ingress data messages. In embodiments where service rules are applied only at an egress gateway, the VPCs 1020 and 1030, hence, only apply service rules for egress data messages. In embodiments where service rules are applied at a gateway that forwards ingress and egress data messages, the VPCs 1020 and 1030 apply service rules for a combination of ingress and egress data messages exchanged between the VPCs 1020 and 1030. The nodes 1024 and 1034 in some embodiments include one or more source and destination machines operating on the nodes in the VPCs 1020 and 1030. For instance, the agents 1024 distribute the service rules to these machines in the VPC 1020. For data messages sent from VPC 1020 to VPC 1030, source machines of the nodes 1024 apply the service rules to the data messages. For data messages sent from VPC 1030 to the VPC 1020, destination machines of the nodes 1024 apply the service rules to the data messages.

After distributing the network policies, the process 1600 determines (at 1625) whether the first SDN controller cluster has received at least one update to one or more network attributes. The adapters 1022 and 1032 in some embodiments provide the SDN controller 1011 with any updates to network element attributes in their respective VPCs in order for the SDN controller 1011 to define an update set of network policies. An update to a network attribute may include a new network attribute of a new network element, e.g., a new network address for a newly instantiated node in the VPC. An update to a network attribute may also include an updated network attribute of a current network element, e.g., a new network address for an already instantiated node in the VPC. The updates received by the SDN controller 1011 may be associated with the first set of network attributes from the VPC 1020, the second set of network attributes from the VPC 1030, or a combination thereof. In some embodiments, if a VPC provides updated network attributes, the VPC provides just the updated network attributes and not network attributes that have not changed since the network policies have been defined. In other embodiments, the VPC provides the entire list of network attributes including the unchanged network attributes.

If the process 1600 determines that an update has not been received, the process 1600 ends. In some embodiments, the SDN controller 1011 is configured with a timer such that the SDN controller 1011 listens for updates from either VPC 1020 or 1030 for a particular period of time. If the particular period of time ends, the SDN controller 1011 is configured to end the process 1600. In other embodiments, the SDN controller 1011 is configured to listen for updates indefinitely, so that the SDN controller 1011 will be able to receive updates and provide updated network policies for the VPCs 1020 and 1030 at any time in the future.

If the process 1600 determines that at least one update has been received, the process 1600 defines (at 1630) an updated set of network policies based on the received updates. Using any new or updated network attributes, along with network attributes received that have not changed, the SDN controller 1011 defines an updated set of network policies for enforcement at the VPCs 1020 and 1030. Then, the process 1600 distributes (at 1635) at least a subset of the updated set of network policies to the first and second VPCs in order for at least one of the first and second sets of network elements at the first and second VPCs to enforce on subsequent data messages exchanged between the first and second VPCs. The VPCs 1020 and 1030 receive the updated network policies, and define updated service rules to enforce on subsequent data messages. Then, the process 1600 ends.

While process 1600 is described regarding different VPCs configured by SDN controller clusters, some embodiments may be implemented for different container clusters. For example, the first SDN controller cluster receives a first set of network attributes regarding a first set of network elements in a first container cluster that is configured by a second SDN controller cluster but does not have a controller cluster in the first container cluster for defining the particular set of network policies. The first SDN controller cluster also receives a second set of network attributes regarding a second set of network elements in a second container cluster that is configured by a third SDN controller cluster but does not have a controller cluster in the second container cluster for defining the particular set of network policies. Based on the sets of network attributes, the first SDN controller cluster defines the particular set of network policies to control forwarding data messages between the first and second container clusters. Then, the first SDN controller cluster distributes at least a subset of the defined network policies to the first container cluster in order for at least one set of one or more network elements at the first container cluster to enforce on data messages exchanged between the first and second container cluster.

Figure 17:
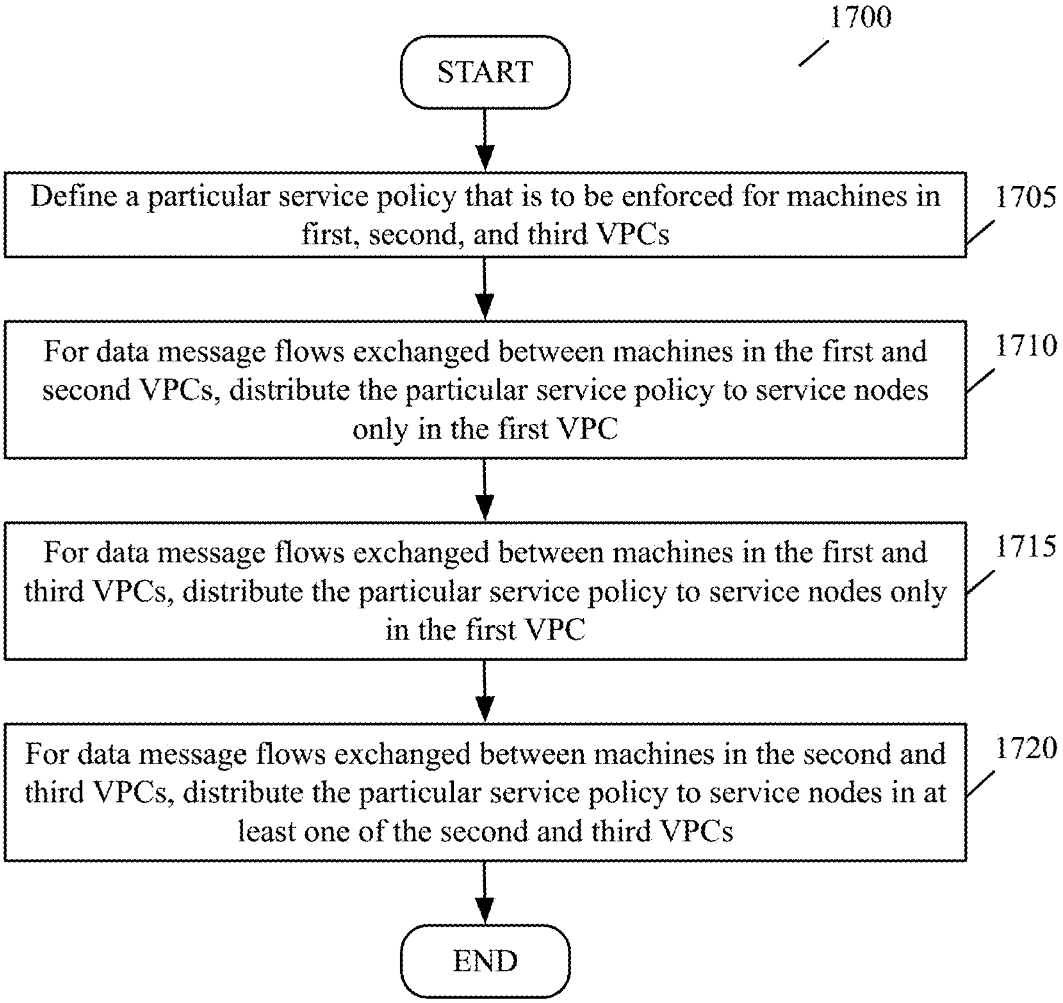
FIG. 17 conceptually illustrates a process of some embodiments for enforcing service policies at different VPCs configured by several SDN controller clusters.

As discussed previously, a non-Kubernetes SDN controller cluster in a particular VPC may define service policies to be enforced on data messages exchanged between two other VPCs. This non-Kubernetes SDN controller cluster may also define service policies to be enforced on data messages exchanged between itself and the other VPCs. FIG. 17 conceptually illustrates a process 1700 for enforcing service policies at different VPCs configured by several SDN controller clusters. This process 1700 may be performed by an SDN controller cluster that defines service policies for data messages exchanged between itself and other VPCs, and for data messages exchanged between the other VPCs. In some embodiments, this SDN controller cluster resides in and configures a first VPC, and is a network virtualization SDN controller cluster that configures VMs and/or containers in the first VPC.

The process 1700 begins by defining (at 1705) a particular service policy that is to be enforced for machines in first, second, and third VPCs. The first VPC is configured by the first SDN controller cluster, and the second and third VPCs are configured respectively by second and third SDN controller clusters. In some embodiments, the second and third SDN controller clusters are Kubernetes SDN controller clusters, and the second and third VPCs do not have controllers for defining the particular service policy. The particular service policy is defined by the first SDN controller cluster using network attributes of network elements in the first, second, and third VPCs. The first set of network attributes may be collected and stored by the first SDN controller cluster, or the first SDN controller cluster may receive them from another controller or a manager operating in the first VPC. The second and third sets of network attributes may be received by first and second sets of adapters operating respectively in the second and third VPCs for the first SDN controller cluster. The sets of adapters act as the communication link between the first SDN controller cluster and the second and third VPCs. In some embodiments, the network attributes for each of the second and third VPCs are received by the set of adapters from an API server operating in the VPC, and the set of adapters registers for event notification with the API server.

For data message flows exchanged between machines in the first and second VPCs, the process 1700 distributes (at 1710) the particular service policy to service nodes only in the first VPC. In some embodiments, the service nodes in the first VPC include a first set of SDN enforcement nodes deployed in the first VPC for enforcing a first set service rules based on the particular service policy on data messages sent from the first VPC to the second VPC. These SDN enforcement nodes only handle egress traffic out of the first VPC. In such embodiments, the service nodes in the first VPC also include a second set of SDN enforcement nodes deployed in the first VPC for enforcing a second set service rules based on the particular service policy on data messages sent from the second VPC to the first VPC. These enforcement nodes only handle ingress traffic into the first VPC.

For data message flows exchanged between machines in the first and third VPCs, the process 1700 also distributes (at 1715) the particular service policy to service nodes only in the first VPC. The enforcement nodes in the first VPC enforce a third set of service rules based on the particular service policy on data messages sent from the first VPC to the third VPC, and the second set of enforcement nodes enforce a fourth set of service rules based on the particular service policy on data messages sent from the third VPC to the first VPC. The first, second, third, and fourth sets of service rules may be defined by the first SDN controller cluster, a fourth SDN controller cluster operating in the first VPC that does not configure the first VPC, or the first and second sets of SDN enforcement nodes themselves. The service rules may be defined based on the particular service policy in any suitable method and by any suitable component.

For data message flows exchanged between machines in the second and third VPCs, the process 1700 distributes (at 1720) the particular service policy to service nodes in at least one of the second and third VPCs. The first SDN controller cluster in some embodiments distributes the service policy to service nodes in only one of the second and third VPCs. In such embodiments, all data message flows exchanged between the second and third VPCs have the particular service policy applied at the VPC that received the particular service policy (i.e., either the second or third VPC). In other embodiments, the first SDN controller cluster distributes the particular service policy to service nodes in both the second and third VPCs. In these embodiments, the second VPC enforces the particular service policy on data message flows sent from machines in the third VPC to machines in the second VPC, and the third VPC enforces the particular service policy on data message flows sent from the machines in the second VPC to the machines in the third VPC. Namely, the second and third VPCs apply the particular service policy to data message flows whose destination is in their VPC. Once the particular service policy has been distributed, the process 1700 ends.

While process 1600 is described regarding different VPCs configured by SDN controller clusters, some embodiments may be implemented for different container clusters. For example, the first SDN controller cluster defines a particular service policy that is to be enforced for machines in first, second, and third container clusters. A first set of network elements for the first container is managed by the first SDN controller cluster, a second set of network elements for the second container is managed by a second SDN controller cluster, and a third set of network elements for the third container is managed by a third SDN controller cluster. For data message flows exchanged between machines in the first and second container clusters, the first SDN controller cluster distributes the particular service policy to service nodes only in the first container cluster. For data message flows exchanged between machines in the second and third container clusters, the first SDN controller cluster distributes the particular service policy to service nodes in at least one of the second and third container clusters.

In some embodiments, the first, second, and third sets of network elements are mutually exclusive, meaning that there are no network elements in more than one set. in other embodiments, there is at least one network element in two or more of the sets of network elements, but at least one set of network elements includes at least one network element only in its set. Still, in other embodiments, at least one set of network elements is a subset of another set of network elements, e.g., the second set of network elements can be entirely a subset of the third set of network elements such that the third set of network elements includes the second set of network elements and at least one other network element.

The first SDN controller cluster of some embodiments manages networking network elements, while the second and third SDN controller clusters only manage compute network elements. In other embodiments, the second and third SDN controller clusters only manage Layer 2 and Layer 3 networking, and do not manage middlebox services. Still, in other embodiments, the second and third SDN controller clusters manage some middlebox services (such as load balancing services), but not other middlebox services (such as firewall services).

FIGS. 18A-D illustrate an example of this heterogeneous system for applying service policies, defined by a first VPC 1810, at the first VPC 1810, a second VPC 1820, and a third VPC 1830. This system is referred to as heterogeneous because service policies are applied at two different kinds of clusters, e.g., a Kubernetes cluster and non-Kubernetes cluster. The VPCs 1810, 1820, and 1830 in some embodiments are deployed in a particular public or private cloud. In other embodiments, they are respectively deployed in first, second, and third public clouds. These public clouds may be managed by first, second, and third public cloud providers. Alternatively, at least two of the public clouds may be managed by at least two different public cloud providers. For example, the first public cloud may be managed by a first public cloud provider and the second and third public clouds may be managed by a second public cloud provider. The VPCs 1820 and 1830 may also operate in a particular availability zone of the second public cloud provider, and the VPCs 1820 and 1830 may further operate in a particular datacenter of the second public cloud provider.

Figure 18A:
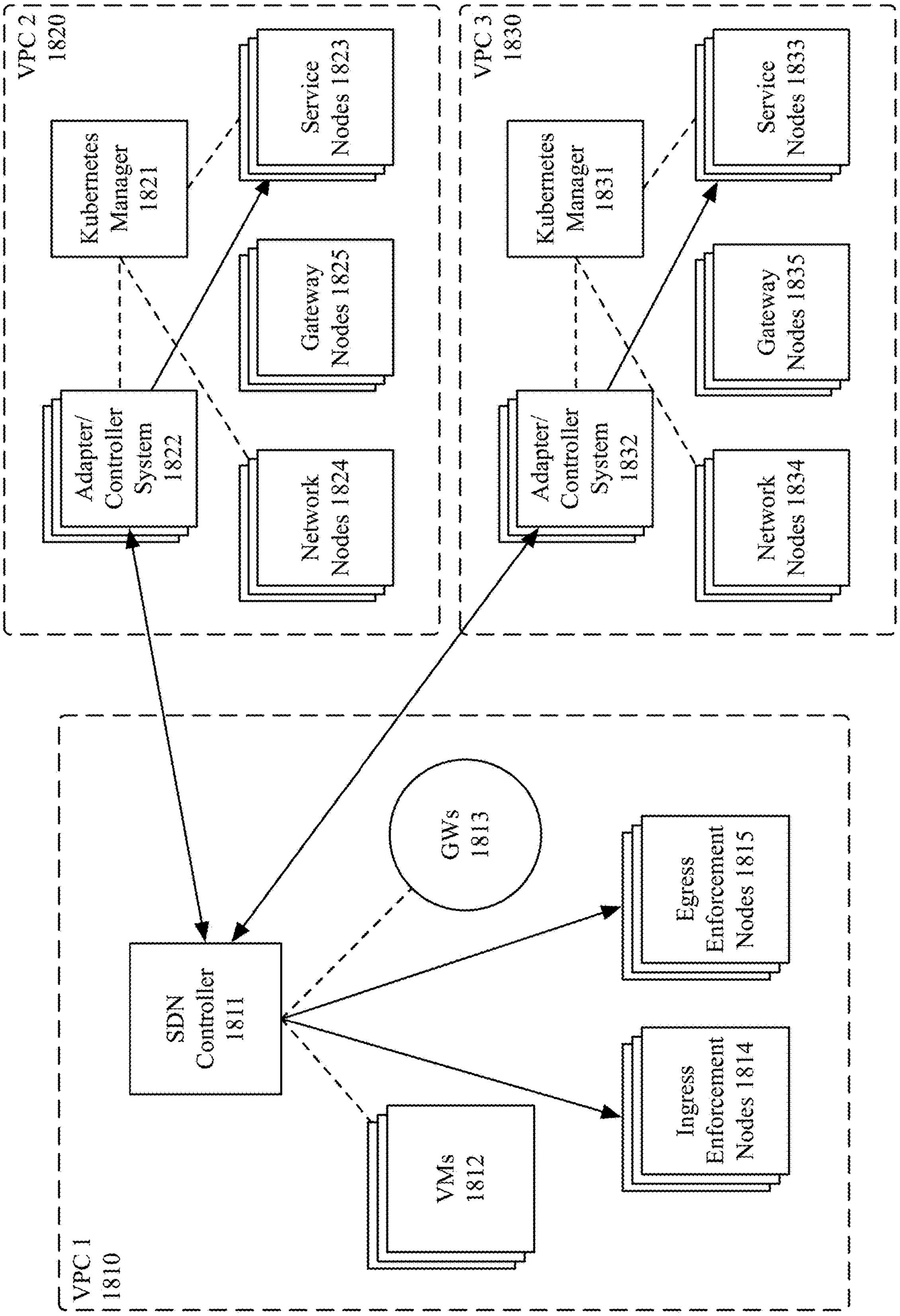
FIGS. 18A-D illustrate an example of a heterogeneous system of some embodiments for defining service policies at a first VPC and enforcing the service policies at the first VPC and at second and third VPCs.

FIG. 18A illustrates the distribution of service policies from the SDN controller 1811 of the first VPC 1810 to the adapter and controller systems 1822 and 1832 of VPCs 1820 and 1830. In this example, the first VPC 1810 is an NSX-T logical network that includes an SDN controller 1811 for configuring the VPC 1810, one or more VMs 1812 which are the source and destination machines of the VPC 1810 residing on host computers (not shown), one or more gateways 1813 which exchange data messages with other VPCs, ingress enforcement nodes 1814, and egress enforcement nodes 1815. The enforcement nodes 1814 and 1815 are service nodes that apply service policies to data messages entering and exiting the VPC 1810, and they are deployed such that they are designated for only ingress or egress data messages.

The second and third VPCs 1820 and 1830 each includes a Kubernetes manager 1821 and 1831 for managing the VPCs, an adapter and controller system 1822 and 1832 for receiving service policies and defining service rules, service nodes 1823 and 1833 which apply the service policies to data messages entering the VPC, network nodes 1824 and 1834 which are the sources and destinations of the VPC, and gateway nodes 1825 and 1835 which are the gateways for data messages enter and exit the VPC. The VPCs 1820 and 1830 do not include controllers that are able to define service policies to apply to data messages exchanged between the two VPCs. Hence, the adapter and controller systems 1822 and 1832 collect network attributes of the network nodes 1824 and 1834 to provide to the SDN controller 1811, and receive from the SDN controller 1811 defined service policies to enforce. The adapter and controller systems 1822 and 1832 may include any previously recited components and perform any of the previously cited actions, such as the adapter, controller, and agent components 1177, 1175, and 1122 described in FIG. 11. Using network attributes collected from the adapter and controller systems 1822 and 1832, the SDN controller 1811 defines service policies, and distributes them to the enforcement nodes 1814 and 1815 in its own VPC 1810, and the adapter and controller systems 1822 and 1832 in the other VPCs 1820 and 1830.

Figure 18B:
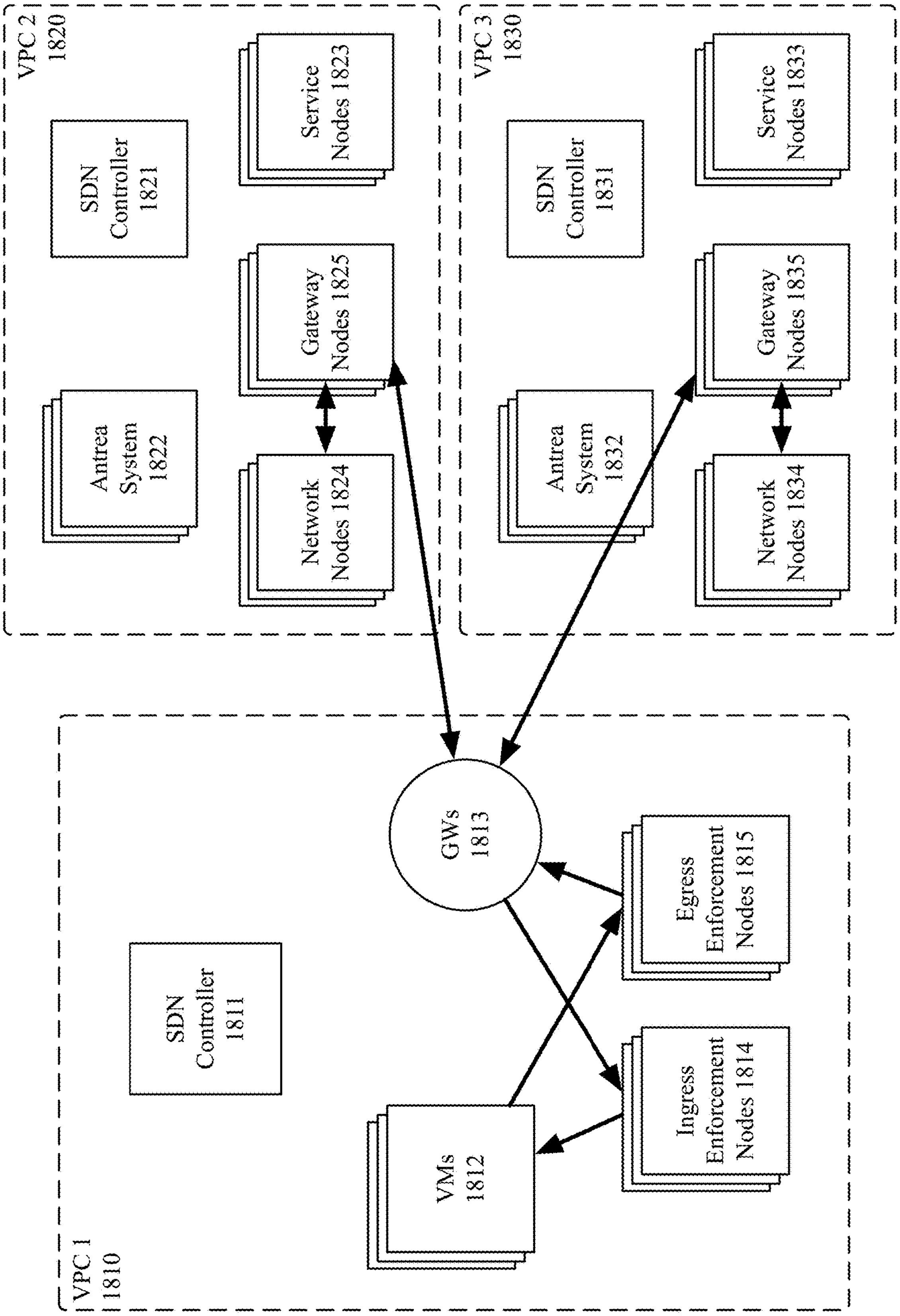

FIG. 18B illustrates the paths of data messages exchanged between the first VPC 1810 and the second VPC 1820, and between the first VPC 1810 and the third VPC 1830. For ingress data messages (i.e., data messages entering VPC 1810), network nodes 1824 and 1834 in the other VPCs 1820 and 1830 forward data messages to the gateway nodes 1825 and 1835, which then forward them to the gateways 1813. The gateways 1813 forward the data messages to the ingress enforcement nodes 1814, where service policies are applied. The enforcement nodes 1814 enforce service rules based on the defined service policies on the data messages. These service rules may be defined by the SDN controller 1811, by another controller or manager operating in the VPC 1810, or by the enforcement nodes themselves. In some embodiments, the service rules include firewall rules, such that data messages are allowed, blocked, or dropped based on policies defined by the SDN controller 1814. In other embodiments, the service rules include load balancing, NAT, intrusion detection system (IDS) or intrusion prevention system (IPS) operations, etc. Once the service rules have been applied to the data messages, they are forwarded to their destination, which is one of the VMs 1812. If a data message is blocked or dropped, however, they are not forwarded to the VMs 1812.

For egress data messages (i.e., data messages exiting the VPC 1810), the VMs 1812, which are now the sources, forward the data messages to the egress enforcement nodes 1815. The egress enforcement nodes 1815, like the ingress enforcement nodes 1814, apply the service policies by enforcing service rules on the data messages. After enforcing the service rules, the egress enforcement nodes 1815 forward the data messages to the gateways 1813, the gateways 1813 forward them to the gateway nodes 1825 and 1835, and the gateway nodes 1825 and 1835 forward them to their destinations, which is any one of the network nodes 1824 and 1834.

Figure 18C:
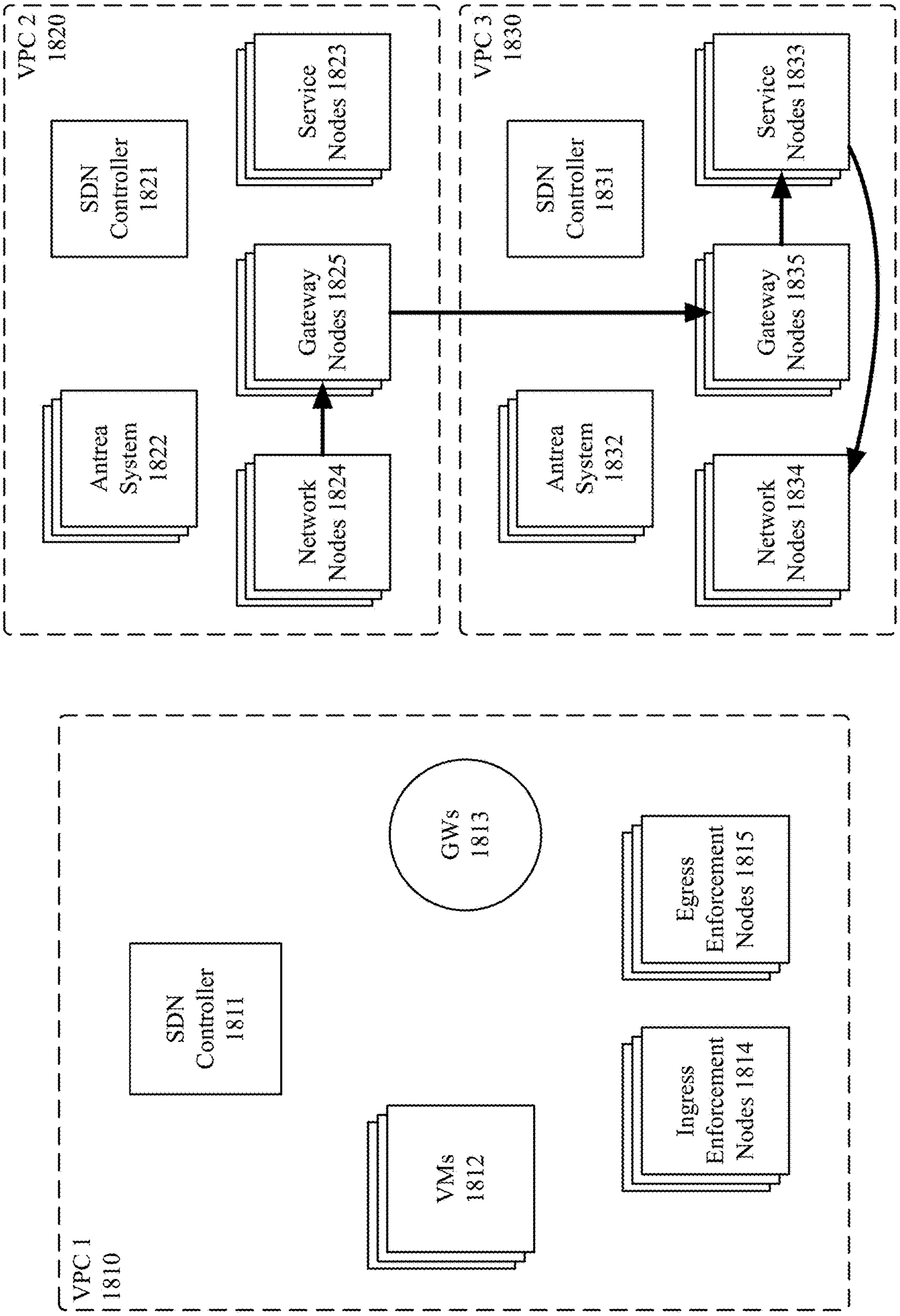

FIG. 18C illustrates the flow of data messages sent from the second VPC 1820 to the third VPC 1830. These data messages are exchanged directly between the VPCs, and are not seen by the first VPC 1810. Source nodes of the network nodes 1824 forward the data messages to the gateway nodes 1825, which forward them to the gateway nodes 1835 of the third VPC 1830. After reception at the gateway nodes 1835, the data messages are forwarded to the service nodes 1833. The service nodes 1833, using the service rules received from the adapter and controller system 1832, enforce the service rules on these data messages. In this example, service policies are applied to ingress data messages only, so the service nodes 1833 do not enforce any service rules on data messages exiting the VPC 1830. Once the service rules have been applied, they are sent to their destination network nodes 1834.

Figure 18D:
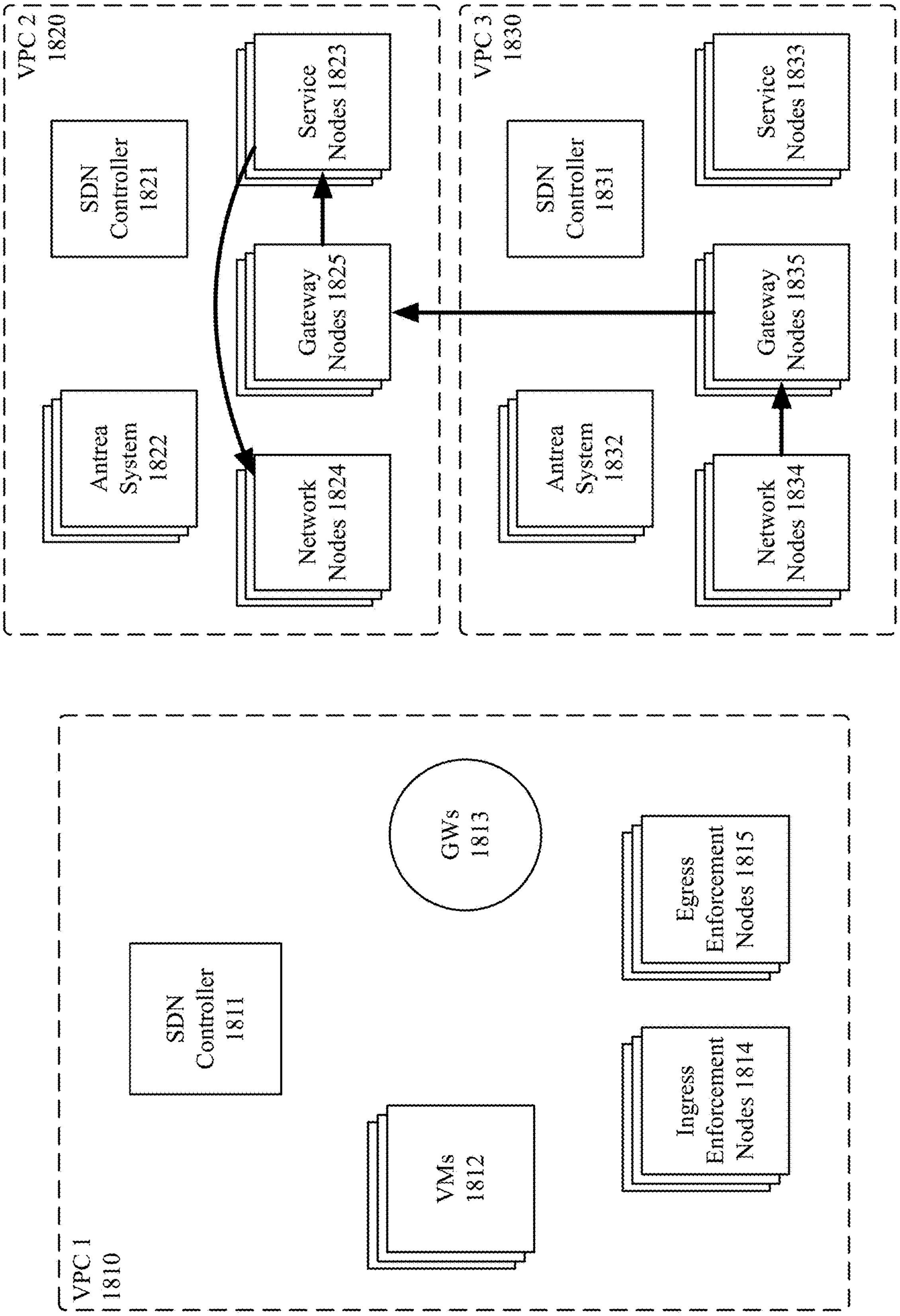

FIG. 18D illustrates a similar flow of data messages, sent from the third VPC 1830 to the second VPC 1820. In this figure, the network nodes 1834 are the source nodes, and they forward the data messages to the gateway nodes 1835, which send them to the second VPC 1820 via the gateway nodes 1825. The gateway nodes 1825 forward the data messages to the service nodes, and the service nodes 1823, using the service rules received from the Antrea system 1822, enforce the service rules on these data messages. Because service policies are applied to ingress data messages only, the service nodes 1823 do not enforce any service rules on data messages exiting the VPC 1820. Once the service rules have been applied, they are sent to their destination network nodes 1824.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
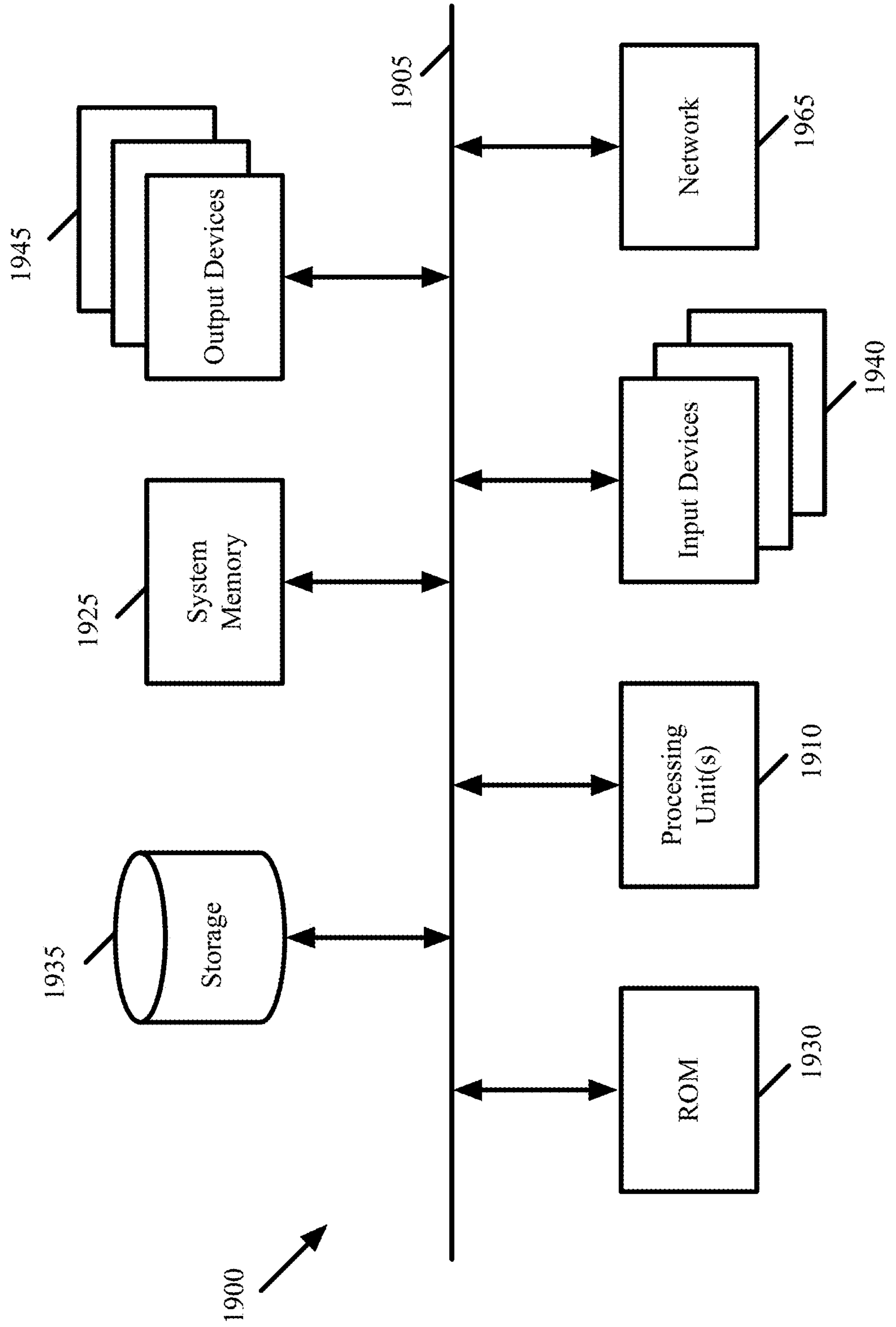
FIG. 19 conceptually illustrates an electronic system with which some embodiments of the invention are implemented.

FIG. 19 conceptually illustrates a computer system 1900 with which some embodiments of the invention are implemented. The computer system 1900 can be used to implement any of the above-described computers and servers. As such, it can be used to execute any of the above described processes. This computer system includes various types of non-transitory machine readable media and interfaces for various other types of machine readable media. Computer system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the computer system 1900. For instance, the bus 1905 communicatively connects the processing unit(s) 1910 with the read-only memory 1930, the system memory 1925, and the permanent storage device 1935.

From these various memory units, the processing unit(s) 1910 retrieve instructions to execute and data to process in order to execute the processes of the invention. The processing unit(s) may be a single processor or a multi-core processor in different embodiments. The read-only-memory (ROM) 1930 stores static data and instructions that are needed by the processing unit(s) 1910 and other modules of the computer system. The permanent storage device 1935, on the other hand, is a read-and-write memory device. This device is a non-volatile memory unit that stores instructions and data even when the computer system 1900 is off. Some embodiments of the invention use a mass-storage device (such as a magnetic or optical disk and its corresponding disk drive) as the permanent storage device 1935.

Other embodiments use a removable storage device (such as a flash drive, etc.) as the permanent storage device. Like the permanent storage device 1935, the system memory 1925 is a read-and-write memory device. However, unlike storage device 1935, the system memory is a volatile read-and-write memory, such a random access memory. The system memory stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieve instructions to execute and data to process in order to execute the processes of some embodiments.

The bus 1905 also connects to the input and output devices 1940 and 1945. The input devices enable the user to communicate information and select commands to the computer system. The input devices 1940 include alphanumeric keyboards and pointing devices (also called "cursor control devices"). The output devices 1945 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 19, bus 1905 also couples computer system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of computer system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method comprising:

receiving a first set of network policies from a set of adapters;

determining an availability of a second set of network policies;

receiving information for defining the second set of network policies based on unavailability of the second set of network policies;

defining the second set of network policies using the information;

selecting between the first set of network policies and the second set of network policies for a first agent;

selecting between the first set of network policies and the second set of network policies for a second agent; and distributing a set of selected network policies to the first agent, the set of selected network policies comprising a subset of the first set of network policies or a subset of the second set of network policies.

2. The method of claim 1, wherein the set of adapters are configured to operate in a virtual private cloud (VPC).

3. The method of claim 1, wherein the set of adapters are configured as a communication link between a software defined network (SDN) and a VPC.

4. The method of claim 1, wherein the first set of network policies are based on resource identifiers for resources of a container clusters of a VPC.

5. The method of claim 1, wherein the information is obtained by monitoring resources associated with a server operating in a VPC.

6. The method of claim 1, wherein the first agent operates on a node of a VPC host.

7. The method of claim 1, wherein the set of selected network policies are enforced for a gateway.

8. The method of claim 1, wherein a third agent is selected for the first set of network policies based on host resources specified in the first set of network policies.

9. The method of claim 1, wherein the first set of network policies is different from the second set of network policies based on node connections.

10. The method of claim 1, wherein the first set of network policies applies to data message exchanges between network nodes.

11. A computer readable medium comprising executable codes, the executable code comprising instructions for:

receiving a first set of network policies from a set of adapters;

determining an availability of a second set of network policies;

receiving information for defining the second set of network policies based on unavailability of the second set of network policies;

defining the second set of network policies using the information;

selecting between the first set of network policies and the second set of network policies for a first agent;

selecting between the first set of network policies and the second set of network policies for a second agent; and distributing a set of selected network policies to the first agent, the set of selected network policies comprising a subset of the first set of network policies or a subset of the second set of network policies.

12. The computer readable medium of claim 11, wherein the set of adapters are configured to operate in a virtual private cloud (VPC).

13. The computer readable medium of claim 11, wherein the set of adapters are configured as a communication link between a software defined network (SDN) and a VPC.

14. The computer readable medium of claim 11, wherein the first set of network policies are based on resource identifiers for resources of a container clusters of a VPC.

15. The computer readable medium of claim 11, wherein the information is obtained by monitoring resources associated with a server operating in a VPC.

16. The computer readable medium of claim 11, wherein the first agent operates on a node of a VPC host.

17. The computer readable medium of claim 11, wherein the set of selected network policies are enforced for a gateway.

18. The computer readable medium of claim 11, wherein a third agent is selected for the first set of network policies based on host resources specified in the first set of network policies.

19. The computer readable medium of claim 11, wherein the first set of network policies is different from the second set of network policies based on node connections.

20. The computer readable medium of claim 11, wherein the first set of network policies applies to data message exchanges between network nodes.

* * * * *